United States Patent [19]
Boulet et al.

[11] Patent Number: 5,621,863
[45] Date of Patent: Apr. 15, 1997

[54] NEURON CIRCUIT

[75] Inventors: Jean-Yves Boulet, Ballancourt Sur Essonne; Didier Louis, Fontainebleau; Catherine Godefroy, Corbeil Essonnes; Andre Steimle, Evry; Pascal Tannhof, Cely En Biere; Guy Paillet, Montpellier, all of France

[73] Assignee: International Business Machines Corporation, Armonk, N.Y.

[21] Appl. No.: 481,591

[22] Filed: Jun. 7, 1995

[30] Foreign Application Priority Data

Jul. 28, 1994 [EP] European Pat. Off. .............. 94480067

[51] Int. Cl.⁶ .................................................... G06F 15/18
[52] U.S. Cl. ............................................. 395/124; 395/27
[58] Field of Search ........................................ 395/24, 27

[56] References Cited

U.S. PATENT DOCUMENTS

| | | | |
|---|---|---|---|
| 4,326,259 | 4/1982 | Cooper et al. | 364/715 |
| 5,091,864 | 2/1992 | Baji et al. | 395/27 |
| 5,142,666 | 8/1992 | Yoshizawa et al. | 395/27 |
| 5,165,010 | 11/1992 | Masuda et al. | 395/27 |
| 5,201,029 | 4/1993 | Jackson | 395/27 |
| 5,214,747 | 5/1993 | Cok | 395/27 |
| 5,222,193 | 6/1993 | Brooks et al. | 395/23 |
| 5,239,594 | 8/1993 | Yoda | 382/15 |
| 5,264,734 | 11/1993 | Holler et al. | 395/24 |
| 5,359,700 | 10/1994 | Seligson | 395/24 |
| 5,473,731 | 12/1995 | Seligson | 395/24 |
| 5,487,133 | 1/1996 | Park et al. | 395/24 |

FOREIGN PATENT DOCUMENTS 0295876  6/1988  European Pat. Off. ......... G06K 9/64

OTHER PUBLICATIONS

A. Iwata et al., "Hand–Written Alpha–Numeric Recognition by a Self–Growing Neural Network 'CombNET–II'" IJNN International Joint Conference on Neural Networks, Maryland, vol. 4, pp. IV–228–234, Jun. 1992.

M. Holler, et al, "A High Performance Adaptive Classifier using Radial Basis Functions" Submitted to Government Microcircuit Applications Conference, Nov. 9–12, 1992, Las Vegas, Nevada, pp. 1–4.

T. Kaylani and S. DasGupta, "A New Method for Initializing Radial Basis Function Classifiers," IEEE Int'l Conf. on Systems, Man, and Cybernetics, vol. 3, pp. 2584–2587 Oct. 1994.

Primary Examiner—Robert W. Downs
Attorney, Agent, or Firm—Charles W. Peterson, Jr.

[57] ABSTRACT

In a neural network comprised of a plurality of neuron circuits, an improved neuron circuit that generates local result signals, e.g. of the fire type, and a local output signal of the distance or category type. The neuron circuit which is connected to buses that transport input data (e.g. the input category) and control signals. A multi-norm distance evaluation circuit calculates the distance D between the input vector and a prototype vector stored in a R/W memory circuit. A distance compare circuit compares this distance D with either the stored prototype vector's actual influence field or the lower limit thereof to generate first and second comparison signals. An identification circuit processes the comparison signals, the input category signal, the local category signal and a feedback signal to generate local result signals that represent the neuron circuit's response to the input vector. A minimum distance determination circuit determines the minimum distance Dmin among all the calculated distances from all of the neuron circuits of the neural network and generates a local output signal of the distance type. The circuit may be used to search and sort categories. The feed-back signal is collectively generated by all the neuron circuits by ORing all the local distances/categories. A daisy chain circuit is serially connected to corresponding daisy chain circuits of two adjacent neuron circuits to chain the neurons together. The daisy chain circuit also determines the neuron circuit state as free or engaged. Finally, a context circuitry enables or inhibits neuron participation with other neuron circuits in generation of the feedback signal.

9 Claims, 34 Drawing Sheets

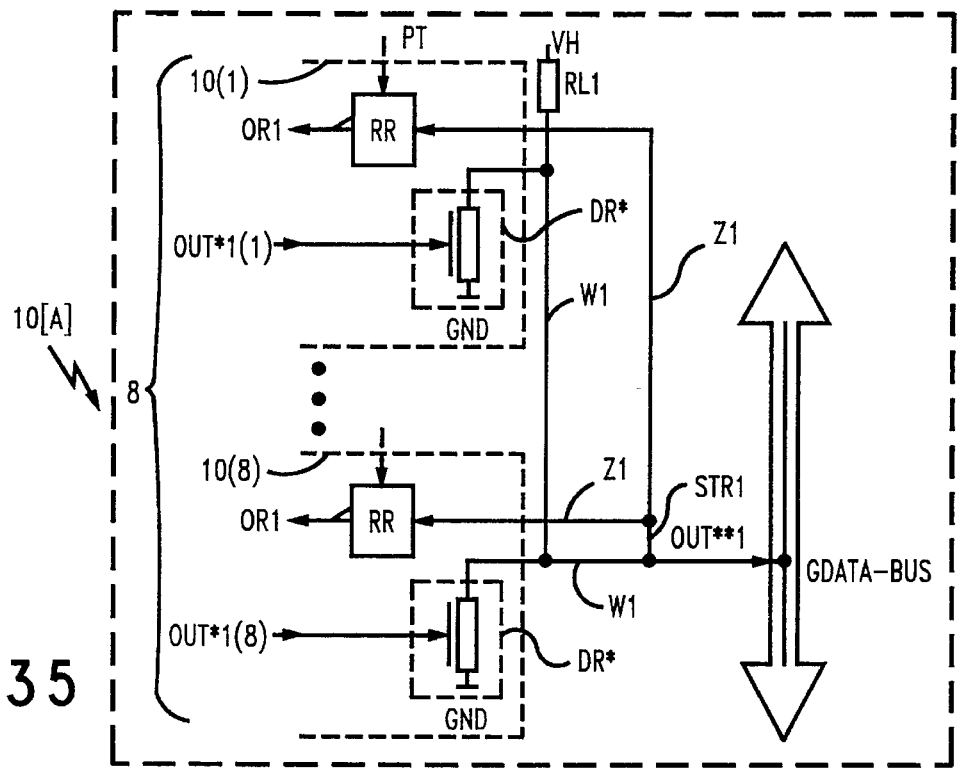

FIG. 35

FIG. 36A
$$\begin{vmatrix} OUT^*1 \\ \bullet \\ OUT^*k \\ \bullet \\ OUT^*p \end{vmatrix} = \begin{vmatrix} NOUT1\text{-}1 \ OR & \ldots & OR \ NOUT1\text{-}N \\ \bullet & & \bullet \\ NOUTk\text{-}1 \ OR & \ldots & OR \ NOUTk\text{-}N \\ \bullet & & \bullet \\ NOUTp\text{-}1 \ OR & \ldots & OR \ NOUTp\text{-}N \end{vmatrix}$$

FIG. 36B
$$\begin{vmatrix} OR1 \\ \bullet \\ ORk \\ \bullet \\ ORp \end{vmatrix} = \begin{vmatrix} OUT^*1(1) \ OR & \ldots & OR \ OUT^*1(8) \\ \bullet & & \bullet \\ OUT^*k(1) \ OR & \ldots & OR \ OUT^*k(8) \\ \bullet & & \bullet \\ OUT^*p(1) \ OR & \ldots & OR \ OUT^*p(8) \end{vmatrix}$$

FIG. 36C
$$\begin{vmatrix} \overline{OR1} = OUT^{}1 \\ \bullet \\ \overline{ORk} = OUT^{}k \\ \bullet \\ \overline{ORp} = OUT^{**}p \end{vmatrix} = \begin{vmatrix} \overline{OUT^*1(1)} \ AND & \ldots & AND \ \overline{OUT^*1(8)} \\ \bullet & & \bullet \\ \overline{OUT^*k(1)} \ AND & \ldots & AND \ \overline{OUT^*k(8)} \\ \bullet & & \bullet \\ \overline{OUT^*p(1)} \ AND & \ldots & AND \ \overline{OUT^*p(8)} \end{vmatrix}$$

NEURON CIRCUIT

FIELD OF INVENTION

The present invention relates to neural network systems and more particularly to neuron circuit designed to generate local (or neuron) result signals, e.g. of the fire type, and a local output signal essentially of the distance or category type at the neuron circuit level.

This neuron circuit does not require a supervisor or any software for operation. Finally, this neuron circuit is adapted for integration in VLSI semiconductor chips.

CO-PENDING PATENT APPLICATIONS

Neural semiconductor chip and neural networks incorporated therein, application Ser. No. 08/488,443, filing date Jun. 7, 1995 (attorney docket FR 9-94-006).

Daisy chain circuit for serial connection of neuron circuits, application Ser. No. 08/485,337, filing date Jun. 7, 1995 (attorney docket FR 9-93-033).

Circuit for searching/sorting data in neural networks, application Ser. No. 08/486,658, filing date Jun. 7, 1995 (attorney docket FR 9-93-032).

Circuit for precharging a free neuron circuit, application Ser. No. 08/485,336, filing date Jun. 7, 1995 (attorney docket FR 9-94-010).

BACKGROUND OF THE INVENTION

Table IV, appended hereto, is a cross reference of symbol mnemonics, notations and convention used herein with their corresponding definitions.

In the field of Optical Character Recognition (OCR), typically, a state of the art recognition technique comprises the use of a photohead essentially consisting of a matrix of photosensitive elements. When an OCR system is in its READ mode, the elements are scanned successively to generate signals that are representative of a certain parameter of the scanned character. Subsequently, the signals that are obtained during each scan are sampled and processed in a processing unit to identify the scanned character. The identification process is generally based upon a comparison between the scanned character and a prototype character model stored in a memory.

For example, FIG. 1 illustrates the capital letter "E" embedded in a 9×8 matrix of pixels. A first parameter representative of letter E could consist in counting vertical and horizontal numbers of dark pixels. A feature vector F'/can be defined representing letter "E" comprised of 17 components (or entries): $F'1, F'2, \ldots, F'16, F'17$ wherein $F'1=6, F'2=1, \ldots, F'16=2$, and $F'17=0$. A category (or class) C can also be defined by the user that is associated with this feature vector F as representing the letter "E". The category C could be, for example, the letter's order number in the alphabet, which is, therefore, 5. A second parameter that could be used as well is the number of dark pixels above and below line aa shown in FIG. 1. In this simpler case, the new feature vector F only has two components $F1=13$ and $F2=9$ instead of seventeen, but it still has the same category $C=5$. Also, although the capital letter "E" and the lower case letter "e" are represented by two different feature vectors (even more, if these letters are printed in various type fonts). They are both considered as belonging to the same category C. Thus, a certain relation or link is established between a feature vector F and a determined category C.

If the representation of capital letter "E" shown in FIG. 1 is taken as the ideal model of this letter, then during a preliminary learning phase, the two-component feature vector F of FIG. 1 is presented as an input vector to a conventional character recognition system and its two components stored therein in a memory. As soon as the components of the input vector F have been stored and a category C associated thereto (in the present instance $C=5$), the stored input vector F is thereafter referred to as a prototype vector P.

In FIG. 2(A), the prototype vector P is represented by point P with its two components P1 and P2 in a two dimensional space. This two-dimensional space is usually referred to as the feature (or characteristic) space. A defined zone Z (or domain) encompasses point P representing prototype vector P that may be used as a discriminating criteria by the OCR system. The OCR system compares the degree of similarity between the prototype vector P and any input (or incoming) vector A (or pattern) representing the character presented to the OCR system during the character recognition phase. The OCR system, subsequently compares the input vector A and the stored prototype vector P in order to determine their degree of similarity. This degree of similarity may be determined in a variety of manners, classicly by distance.

In determining the distance in the two-dimensional space of FIG. 2(A), an input vector A has two components A1 and A2, for consistency with the prototype vector P described above. The distance comparison between A and P can be made, for example, by determining the Euclidian distance AP, i.e. $AP^2=(P1-A1)^2+(P2-A2)^2$. Other distance calculation methods may be used, that each produce different zone shapes than a circle. In the two dimensional feature space of FIG. 2(A), the so-called Manhattan or city block distance (L1 norm) results in a lozenge shaped zone, while the square distance (Lsup norm) results in a square shaped zone.

Continuing the example of FIG. 2(A), the zone Z is represented simply by a circle centered at P with radius r. Radius r is commonly referred to as the influence field (or threshold) value of the prototype vector P. During the preliminary learning phase, the initial influence field value r is given, generally, by a default value r0 referred to as the Maximum Influence Field (MaxIF) as illustrated in FIG. 2(A). Normally, MaxIF is defined arbitrarily and empirically.

So, having stored the prototype vector E of FIG. 2(A), an input vector A, the same capital letter "E" but printed with a different type font, may be presented to the OCR system for recognition. If input vector A falls within circle Z, it is thus considered as "similar" to prototype vector P, and in turn, will be labelled with the same category C. (Prior art OCR systems assigned the category to the input vector during the recognition phase.) If, however, the input vector A falls outside the circle Z, then it is considered as "not similar" to the prototype vector P. Therefore, the category C cannot be assigned (or associated) to it by the OCR system. Instead, the input vector A is stored by the user as a new prototype vector with the same category C. Thus, the system stores input vector A as a new prototype vector P' with the category C assigned thereto, providing the extended zone (the shaded areas in FIG. 2(B)), circles Z and Z', which then define the category C.

A third input vector A, a capital letter "F", may be presented to the system and fall within circle Z of prototype vector P. However, letter "F" obviously belongs to another category. The category C of prototype vector P cannot be assigned to the third input vector A by the OCR system. As a consequence, circle Z, as originally drawn, must be shrunk to exclude this third input A. In others words, the radius r0 of the circle encompassing prototype vector P must be shortened, once the user decides that this third input vector A must be stored as a new prototype vector P" in FIG. 2C. This shrunk step is part of the so-called "reduction process" and is an essential aspect of prior art character recognition systems. After the input vector A has been stored as prototype vector P", the shortened radius of circle Z is obtained by reducing the initial radius r0=MaxIF to a value r less than or equal to distance PP". This reduced value r also constitutes the radius of circle Z" (r"=r). The actual (reduced) radius value r of prototype vector P is commonly referred to as the Actual Influence Field (AIF).

The two prototype vectors P and P" with their respective associated categories C and C" and influence fields r and r" are illustrated in FIG. 2(C). There is also a minimum value of the influence field, referred to as the Minimum Influence Field (MinIF). Under no circumstances, may the AIF of a prototype vector have a value lower than MinIF.

FIG. 2(D) shows a two dimensional feature space with three prototype vectors P, P' and P" with their respective influence fields r, r,' and r" and associated categories C, C', and C". When an input vector A is presented to the OCR system for recognition, the system calculates the distances AP=D, AP'=D' and AP"=D" and, then, determines the minimum Distance (Dmin) therefrom. If input vector A falls within one circle, e.g. circle Z (Dmin<r), it is recognized by the system and the category C is associated with it. However, if input vector A does not fall into any of the circles Z, Z' and Z", the input vector is not recognized and a category is not associated with it. If the user decides that this input vector A must be stored as a new prototype vector, then the user presents the input vector again to the OCR system, this time with a category, during a subsequent learning phase. The user decides which category is assigned to the new prototype vector, i.e., whether any of categories C, C' or C", or a new category. If the user decides to assign the category of the closest prototype vector (based on the calculation of the minimum distance Dmin), then the influence field of the new stored prototype vector is a value equal to Dmin, if Dmin<MaxIF or less than Dmin, i.e., MaxIF if Dmin>= MaxIF. In the example of FIG. 2(D), this minimum distance Dmin corresponds to distance D=AP. Finally, if input vector A falls within an overlapping zone, i.e. a common zone between two circles (not shown), the user not only determines the category assigned to the new prototype vector, but may also reduce the two overlapping influence fields. Thus, the user insures that one prototype vector (or the two prototype vectors P' and P") is (are) excluded from subsequent recognition in the vicinity of the new prototype vector.

Although FIGS. 2(A) to 2(D) show an input vector A with two components A1 and A2, it is understood that, generally, an input (or prototype) vector has n components, where n is an integer greater than 0. Thus, components A1, A2, ..., An are a general representation of input vector A. Therefore, in n dimensional feature space, the circle Z in FIG. 2(A) is an hypersphere. So, the computed distance is the distance separating the center of the hypersphere representing the stored prototype vector and the point representing the input vector. The MaxIF value corresponds to the largest allowed radius of a hypersphere at initialization. Similarly, the MinIF value corresponds to the smallest radius allowed for a hypersphere in the course of the reduction process. For distance calculation methods that are different than the Euclidian method mentioned above, the equidistant points are not on an hypersphere but, instead, on a polyhedral volume. However, a polyhedral volume is referred to as an hypersphere hereinafter for simplicity. Each input vector component, which represents a certain analog value, is coded in binary on m bits, and may, therefore, be represented by an m bit binary word a0 ... am-1.

For example, referring again to the two component input vector A representing capital letter "E" of FIG. 1, the first vector component A1 is equal to 13. With m=4, A1 is then represented by the binary word consisting of a0=1, a1=1, a2=0, and a3=1, i.e. A1=1101.

Prior art computer-based character recognition systems, after being presented with an input vector, automatically can compare the input vector with previously learned prototype vectors of the feature space to determine the input vector's category or class. Such a system has been implemented on Von Neuman processor based computers using neural algorithms (software emulation). These neural algorithms attempt to emulate neurons such as those found in the brain, for improved pattern recognition. However, because in prior art neural networks, the calculation process is sequential in accordance with the instructions of a software program, the processing time is long.

A biological neural network utilizes nerve cells or synapses as the units thereof. A biological neural network has an extremely high number of these interconnected synapses. The synapses in the network execute calculations in a parallel, so that the overall processing time is very short. Furthermore, the functions of biological neural networks are learned by changing the behavior of synapses and connection states therebetween during learning. Neural computers use neural networks constructed by assembling a limited number of electronic neuron circuits to mimic the nervous systems of living bodies.

Neural computers are capable of pattern processing, useful for operations such as character recognition, voice recognition, process optimization, robot control and the like. Neural computers are most suited to realizing functions with processing procedures that are difficult to state as formal rules. When such neural computers are taught, i.e., operated while conducting learning, even if the taught functions change over time, the neural computer is capable of adapting for such changes.

In addition, neural computers are inherently reliable because neural networks in such neural computers are constructed by interconnecting identical base neuron circuits, so that a failure in one neuron is easily repaired. The failed neuron circuit is simply replaced with another, normally functioning neuron in the neural network. As a result, it is possible to create neural networks with a near immunity to defective neurons or neuron failures. This immunity is very important for VLSI semiconductor chips.

Different neural network architectures, such as the standard Radial Basic Function (RBF) technique are known. The RBF technique is described in the article "A high performance adaptive classifier using radial basis functions" by M. Holler, et al, Microcircuit Applications Conference Nov. 9–12, 1992, Las Vegas, NV. An RBF neural network has a three layer structure. The first layer, which includes the input terminals, is called the input layer or input neuron layer. The second or hidden layer is formed by the neuron circuits themselves. The third layer or neuron output layer receives the second layer neuron circuits' outputs as inputs. Each neuron circuit has weight coefficients (known as synaptic weights) that are related to the components of the neuron's stored prototype vector. Input signals on the input terminals of the first layer are applied in parallel to all the neuron circuits of the second layer for processing. Recognition processing, as described hereinbefore, includes determining the distances between the input vector and all of the prototype vectors of the neural network so that certain neuron circuits react if there is a match (fire) or do not fire if there is no match. Each neuron circuit of the second layer generates a signal that is an input to only one output neuron of a determined category.

FIG. 3(A) shows such a conventional three layer neural network 2 comprised of ten RBF type neuron circuits N1 to N10. The first layer consists of two input neurons I1 and I2 adapted to receive an input vector A comprised of two components A1 and A2. This first layer totally interconnects with each second layer neuron circuit N1 to N10. Each second layer neuron circuit N1 to N10 can be potentially related to only one third layer output neuron O1, O2 or O3. During the learning phase, the prototype vectors are stored in the second layer neuron circuits N1 to N10 (one prototype vector stored per neuron circuit) in a R/W memory usually referred to as the weight memory. Prior to the learning phase, the weight memories are initialized with random weights and the neuron circuits are "free". As soon as a prototype vector is stored in a second layer neuron circuit N1 and N10 and a connection is established between that second layer neuron circuit and a third layer output neuron, i.e. a determined category has been assigned to that prototype vector, this second layer neuron circuit having thus "learned" is designated "engaged" and is no longer considered free. For example, neuron circuits N2, N5 and N8 (which are associated to the same category C2 through single output neuron O2) are engaged. Similarly, other neuron circuits are associated with categories C1 and C3. Neuron circuit N10 is still free. No category has been associated with N10 because it has not learned. The feature space depicted in FIG. 3(B) represents that of the neural network 2 of FIG. 3(A) (only free neuron circuit N10 is not illustrated). The nine circles illustrate the influence fields of the nine prototype vectors stored in neuron circuits N1 to N9. They are organized in three groups of 2, 3 and 4 neuron circuits, respectively, pertaining to categories C1, C2 and C3.

As indicated above, the value of the influence field of a determined neuron circuit may be reduced in the reduction process during a learning phase. However, under no circumstances is the influence field value allowed to reach a value equal to or less than the MinIF value. Should the influence field value fall below MinIF during the reduction process, the neuron circuit is said to be "degenerated". So, in a neural network, every neuron circuit is either free or engaged. In addition, the actual influence fields associated to the prototype vectors of a same category may be different. A determined category may be represented by one or by several prototype vectors, that may or may not be adjacent, and may or may not overlap. Depending upon how the input vector is mapped in the two-dimension feature space of FIG. 3(B), the comparison with all the stored prototype vectors, during a recognition phase, may provide ambiguous results. An input vector, presented to the neural network 2, is compared with all the prototype vectors in the feature space. Each second layer neuron circuit calculates the distance between the input vector and the neuron's stored prototype vector. If the input vector falls within the influence field of a prototype vector, the category attached to the prototype vector is assigned to the input vector. If the input vector falls within the influence fields of several prototype vectors with the same category, then again, that common category is assigned to the input vector. In both cases, an input vector has been recognized by the neural network as being in a single category and, so, is "identified". However, should the input vector fall within the influence fields of at least two prototype vectors belonging to different categories but with overlapping influence field, the network response is ambiguous. The input vector is recognized (at least twice) but not identified because a single category cannot be assigned to it (or associated with it), therefore, the input vector is "undefined" or "uncertain".

In all the above cases, the corresponding neuron circuits which have recognized the input vector are said to have "fired" or "triggered." When a neuron fires, a fire signal F is set active (F=1). If during recognition, an input vector does not fall within the influence field of one neuron circuit of the neural network, every neuron's fire signal F remains inactive (F=0).

Neuron responses that are generated at the neuron circuit level is known as "local" or "neuron" responses. The neural network's responses are known as "global" or "neural" responses. Local responses first include local result information (e.g. a neuron circuit generates a local result fire signal) and local status (e.g. whether a neuron circuit is in a degenerate status) referred to hereinbelow as local results. Local information responses (e.g. distance or category data) are referred to hereinbelow as local data. Likewise, global responses include global results (e.g., as a neural network identifies an input vector, in response, a global result signal is generated) and global output data (e.g. the minimum of all local distances Dmin). Therefore, local data, representative of the local reaction of an individual neuron circuit to the presentation of the input vector, are "consolidated" to produce global data.

Prior art neural networks of the type illustrated in FIG. 3(A) have been extensively used in the industry so far. However, prior art neural network architectures and the prior art neuron circuits employed therein have many limitations and disadvantages.

First, conventional prior art neural networks are in limited complexity because without extra logic, the number of cascaded neuron layers is limited. Limited network complexity means limited network function. However, to overcome this limitation and increase the number of neuron layers in a neural network, extra circuitry must be added. This additional circuitry adds processing delays that slows the neural network's performance and consumes space. Further, circuits, external to the network, hinder the network speed, flexibility and learning capacity. Thus, the neural network size that can be implemented on a single Very Large Scale Integration (VLSI) chip is limited. Therefore, there is a need for increasing the number of layers of neuron circuits that may be included in a neural network. There is also a need to reduce or eliminate any requirement for external circuits in neural networks or in the expansion thereof.

Another limitation of prior art conventional neural networks is that they are not autonomous. A digital computer, typically a micro-controller or a dedicated micro-processor must supervise the neural network in order to formulate any global results. See, for example, U.S. Pat. No. 5,165,010, to Masuda, et al entitled "Information Processing System" and, especially FIG. 23 therein for an example of a micro-controller supervising a neural network formed from a plurality of neuron circuits. The neural computer system described therein is organized with the same parallel architecture as in a conventional micro-controller. Data is exchanged on a data bus between the neuron circuits and the micro-controller, with addresses on a standard address bus.

In conventional prior art neural networks, the neuron circuits are totally passive and communicate only with the micro-controller. There is no direct data communication or exchange between individual neuron circuits in the neural network. In addition, because these prior art neural network computers are software controlled, the recognition or the learning phase may each be lengthy, complex operations.

Another disadvantage of conventional neural network chips is that the number of input/output pads is dependent on the number of neuron circuits integrated therein. Increasing the number of neurons require increased address capacity. However, increased address capacity requires more chip input/output (I/O) pads. So, since there is a maximum number of I/O pads, for any chip, the number of I/O pads available for addresses is limited. This limitation limits the number of neurons per chip. For the same reason, the number of I/O pins of the electronic neural modules incorporating multiple such neural network chips is determined by neuron addressing requirements.

The number of categories that are available in such conventional neural networks also is limited. For example, see U.S. Pat. No. 4,326,259 to Cooper, et al., entitled "Self-Organizing General Pattern Class Separator and Identifier" which teaches a neural network wherein the neuron circuits are arranged in a column. The neuron circuit outputs feed the horizontal input lines of a PLA, with vertical PLA lines providing the categories. From FIG. 8 of Cooper, it is clear that the number of categories is limited, for several reasons. In particular, the number of categories is limited because the result must be interpreted by the user. Also, the global information relating to the formal identification of the input vector by the neural network is not generated directly. The user has to interpret the results, whether one neuron fires or several neuron circuits fire.

Another limitation of prior art neuron circuit architecture is that a category, such as C1, C2 or C3, attached to each output neuron of the neural network 2 of FIG. 3(A), cannot be attached at the neuron circuit interconnection level. Particular neuron circuits cannot be selectively blocked from participating in the recognition phase for a determined family of input vectors. This prior art approach is inflexible. It does not permit organizing the neural network either as a single network or as subsets thereof, as the user might desire.

Finally, for these prior art neural networks, recognition and learning must be done at different times. Generally, prototype vector weights are determined separately, by the micro-controller and, subsequently, loaded into neuron circuits, until the micro-controller decides that the learning phase is completed. As a consequence, the recognition and the learning phases cannot be done concurrently and are clearly distinct operations. In conventional neural networks, training a neuron involves adjusting the weights, which, usually, are set randomly at initialization. Once the weights are adjusted, input vectors are supplied to the neural network and outputs (responses) are observed. If an output signal is erroneous, then a mathematical computation is done to determine how the weights should be adjusted. After adjusting the weights, the input vectors are resupplied and the neural network's response to each is re-evaluated until it is correct. In the prior art systems, such as in U.S. Pat. No. 5,222,193 to Shaefer entitled "Optimization Techniques Using Genetic Algorithms" training a neural network requires a Personal Computer Personal Programmer (PCPP) connected to a host computer through a Generic Universal Programmer Interface (GUPI).

These disadvantages may be better understood in light of the neural network 2 of FIG. 3(A). For example, with respect to the determination of the minimum distance Dmin between an input vector and the prototype vectors stored in neuron circuits N1 to N9: Typically, the micro-controller interrogates the first neuron circuit for the distance it has computed; Then, the micro-controller interrogates the second neuron circuit for the distance it computed; and, finally, the micro-controller compares the two distances, selecting the lowest value. This process is continued, in sequence, by successive iterations until the last neuron circuit has been interrogated. The minimum distance value between the input vector and all the prototype vectors is determined only at the end of the process. So, the above-described reduction process is delayed until after the last neuron is interrogated.

A similar technique is applied during the reduction process. Successive iterations are conducted to exclude any neuron circuits that have wrongly fired until only the neuron circuit with the correct category remains. This prior art method requires a dedicated software program, based upon a complex sorting algorithm. The sorting algorithm, typically, requires a significant number of lines of instructions for the interrogation and comparison steps. So, the sort process is very time consuming. Further, because intercommunication between the neuron circuits of the neural network 2 is restricted, potential correlations between each local result signals and between the global result signals cannot be fully exploited. As a consequence, the conventional neural network of FIG. 3(A) only provides limited global information data to the user. In addition, the number of categories that are available at the output neuron level is limited also by neuron fan-out (electrical) limitations.

SUMMARY OF THE INVENTION

In a neural network comprised of a plurality of neuron circuits, an improved neuron circuit architecture that generates local (or neuron) result signals, e.g. of the fire type, and a local (or neuron) output signal essentially of the distance or category type is disclosed hereunder. First of all, a multi-norm distance evaluation circuit calculates the distance D between the input vector A and the prototype vector B stored in a R/W (weight) memory circuit. An IF circuit is adapted to store or transmit the distance D signal, the actual influence field AIF of the stored prototype vector and the lower and upper limits thereof (respectively referred to as the minimum influence field MinIF and the maximum influence field MaxIF) or a feedback signal. A distance compare circuit compares the distance D signal with the signal outputted from the IF circuit to generate first and second intermediate signals, wherein said first signal is active in the recognition mode if D<AIF and said second signal is active in the learning mode if D<=MinIF. A category register stores the local category C signal assigned to the stored prototype vector. An identification circuit receives the said intermediate result signals, the input category signal CAT, the local category signal C and the feedback signal OR to generate the local result signals which represent the response of the neuron circuit to the presentation of an input vector. A minimum distance determination circuit which receives the local category signal, the distance D signal and the feedback signal is adapted to determine the minimum distance Dmin (category Cmin) among all the distances (categories) calculated by the neuron circuits of the neural network to generate a local output signal of the distance (or category) type. The feed-back signal is collectively generated by all the neuron circuits of the neural network. Typically, the feed-back signal is the result of ORing all the local distances or categories. A daisy chain circuit connected to the corresponding daisy chain circuits of the two adjacent neuron circuits is adapted to determine the neuron circuit state: free or engaged. Moreover, it identifies the first free neuron circuit, which is the ready to learn neuron circuit by construction. A context circuitry is also implemented in the neuron circuit architecture that is capable to allow the neuron circuit to participate or not with the other neuron circuits of the neural network in the generation of the said feedback signal.

OBJECTS OF THE INVENTION

Therefore, it is primary object of the present invention to provide a neuron circuit that generates both local result signals, e.g., of the fire type, and a local output signal of the distance or category type.

It is another object of the present invention to provide innovative neuron circuit architectures that are well adapted for integration in VLSI semiconductor chips.

It is another object of the present invention to provide innovative neuron circuit architectures including a multi-norm distance evaluator circuit in each neuron circuit for calculating the distance between the input and the prototype vector associated thereto according to a norm that is user selectable.

It is another object of the present invention to provide innovative neuron circuit architectures including a R/W memory circuit in each neuron circuit for storing the components of the prototype vector associated thereto.

It is another object of the present invention to provide innovative neuron circuit architectures including a pre-charge circuit in each neuron circuit for storing the input vector components in the R/W memory circuit of the ready to learn neuron circuit during the recognition phase.

It is still another object of the present invention to provide innovative neuron circuit architectures including an identification circuit in each neuron circuit that is designed to generate the local result signals for each neuron circuit.

It is still another object of the present invention to provide innovative neuron circuit architectures including a daisy chain circuit in each neuron circuit that is designed to distinguish between the two states of a neuron circuit, i.e. engaged or free.

It is still another object of the present invention to provide innovative neuron circuit architectures including a minimum determination circuit in each neuron circuit that is designed to cooperate with similar circuits of other neuron circuits to determine the minimum distance Dmin and then to sort the remaining distances in an increasing order.

It is still another object of the present invention to provide innovative neuron circuit architectures including a minimum determination circuit in each neuron circuit that is designed to cooperate with similar circuits of other neuron circuits to determine the minimum category Cmin and then to sort the remaining categories in an increasing order.

It is still another object of the present invention to provide innovative neuron circuit architectures including a context circuitry in each neuron circuit that is designed to allow or not the selection of the neuron circuit.

It is still another object of the present invention to provide innovative neuron circuit architectures including a category register in each neuron circuit that is designed to store a category number which, as least theoretically, is not limited.

It is still another further object of the present invention to provide innovative neuron circuit architectures whose granularity is of one neuron circuit, so that said architectures are perfectly adapted to build full growable macros in semiconductor chips.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

BRIEF DESCRIPTION OF THE DRAWINGS

FIG. 35 is a schematic block diagram of the driver circuits for the first bit of the global output signals in an example wherein eight base neural chips of FIG. 34 are assembled to form an elementary module.

FIG. 36 is comprised of parts (A), (B) and (C) wherein: Part (A) depicts the logic relation between the OUT* and the NOUT signal; Part (B) depicts the logic relation between the OR signal and the OUT* signal; and finally, part (C) depicts the logic relation between the $\overline{OR}$/OUT* signals and the $\overline{OUT^{**}}$ signal for each bit thereof.

DESCRIPTION OF THE PREFERRED EMBODIMENTS

Description of the Preferred Neural Networks Chip Architecture

A prototype of a neural chip according to the present invention has been manufactured in a conventional 1 μm CMOS technology. In this chip, thirty-six neuron circuits have been integrated in a silicon substrate from a total of about 400000 transistors. These neuron circuits have an innovative architecture and each generate result signals and output signals. The preferred invention as described herein is being used in a Zero Instruction Set Computer (or Classifier) (ZISC). ZISC a registered trade mark of IBM Corporation. As a consequence, this system is fundamentally different from the standard Complex Instruction Set Computer (CISC) or Reduced Instruction Set Computer (RISC) because it does not require a set of instructions for operation.

In the prototype chip, the number n of vector components ranges from 1 (the minimum number) to 64 (the maximum number). The number m of bits for coding each component is 8. The input data interface is through a 16-bit bi-directional bus. L1 and Lsup norms described above, are selectable for calculating the distance with 14 bit accuracy. The maximum number of contexts and of categories is 127 and 16384 respectively, as they are, 7 and 14 bits, respectively. MaxIF and MinIF, which correspond to the radius values of the largest and smallest influence fields, are also coded on 14 bits. At initialization of the base chip, these values are equal to 010 ... 00 (i.e. $2^{}13=8192$) and 00 ... 10 (i.e. $2^{}1=2$), respectively, and are default values determined empirically and arbitrarily.

* THE BASE NEURAL NETWORK CHIP ARCHITECTURE *

Figure 1:
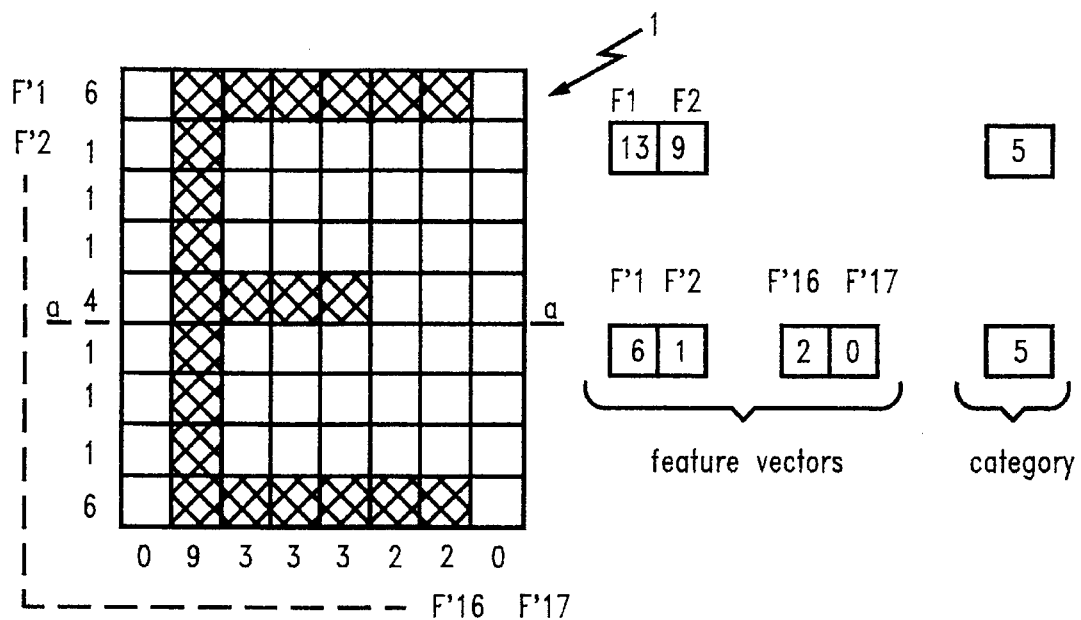
FIG. 1 shows the capital letter "E" embedded in a 9×8 matrix of pixels.
Figure 3A:
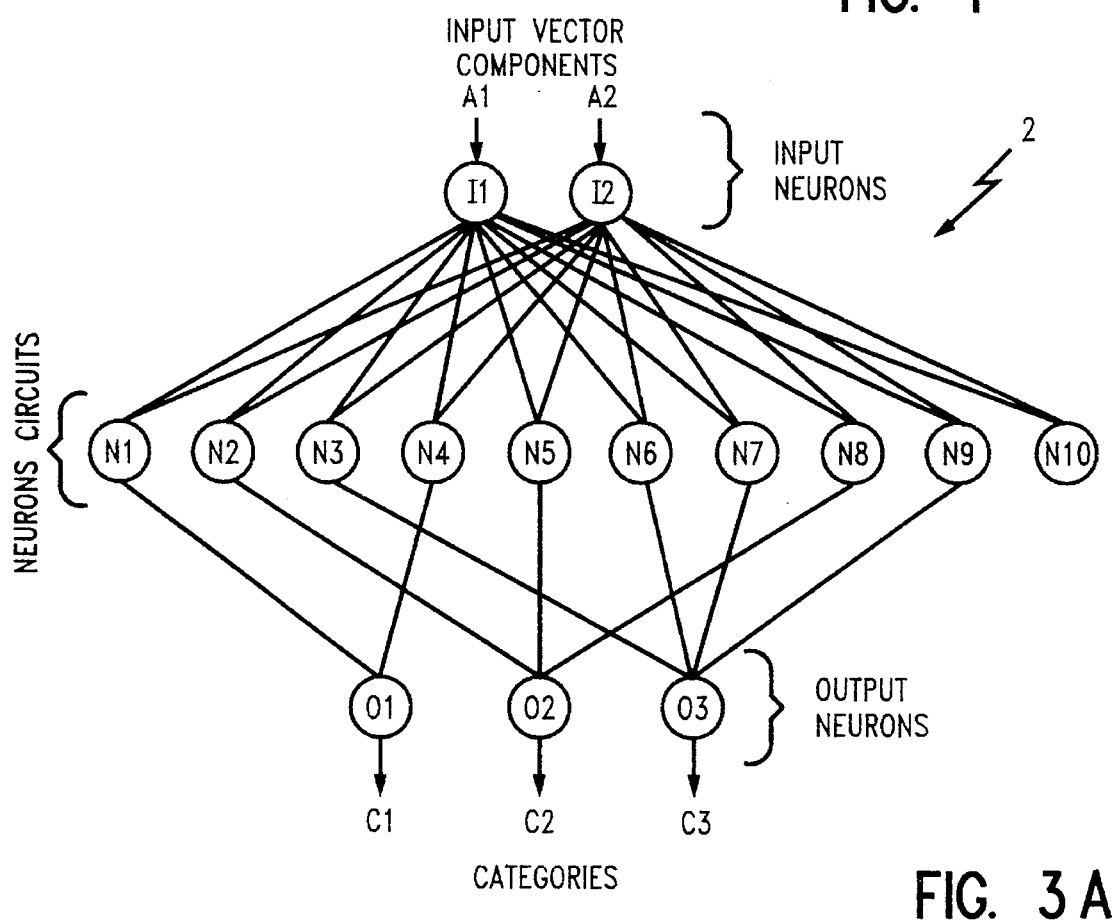
FIG. 3(A) shows a conventional RBF three layer neural network architecture comprising ten neuron circuits adapted to process two-component input vectors for classification into three categories.
Figure 2A:
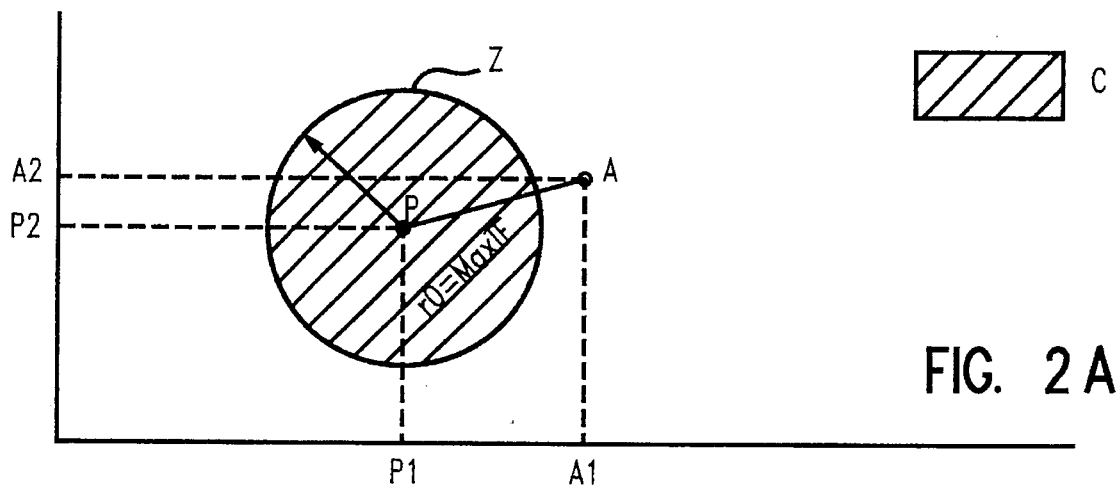
FIG. 2(A) shows a single prototype vector and its influence field illustrated by a circle.
Figure 2B:
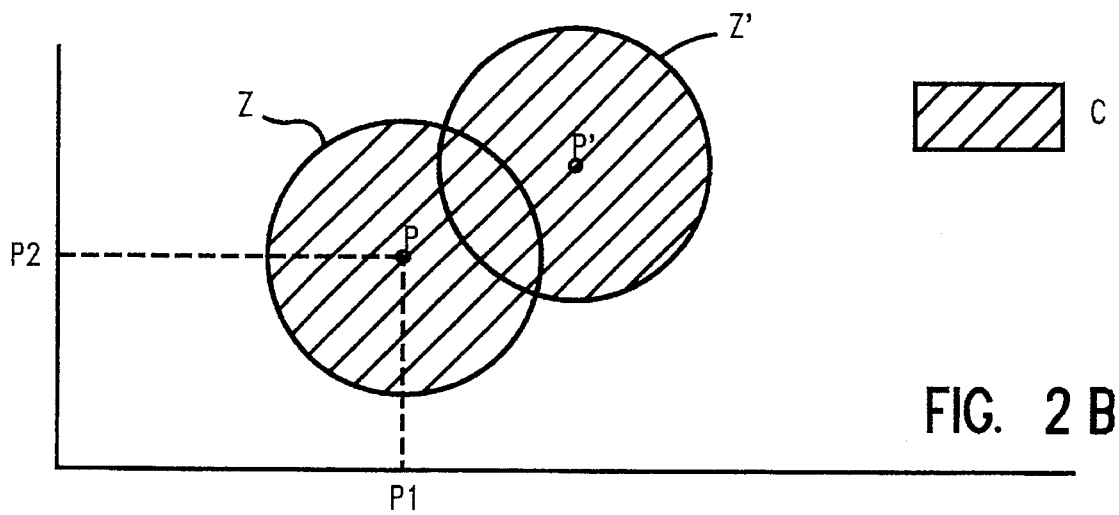
FIG. 2(B) shows two prototype vectors with the same category C.
Figure 2C:
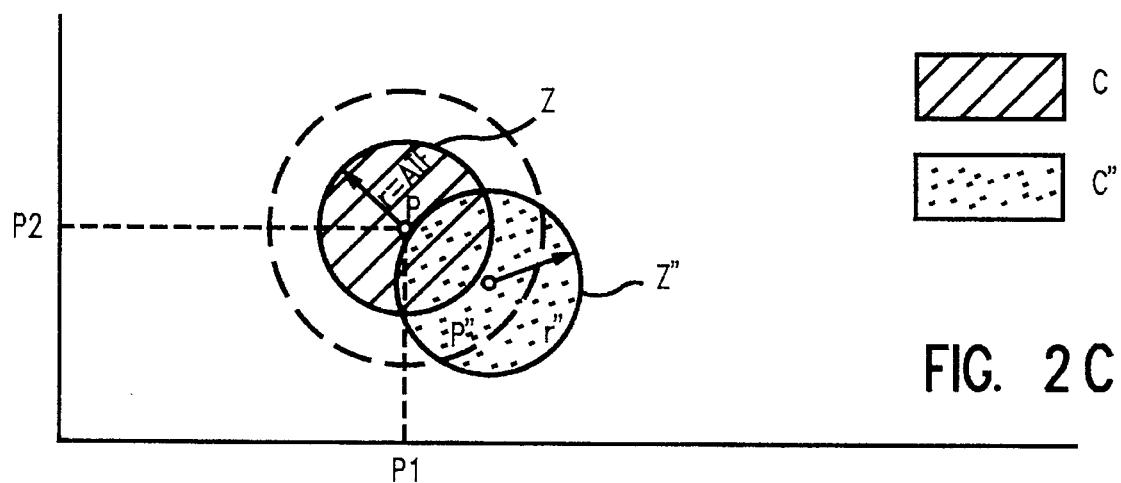
FIG. 2(C) shows two prototype vectors with different categories illustrating the basis of the reduction technique.
Figure 2D:
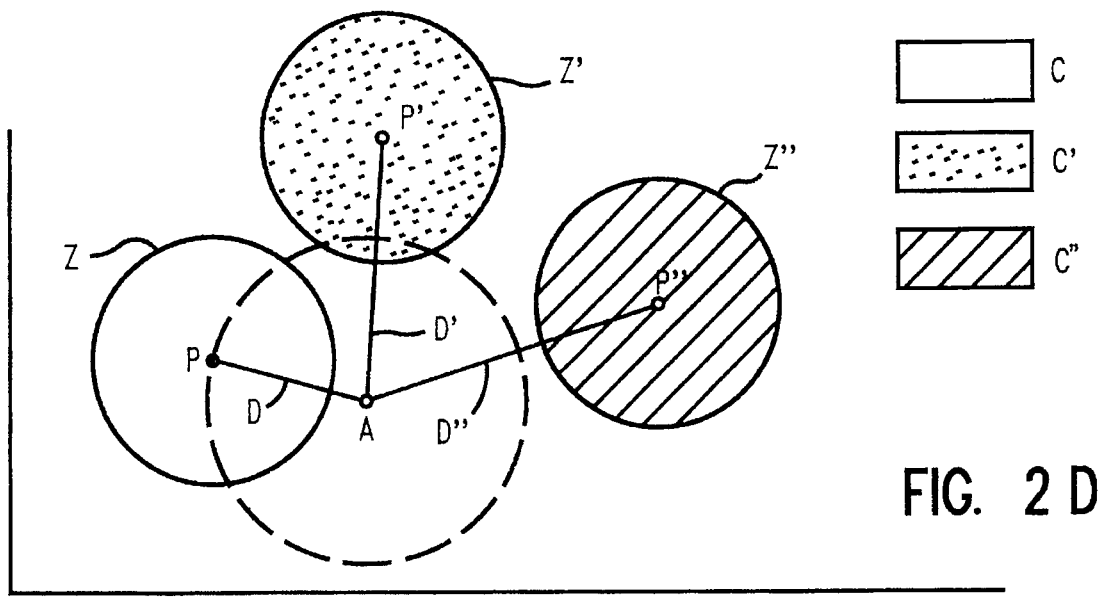
FIG. 2(D) shows three different prototype vectors with different categories to illustrate the distance between vectors in two-dimensional feature space.
Figure 3B:
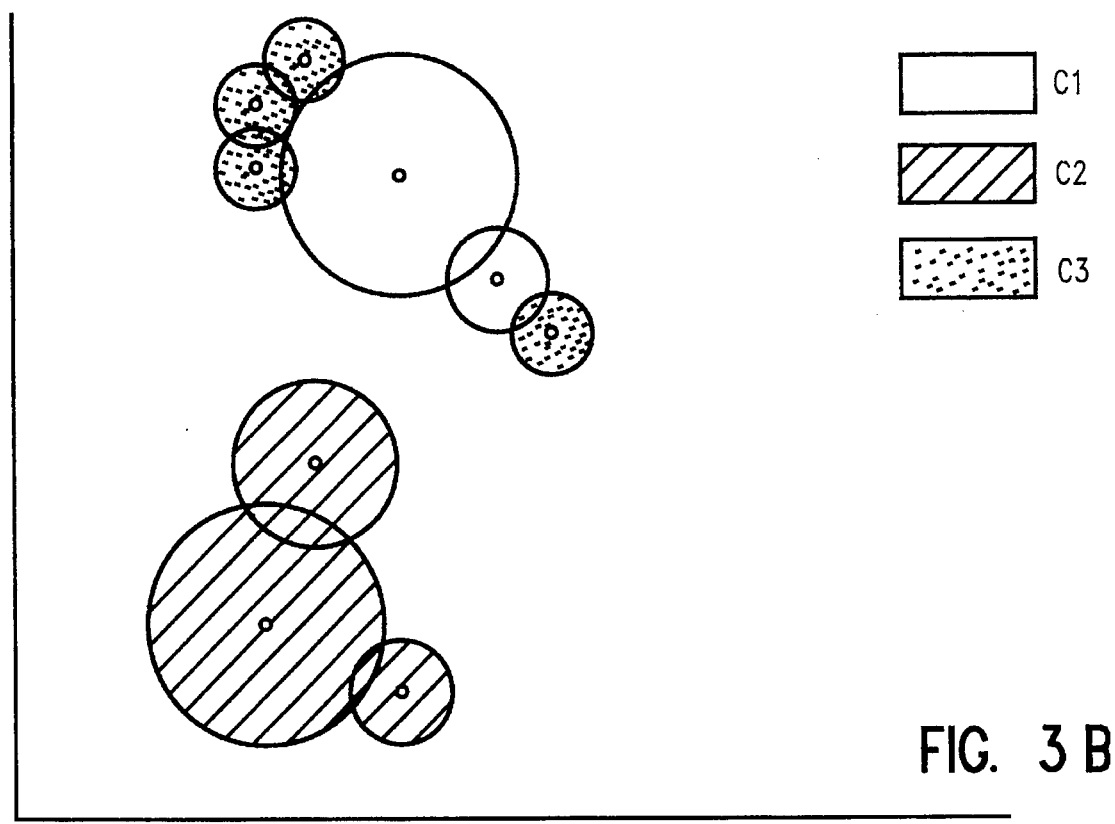
FIG. 3(B) shows an example of the feature space representation of the neural network of FIG. 3(A).
Figure 4A:
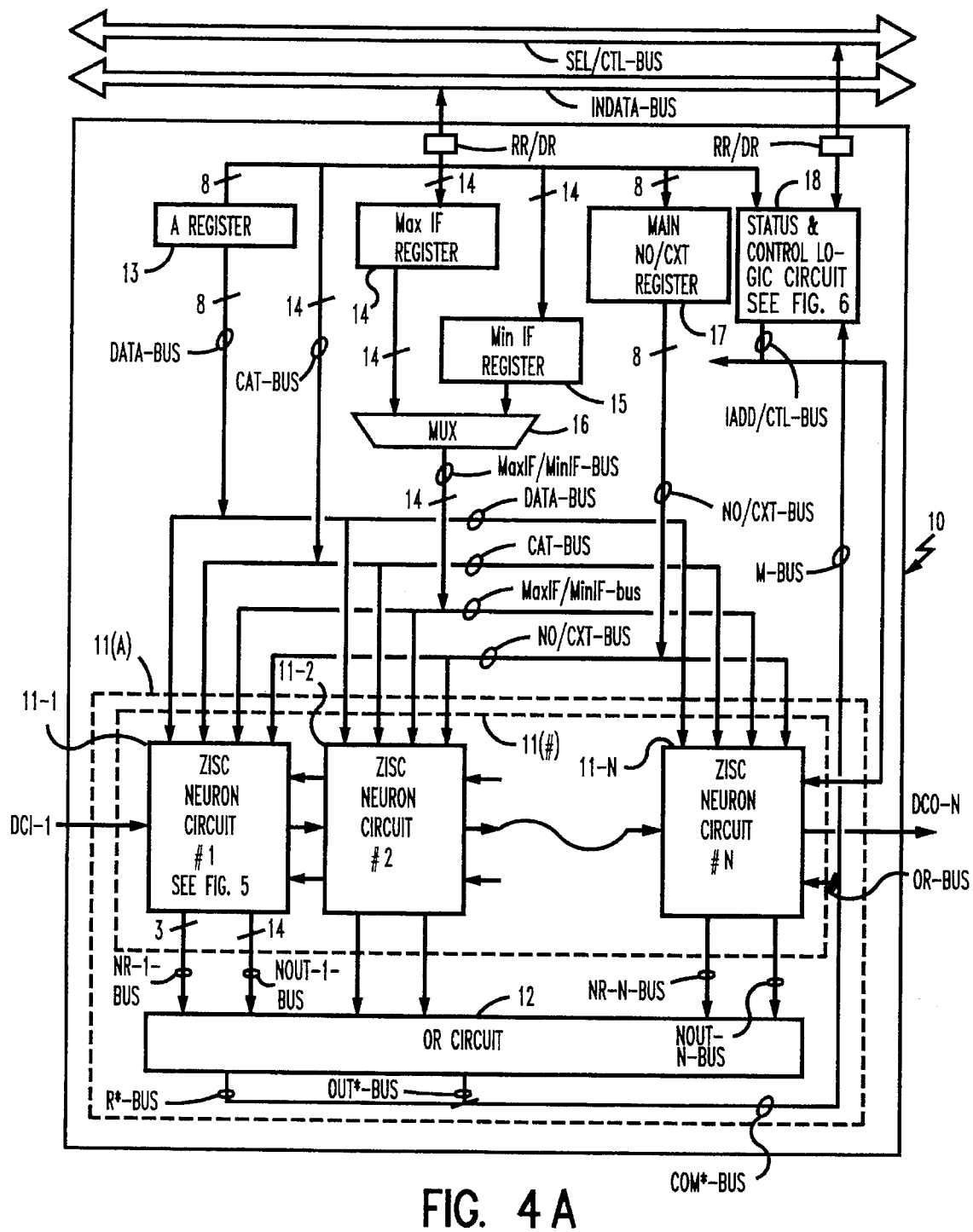
FIG. 4(A) is a schematic block diagram of a stand alone base neural semiconductor chip and the neural network that is incorporated therein according to the present invention.

FIG. 4(A) is a schematic block diagram of the architecture of a base neural network chip 10 according to a first preferred embodiment of the present invention. The base chip 10 architecture includes a plurality of neuron circuits 11 for generating a local (neuron) result and local (neuron) output data and incorporates a neural network 11(A) according to the present invention. The single chip architecture illustrated in FIG. 4(A) is for stand-alone applications. The neuron circuits 11-1 to 11-N, together, form a neural unit 11(#). As is apparent from FIG. 4(A), all the neuron circuits 11-1 to 11-N are linked together serially, to form a chain. In the preferred embodiments, all neuron circuits are identical. As described hereinbelow, neuron circuits and the neuron circuit's architecture are identified, interchangeably, by numeral 11 (or 11-i as the case may be). The preferred neuron circuit 11 is described hereinbelow in more details by reference to FIG. 5. Similarly, the base chip and the base chip architecture are identified, interchangeably, by the numeral 10.

The neural network 11(A) is, basically, a Neural Unit 11(#) and inter-neuron communication system on a single base chip 10. According to the stand alone chip 10 embodiment of FIG. 4(A), the inter-neuron communication system is block 12 and an on-chip common communication bus labelled COM*-BUS, also described in more detail hereinbelow. All the blocks of FIG. 4(A) are circuits that can be easily integrated on a silicon substrate to form a VLSI IC chip.

In the following description, for simplicity, in addition to notations used hereinabove and in Table IV, a hyphen designates an individual neuron circuit (e.g. 11-i). For consistency, where appropriate, this same convention is followed for internal circuitry for each individual neuron circuit (e.g. search/sort circuit 502-i) and signals (e.g. NOUT-i). Global signals and related buses that result from ORing, e.g., in OR circuit 12, are labelled with a single asterisk (e.g. OUT* and OUT*-BUS in FIG. 4(A)). Additional asterisks indicate additional layers of ORing. So, for example, at the output of driver circuits DR* of block 19 in FIG. 4(B), global result signals and output buses are labelled with two asterisks (e.g. OUT and OUT-BUS). Parentheses are used to indicate a group of chip related circuitry. For example, the base neural network in the base chip 10 of FIG. 4(A) is identified by reference 11(A).

Advantageously, unlike prior art neural networks and neural network chips, the base chip 10 does not require micro-controller supervision for the neural network 11(A). Therefore, an instruction set is also not required. Optionally, however, a micro-controller (or a micro-processor) may be used with the base chip 10, to provide input vectors (and categories) to the neural network 11(A) and to receive the chip's global response. However, because of the architecture of the present invention, these operations could be performed, alternatively, by a person as well, through manually operated switches. For convenience, these operations are referred to herein as WRITE and READ operations.

Certain blocks of the base chip 10 are connected to a user/micro-controller by a 16-bit bidirectional input data bus labelled INDATA-BUS (connected to the I/O bus of the micro-controller, if any) and by selection and control signals on a SEL/CTL-BUS. A conventional input 16-bit register (not shown, referred to hereinafter as DATA register) latches data on the INDATA-BUS at every cycle. A black box in the figures represents conventional receiver RR, driver DR or receiver/driver RR/DR circuits that interface the base chip 10 with the external signals.

An 8-bit A register 13 is loaded from the DATA-BUS with the input vector. This A register 13 is optional in asynchronous mode and is required only for synchronous (BURST mode) operation of the base chip 10. In addition to the input vector data, different set-up parameters (such as MaxIF and MinIF values) and input data (such as the input category, input context and norm) are also latched in dedicated registers 14, 15 and 17 of the base chip 10. Blocks 14 and 15 are 14-bit registers which are loaded at initialization with the Maximum Influence Field (MaxIF) and the Minimum Influence Field (MinIF) values, respectively. The MaxIF value is the maximum value that the influence field of a prototype vector may have. MinIF is the smallest influence field value. In the preferred embodiment base chip 10, the MaxIF and the MinIF values are mutually exclusive and, so, are never used together. Therefore, the respective outputs of registers 14 and 15 may be connected to the inputs of a two-way multiplexer 16, the output of which is the 14-bit MaxIF/MinIF-BUS. The main NO/CXT register 17 is an 8-bit register for storing the input norm and context data. The main NO/CXT register's 17 output is the NO/CXT-BUS and is 8-bits wide. The input norm and context data are described in detail hereinbelow. The input category data CAT are on a specifically dedicated part of the INDATA-BUS referred to as the CAT-BUS which is 14-bits wide.

Control signal distribution lines to the individual blocks of FIG. 4(A) have been omitted for simplification. Most of these control signals are generated in Status and Control Logic Circuit 18, which includes substantially all of the control logic circuits for controlling the base chip 10. The four internal busses, the DATA, CAT, MaxIF/MinIF and NO/CXT buses are parallel inputs to each of the neuron circuits 11-1 to 11-N. The width of each of above mentioned buses is included for illustration only, and not intended as a limitation.

Figure 5:
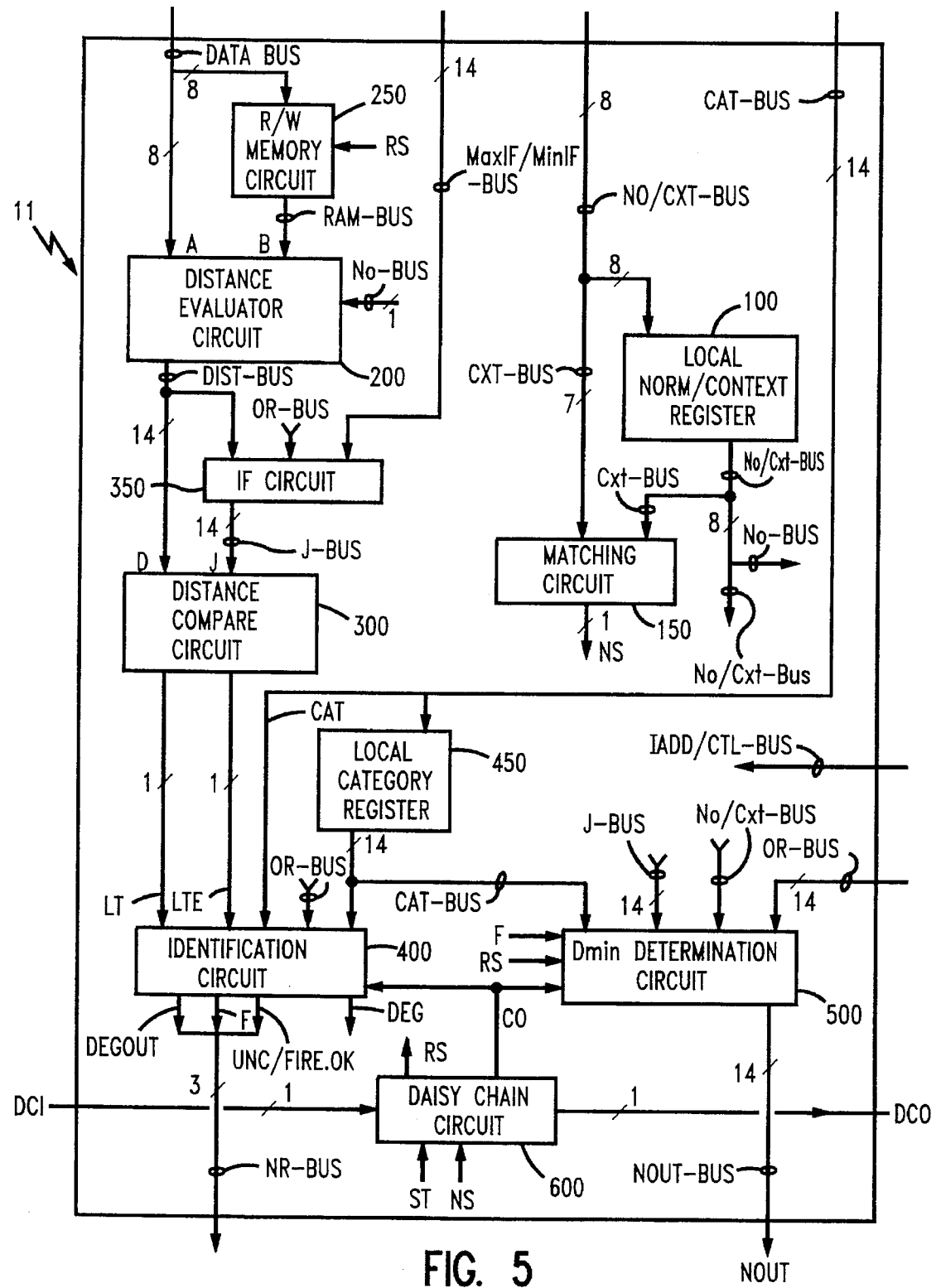
FIG. 5 shows the schematic block diagram of the preferred neuron circuit of FIGS. 4(A) and 4(B) according to the present invention.

FIG. 5 is a block diagram of a preferred individual neuron circuit 11 according to the present invention. As is apparent from FIG. 5, the NO/CXT-BUS provides a parallel input to local norm/context register 100 and to a first input of Matching Circuit 150. Matching Circuit 150 is a conventional matching or compare circuit of standard XOR and OR gates. The NO/CXT-BUS includes a 1-bit norm input signal and a 7-bit context data input from a micro-controller/user and which is stored in the local norm/context register 100, referred to hereinafter, as the local norm and context data. The norm/context register 100 outputs are labelled No for the local norm and Cxt for the local context. These outputs are on the No/Cxt-BUS, which has two parts: a 7-bit Cxt-BUS which is a second input to matching circuit 150 and a 1-bit No-BUS which is connected to Distance Evaluator Circuit 200, also referred to, hereinafter, as the multi-norm Distance Evaluator Circuit 200.

According to the present invention, the micro-controller/user decides whether an input vector A should be learned by the neural network 11(A). However, once that decision is made, the neural network 11(A), itself, decides whether reduction of an AIF value is needed. In general, an AIF value must be reduced either because engaged neuron circuits have wrongly fired or, because a free neuron circuit 11 should be engaged. At the end of the engagement process, the contents of the newly engaged neuron's norm/context register 100 is automatically loaded from the NO/CXT-BUS with the contents of the main NO/CXT register 17. Afterwards, in a subsequent recognition, the main NO/CXT register 17 may be changed and, therefore, may differ from the newly engaged neuron's norm/context register 100.

Different input vector types are distinguished by differences between both the local norm (No) and the input norm (NO) and between the local context (Cxt) data, stored in the neuron's local norm/context register 100, and the context (CXT) data in main NO/CXT register 17. For instance, the context data may distinguish between two input vector families, one representing the upper case characters and the other lower case characters (or more generally, distinguishing between different font types). So, for example, all the engaged neuron circuits of the neural network 11(A) recognizing capital characters, would have a local context equal to a first binary value; All remaining engaged neuron circuits, recognizing lower case characters, would have a local context equal to a second binary value. Therefore, the local/input context difference allows selection of a subset of engaged neuron circuits, i.e., those having learned a particular input context, while inhibiting (ignoring) all others.

During what is referred to as the recognition phase, a neuron is actively comparing an input vector A with a stored prototype vector B. During input vector recognition, the context value in the neuron's local norm/context register 100 is compared with the context value in the main NO/CXT register 17. If there is a match, then the matching neuron circuit(s) 11 is (are) selected, when matching circuit 150 generates a Neuron Selection (NS) signal to select it (them). Coincidentally, unmatched neuron circuits are inhibited. An engaged neuron circuit (i.e. one that is no longer free) and which, also, is selected by the NS signal is a "committed" neuron. The matching circuit 150 receives the CXT signal on the context portion (CXT-BUS) of the NO/CXT-BUS and receives the Cxt output of norm/context register 100 on the context portion (Cxt-BUS) of the No/Cxt-BUS. When there is a match (between these two contexts), the NS signal in the matching neuron is driven to enable the neuron's Daisy Chain Circuit 600. NS also may be used to enable or disable other blocks of neuron circuit 11 as appropriate. Thus, comparing these contexts allows configuring the neural network 11(A) as a single neural network or, optionally, as an arrangement of separate groups of neurons. In the latter case, each of the different groups of neuron circuits within Neural Unit 11(#) are defined by different local contexts CXT.

On the other hand, the local norm signal No selects the calculation method used to calculate the distance between the input vector A and the prototype vector B in the neuron's weight memory. For the preferred embodiment of the present invention, the local norm signal No selects the desired calculation algorithm through standard select logic in evaluator circuit 200. In the preferred embodiment, each neuron circuit 11 can calculate either the MANHATTAN distance (L1 norm), i.e. D=sum (abs (Ak-Bk)) where "abs" is an abbreviation of "absolute value", or the SQUARE distance (Lsup norm), i.e. D=max (abs (Ak-Bk)), for all k, where k is every integer between 1 and n. In the preferred embodiment, the local norm and context data are 1 and 7 bits wide, respectively.

For example, the Most Significant Bit (MSB) of the No/Cxt-BUS may be designated the local norm with the remaining bits being the local context. At initialization, the local norm bit No is set equal to zero selecting the MANHATTAN distance (the default) calculation method. Although the local context data is 7 bits wide, only 127 different context values are permitted, because zero is reserved. If the local context data is zero, all the neuron circuits of the base chip 10 are selected, unconditionally. In this instance, the local context and input context data are not compared.

The DATA-BUS is an input to both the multi-norm Distance Evaluator Circuit 200 and to a Read/Write Memory Circuit 250. The Read/Write Memory 250 is, essentially, a RAM macro 64 words×8 bits, and is also referred to as the weight memory. Significantly, each neuron circuit 11 of the present invention includes a R/W Memory Circuit 250 for storing the prototype vector components, instead of a single common R/W Memory Circuit for all the neuron circuits of the network as in prior art neural networks. The RAM-BUS connects the R/W Memory Circuit 250 output to another input of Distance Evaluator Circuit 200. During the recognition phase, all the neuron circuits' (11-1 to 11-N) R/W Memory Circuits 250 are simultaneously addressed, in parallel, with the same address from the IADD/CTL-BUS. The input vector components are stored in the R/W Memory Circuit 250 of only one selected free neuron circuit, e.g., the first free neuron in the chain. This first free neuron circuit is referred to hereinbelow as the "ready to learn" neuron circuit. A RAM Store signal RS enables the ready to learn neuron's R/W memory, so that the input vector components are stored therein. RS disables storing the input vector into the weight memory of previously engaged neuron circuits, i.e., those neuron circuits with prototype vector components already stored in their weight memory 250. A significant amount of power is saved by only loading the input vector components into only the ready to learn neuron's weight memory 250 during the recognition phase. Optionally, however, should power not be a consideration, the input vector components may be loaded into all of the free neuron circuits' weight memories.

Preferably, only the evaluator circuit 200 of engaged neuron circuits calculate the distance between the input vector A presented on the DATA-BUS and the prototype vector B stored in the weight memory 250. Depending on the local norm signal No input to the evaluator circuit 200, the distance D is calculated either as the MANHATTAN distance (for the L1 norm) or the SQUARE distance (for the Lsup norm) as explained above. Alternatively, any other suitable distance calculation methods may be used. Furthermore, to increase the processing speed, the distance calculation is initiated as soon as the evaluator circuit 200 receives the first input vector component. After processing all of the input vector components, the evaluator circuit 200 generates the final distance signal D on the 14-bit DIST-BUS. After the last component of an input vector, the micro-controller/user sends a control signal LCOMP (Last COMPonent). The distance D signal is a first input to Distance Compare Circuit 300 and first input to IF Circuit 350.

Figure 7:
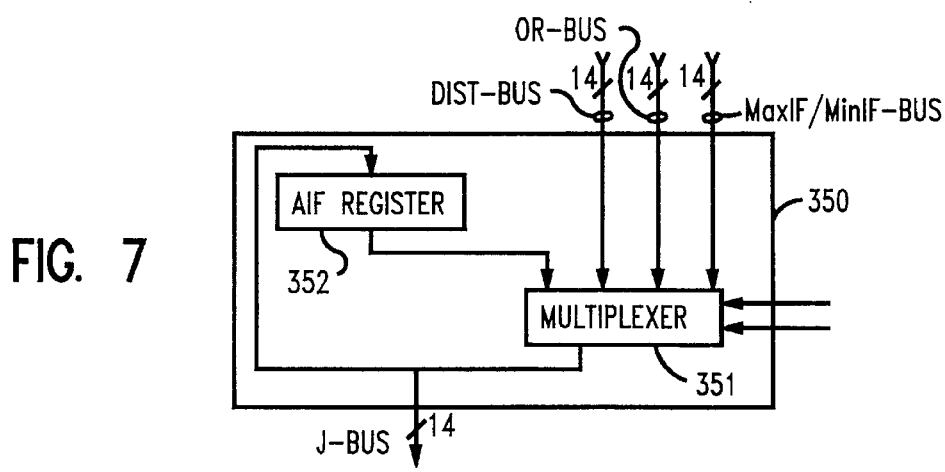
FIG. 7 shows the schematic block diagram of the IF circuit 350 of FIG. 5 which includes a register and a multiplexer.

FIG. 7 is a block diagram of IF Circuit 350 which includes four-way multiplexer 351 and a 14-bit AIF register 352. The multiplexer output is the IF circuit 350 output and is fed back as an input to AIF register 352. The multiplexer inputs are the OR-BUS, the DIST-BUS, the MaxIF/MinIF-BUS and the output of the AIF register 352. The OR-BUS is 14-bits wide and, essentially, transports distance (and in particular the minimum distance Dmin) or category data. The AIF value is first loaded into the ready to learn neuron circuit and is either Dmin (the minimum distance between the input vector and the nearest neighboring prototype vector), MinIF or MaxIF. During the learning phase, the ready-to-learn neuron's AIF register 352 is loaded with a MaxIF from the MaxIF/MinIF-BUS. Once loaded, the AIF Register's contents may be reduced during subsequent learning phases as required. Thus, the AIF value of a committed neuron circuit may be equal, either to the distance D calculated by the neuron circuit 11, MinIF (if D<MinIF) or, to MaxIF (if D>MaxIF) at the end of the reduction process. Again, the AIF register 352 holds the AIF value, a value bounded by MaxIF and MinIF as its upper and lower limits, respectively. The AIF value cannot be changed during the recognition phase, only during the learning phase. A neuron is degenerated once its AIF value has been reduced to its lower limit, i.e., AIF≦MinIF. The output of the IF circuit 350 is a 14-bit wide signal on J-BUS. The state of the J-BUS is selectively determined by the two multiplexer control signals. The IF circuit 350 output on the J-BUS is an input to Distance Compare Circuit 300 and to Dmin Determination Circuit 500.

The preferred Distance Compare Circuit 300 compares the DIST-BUS contents D with J-BUS contents J and generates two output signals LT (Lower Than) and LTE (Lower Than or Equal) based on the comparison result. Comparison results may differ depending on whether the neuron is in the recognition mode or the learning mode. During the recognition phase, when the neuron circuit 11 is in the Normal sub-Mode (NM) of the recognition mode, J=AIF, so that the compare circuit 300 compares the distance D with the contents of the AIF register 352. If the calculated distance D for the input vector falls within the neuron's Actual Influence Field AIF, i.e. if D<AIF, then, the input vector is recognized (the neuron circuit fires) and, the LT signal from compare circuit 300 is set active (LT=1). However, if the input vector does not fall within AIF, D≧AIF, then the input vector is not recognized (the neuron circuit does not fire) and LT is set inactive, i.e., LT=0. In the recognition mode, the LTE signal is ignored, i.e., is a "don't care".

In the learning phase, during the reduction process, J=MinIF, so that compare circuit 300 compares the calculated distance D with the MinIF value. If distance D is less than or equal to MinIF, D≦MinIF, then LTE is set active, LTE=1. If LTE is active, this indicates a degenerate status, so a bit is set in a dedicated DEGenerate register (DEG register) of block 400. However, if D>MinIF, then LTE is inactive, LTE=0. In the learning mode, the LT signal is ignored, i.e., a "don't care". Therefore, for a committed neuron circuit 11, during the recognition phase, LT indicates recognition of the input vector, and LTE is a "don't care"; while in the learning phase, LTE indicates degeneration of the neuron circuit and LT is a "don't care".

The LT and LTE signals from compare circuit 300 are passed to identification circuit 400. The OR-BUS and the CAT-BUS are data inputs to Identification circuit 400. CAT-BUS also supplies the CAT signal as an input to Local Category Register 450, which is a conventional 14-bit register. The input category data CAT on the CAT-BUS is held in Local Category Register 450 for subsequent processing. At initialization, the contents of Local Category Register 450 is set equal to zero. The Cat-BUS is the output of category register 450. The Cat-BUS passes the local category data C from the Local Category Register 450 to Identification Circuit 400 and Dmin Determination Circuit 500. Therefore, the input category data CAT on the CAT-BUS may be different from the local category data C in Local Category Register 450. Both CAT and C are referred to herein by the general term, category data, unless differentiating between them is required for understanding of the invention.

During the learning phase, if none of the engaged neuron circuits of the neural network (11A) has recognized the input vector, then the neural network (11A) engages the ready to learn neuron circuit. The Local Category Register 450 of the ready to learn neuron circuit is loaded with a determined input category value. The identification circuit 400, primarily, determines whether any engaged neuron has recognized the input vector. Identification Circuit 400 then generates three local result signals F (the fire signal), DEGOUT, and UNC/FIRE.OK, as well as local status signal DEG.

These local Neuron Result signals NR of each neuron circuit 11 are each combined to generate global result signals that are the neural network 11(A) response to an input vector. If the local fire signal F is active (F=1), it indicates that the neuron circuit 11 has recognized the input vector (fired), i.e., that LT is active and the neuron circuit is committed. In addition, fire signal F is also used as a gating signal, for blocking committed neuron circuits that have not fired from communicating with other firing neuron circuits through OR circuit 12 and through on-chip common communication bus COM*-BUS. The DEG status signal is from a dedicated DEG register in identification circuit 400 which holds the result of previous LTE determination, as described above. The DEGOUT signal is formed by AND'ing F and DEG, DEGOUT=DEG AND F. Thus, a neuron's degenerate result signal DEGOUT is active, DEGOUT=1, when it has degenerated and has fired. F and DEGOUT are an individual neuron circuit 11 response to an input vector. Finally, Identification Circuit 400 generates the UNC/FIRE.OK signal. During the recognition phase, when a neuron 11 fires, the UNC/FIRE.OK signal is generated by EXORing the global category signal on the neuron's OR-BUS input, (i.e., the response of all other committed neuron circuits in the neural network 11(A)) with its local Category signal C from the Local Category Register 450. Together, the local (or neuron) result signals F, DEGOUT and UNC/FIRE.OK form the Neuron Result signal NR on the 3-bit NR-BUS.

Figure 8:
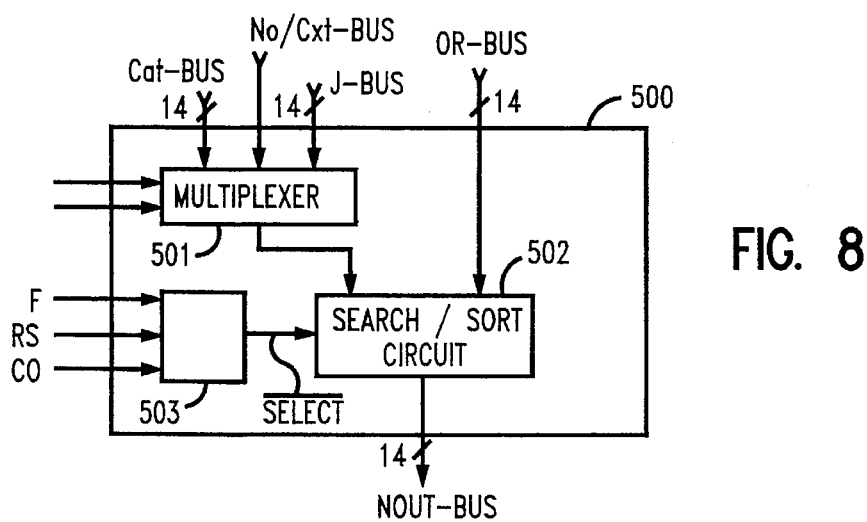
FIG. 8 shows the schematic block diagram of the Dmin determination circuit 500 of FIG. 5 which includes a multiplexer, a logic circuit and a search/sort circuit.

FIG. 8 is a schematic diagram of the Dmin DETERMINATION CIRCUIT 500 in each neuron circuit 11. The Dmin DETERMINATION CIRCUIT 500 includes a three-way multiplexer 501, a search/sort circuit 502, and logic circuit 503. The J-BUS, the No/Cxt-BUS and the Cat-BUS are inputs to the multiplexer 501. The output of multiplexer 501 is a first input to search/sort circuit 502. The OR-BUS is the second input to search/sort circuit 502. Search/Sort Circuit 502 generates a local Neuron OUTput signal NOUT on the 14-bit NOUT-BUS. Logic circuit 503 receives three input signals F, RS and CO and generates therefrom $\overline{\text{SELECT}}$ which controls Search/Sort Circuit 502. The local distance signal D on the J-BUS and the local category signal C on the Cat-BUS are selectively passed to the first input of search/sort circuit 502 through multiplexer 501. Additionally, by setting the OR-BUS input to zero, the Multiplexer 501 output is passed through Search/Sort circuit 502 and directly out onto NOUT-BUS. Search/Sort Circuit 502 of neuron circuit 11 aggregates with the corresponding search/sort circuits of other engaged neuron circuits in the neural network in combination with OR circuit 12, effectively forming the neural network's Search/Sort circuit. The aggregate Search/Sort circuit is used to select the minimum distance Dmin among all the distances calculated for firing, committed neuron circuits 11-1 to 11-N. After determining Dmin, the aggregate Search/Sort Circuit is used to sort the remaining distances in the increasing order.

A daisy chain circuit 600 in each neuron circuit 11 provides for chaining neurons by a serial link to the two adjacent neuron circuits at their daisy chain circuits. When serially linked, all of the neuron circuits of the base chip 10 of FIG. 4(A) form a chain-like structure. To chain the neurons, each Daisy Chain Circuit 600 has dedicated Daisy Chain Input DCI and Daisy Chain Output DCO. Except for the first and last, each neuron circuit 11i in a chain (and, therefore, in a neural network 11(A)), has its DCI connected to DCO of the previous neuron circuit 11i-1 in the chain and, has its DCO connected to DCI of the following neuron circuit 11i+1 in the chain.

Figure 31:
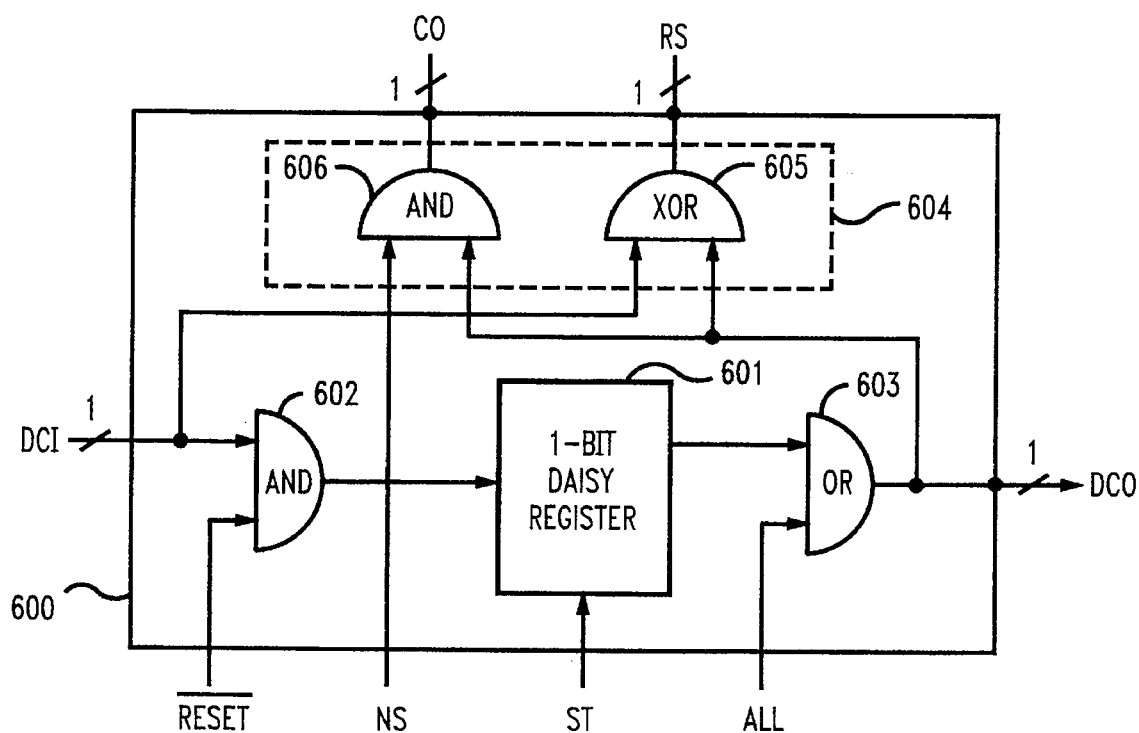
FIG. 31 is a schematic block diagram of the daisy chain circuit 600 of FIG. 5.

FIG. 31 is a detailed block diagram of Daisy Chain Circuit 600 that includes a 1-bit DAISY REGister 601. Each DAISY REG 601 is initialized to a first binary value (a zero) to indicate that the neuron circuit 11 is free. When a neuron is engaged, its DAISY REG 601 is set to a second binary value (a one) to indicate that the neuron circuit 11 is engaged. Consequently, prior to restore or initial learning, all of the neuron's Daisy Registers 601 in neural network 11(A) are set to zero. As each neuron circuit in the chain becomes engaged, its Daisy Register 601 is set to 1. So, the ready to learn neuron circuit is easily identified, as the first neuron in the chain of neuron circuits 11-1 to 11-N having DCI and DCO that are complements of each other (i.e., DCI=1 and DCO=0). During the learning phase or at the beginning of the engagement process, a prototype vector has been loaded into the ready to learn neuron circuit. If the ready to learn neuron is to be engaged, then STorage enable ST is active to load a "one" in the ready to learn neuron's 1-bit DAISY REGister 601. After the Daisy Register 601 is loaded with a 1, the neuron's DCO=1 indicating that the neuron circuit has been engaged. This DCO is passed to the following neuron's daisy chain circuit as its DCI, indicating that it is the new ready to learn neuron circuit. After all of the neuron circuits 11-1 to 11-N of neural network 11(A) are engaged, all their respective 1-bit Daisy Registers 601 are ones, and, therefore, the final output DCO-N=1. Thus, the DCO-N signal is also a chain FULL signal because when DCO-N=1, there are no free neurons circuit 11 left in the chain.

Finally, Daisy Chain Circuit 600 also generates neuron control signals COmmitted CO (indicating that the neuron is committed) and, Ready to Store RS (i.e. WRITE, for storing the input vector in the ready to learn neuron's weight memory 250). DCO and Neuron Select (NS) are AND'ed in AND gate 604 to generate CO. CO is used in the identification circuit 400 and Dmin determination circuit 500 and is active (CO=1) only if the neuron is committed. When a committed neuron (CO=1) fires (F=1), the committed neuron generates a local result composite, NR on the NR-BUS and a local output on the NOUT-BUS, respectively. Ready to Store RS is generated by comparing DCI and DCO in XOR gate 605. RS is high only in the ready to learn neuron, because the ready to learn neuron is the only neuron in the chain with DCO not equal to DCI. During each recognition phase, the input vector components are stored in the ready to learn neuron's R/W memory circuit 250 because RS is high. RS is low (READ) for all other neuron's in the chain, preventing writing and allowing their respective weight memories 250 to be read, only. If an input vector is not identified, then it is treated as a new prototype vector for the ready to learn neuron circuit which has been pre-charged with the input vector's components already stored in its weight memory. RS also controls the Dmin Determination Circuit 500 during a save operation of the base chip 10 as described below.

To summarize the operation of the neuron circuit 11 described above: During the recognition phase, engaged neurons and the ready to learn neuron receive an input vector. Any committed neuron (CO=1) that fires, generates a local response to the input vector. This local (or neuron) response includes, essentially, signals and data. For each firing neuron: Local result signals F, DEGOUT and UNC/FIRE.OK are generated by identification circuit 400 and carried on the 3-bit NR-BUS; Data (local output NOUT) are generated by the Dmin Determination Circuit 500 and carried on the 14-bit NOUT-BUS; Unless the OR-BUS input to the neurons is zero at the end of the minimum distance determination process, NOUT is the minimum distance Dmin; If the OR-BUS is zero, then the search/sort circuit 502 is by-passed, and NOUT is either the local distance D from distance evaluator circuit 200 (on the J-BUS) or the local category C from register 450; and, since more than 1 neuron circuit may fire, several neuron circuits may place the same minimum distance value Dmin on the NOUT-BUS as NOUT. Neuron circuits that do not fire or are free, place a neutral value on NOUT, i.e., NOUT=0. The outputs from all of the neurons NOUT, both the neutral values (0) and the value(s) from firing neuron(s), are OR'ed in OR circuit 12.

In the preferred embodiment stand-alone chip of FIG. 4(A), each individual neuron's local result NR and local output NOUT are inputs to OR circuit 12 on a respective NR-1-BUS to NR-N-BUS and NOUT-1-BUS to NOUT-N-BUS. OR circuit 12 includes four dedicated OR sub-circuits. The first OR sub-circuit is 14 N-way OR gates wherein corresponding NOUT bits from each neuron circuit or ORed, to provide a single 14 bit OUT* signal. NOUT for neuron circuit 11-i is a binary word NOUT-i that can be represented NOUT-i=NOUTi-il ... NOUTj-il ... NOUTp-i. In this preferred embodiment, p=14, j is an integer from 1 to p; and, i is an integer from 1 to N. The output from this first OR sub-circuit, designated OUT*, is 14 bits wide on the OUT*-BUS. The jth bit of OUT* is OUT*j=NOUTj-1 OR ... OR NOUTj-N.

In each of the three remaining OR sub-circuits one of each of the three neuron local result signals are OR'ed in an N-way OR gate to generate three corresponding global result signals F*, DEGOUT* and UNC/FIRE.OK* on the 3-bit bus R*-BUS. As with the individual NOUT* bits, all of the F outputs are OR'ed to generate a global result "fire" signal F*, where F*=F1 OR ... OR FN. As noted above, when a neuron circuit 11-i recognizes an input vector, the neuron's F=1, otherwise F=0. So, F, is the neural network's 11(A) response to an input vector A. Therefore, F, is active (F*=1) when at least one neuron in the neural network 11(A) has recognized the input vector. A fourth global result signal NID*=F* is generated from F*. Similarly, the two local results, DEGOUT and UNC/FIRE.OK are OR'ed in the remaining two OR sub-circuits, which are each N-way OR gates, to form global result signals DEGOUT* (DEGOUT*=DEGOUT1 OR ... OR DEGOUTN) and UNC/FIRE.OK* (UNC/FIRE.OK*=UNC/FIRE.OK1 OR ... OR UNC/FIRE.OKN), respectively. Global signal UNC/FIRE.OK* indicates whether neural network's response to the input vector is ambiguous. Global result "degenerate" signal. DEGOUT* is active (DEGOUT*=1) if at least one degenerated committed neuron circuit of the neural network 11(A) has fired. DEGOUT is inactive (DEGOUT=0) for neurons that have not fired or have not degenerated. The 3-bit R*-BUS and the 14-bit OUT*-BUS are merged to form a 17-bit on-chip common communication bus COM*-BUS.

The OUT* signal is feedback to each neuron circuit 11-1 to 11-N on the OR-BUS. Thus, the OR-BUS is the portion of the COM*-BUS carrying the OUT* signal. So, the OUT* signal is fed back directly, unmodified, to the Neuron Circuits 11-1 to 11-N. As indicated above, if the OR-BUS is zero, category and distance data are passed through Search/Sort Circuit 502 to the NOUT-BUS as the neuron's local output signal NOUT. Thus, when the OR-BUS is zero, NOUT* is the global category C*. Then, this Global Category C* is fed back to the neurons on the OR-BUS. In this manner, C* is fed back directly to the Identification Circuit 400 of every neuron in the neural network.

Figure 25:
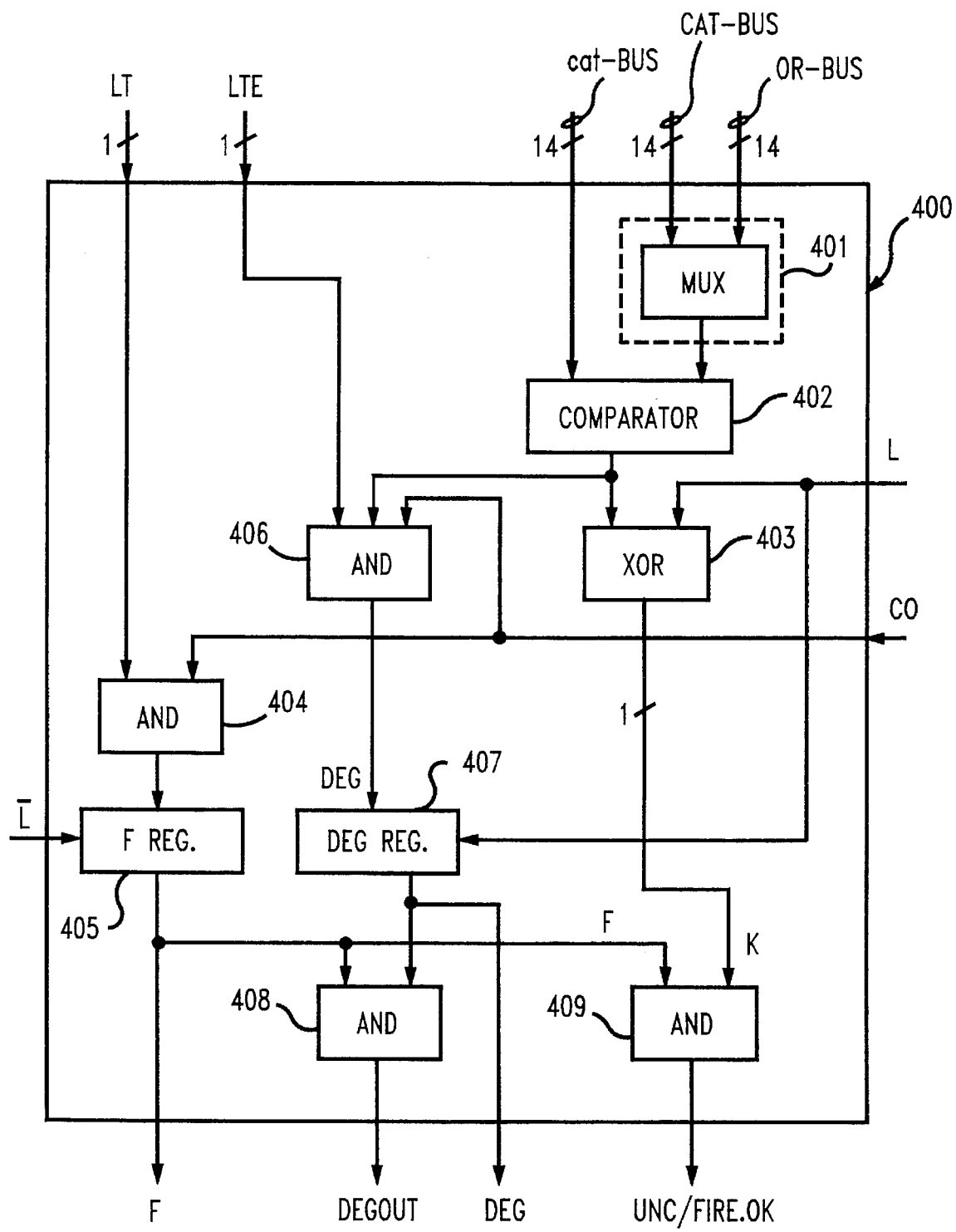
FIG. 25 is a schematic circuit diagram of the identification circuit 400 of FIG. 5 which generates the local result and status signals.

FIG. 25 is a schematic diagram of Identification Circuit 400. Each neuron's Local Category Register 450 is initialized to zero. As a neuron is engaged, its Local Category Register 450 is loaded with the prototype vector's category. In each committed neuron circuit 11, global Category C* on the OR-BUS is compared in Identification Circuit 400, with the local Category C stored in the category register 450. The result of this comparison is inverted and ANDed with fire signal F to generate UNC/FIRE.OK. If a neuron does not fire or is not committed, UNC/FIRE.OK remains inactive (low). Also, for a firing neuron, if the result of the comparison indicates that C*=C, the neuron has identified input vector and, so, UNC/FIRE.OK remains low. However, for a firing neuron, if C*≠C, then UNC/FIRE.OK is driven High to indicate that at least two committed neuron circuits 11 with different local categories have fired.

All of the Neural network's Local ambiguity signals UNC/FIRE.OK are ORed in the fourth dedicated OR subcircuit to produce the global ambiguity signal UNC/FIRE.OK*. If in response to an input vector, a neuron fires and the input vector's category matches the local category, then, the input vector has been identified. If the local result signal UNC/FIRE.OK of all committed neuron circuits, whether firing or not, remain inactive (i.e., UNC/FIRE.OK=0) indicating that either the input vector has not been recognized or has been identified, UNC/FIRE.OK*=0. However, if, in response to an input vector, two or more neurons fire and both neurons do not belong to the same category, then the global category C* (resulting from ORing the local categories of the firing neurons) will not match the local category C of at least one firing neuron. This result is ambiguous because neurons have fired but the input vector has not been identified. If the result is ambiguous, a local ambiguity signal UNC/FIRE.OK signal in at least one firing neuron is driven high and, consequently, the global result signal UNC/FIRE.OK* is set to "1". In other words, the input vector has been recognized by neural network 11(A), but not identified and so the result is ambiguous. If an input vector is identified, a global results signal ID* (ID*=F* AND $\overline{\text{UNC/FIRE.OK*}}$) is driven high in the Status & Control Logic Circuit 18. Local result signal UNC/FIRE.OK and global result signal UNC/FIRE.OK* are the local and global ambiguity signals, respectively.

The global ambiguity signal is also used to determine (search for) Dmin from among all the calculated distances D1 to DN (or to determine the minimum category Cmin as the case may be). For any input vector, D is minimum for the neuron with stored prototype vector components closest to the input vector. As indicated above, the search/sort circuits 502 of FIG. 8 of all of the engaged neuron circuits 11 are aggregated and combined with OR circuit 12 to form a single search/sort circuit for the Neural Network 11(A). During Dmin determination, each of the aggregated search/sort circuits 502 is selectively self-excluded until only the search/sort circuit 502 of a single neuron circuit (the one with the minimum distance Dmin) is left (remains active). That determined minimum distance Dmin is passed on the NOUT-BUS to the OR circuit 12. After Dmin is determined, the value of the minimum distance Dmin is passed through OR circuit 12 unmodified to the OUT*-BUS portion of the COM*-BUS and fed back on the OR-BUS. During the learning phase of the engagement process, the minimum distance Dmin is loaded into the AIF register 352 of the ready to learn neuron circuit from the OR-BUS, as its AIF value of this neuron circuit. An identical search of all local categories C1 to CN stored in every neuron's local category register 450 is conducted to determine the minimum category Cmin. The global result R* and global output OUT* are passed on COM*-BUS to the Status and Control Logic Circuit 18 for storage therein.

Figure 6:
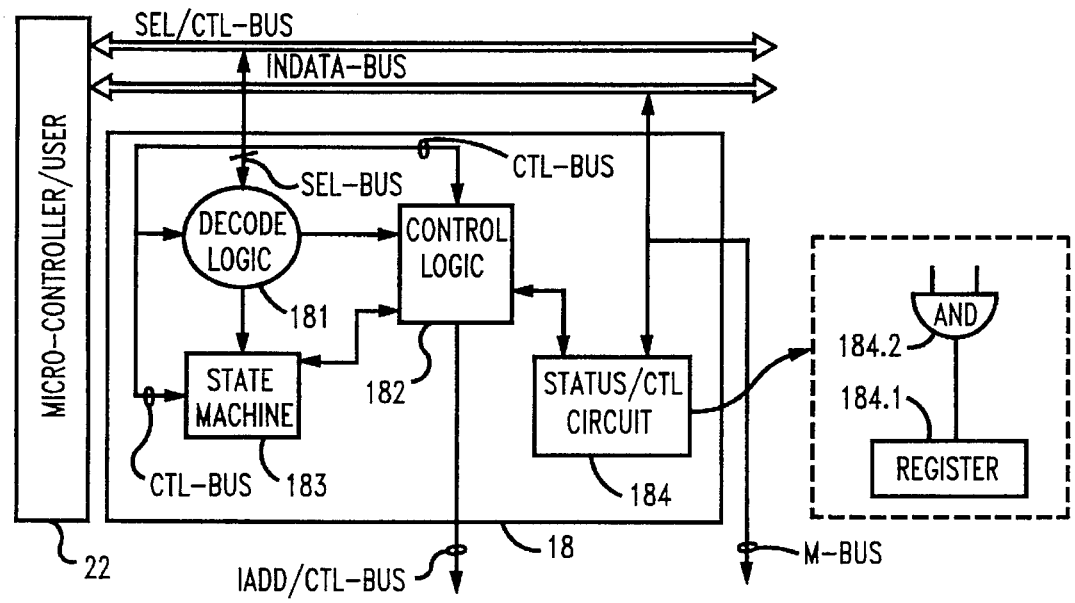
FIG. 6 shows the schematic block diagram of the status and control logic circuit 18 of FIGS. 4(A) and 4(B) that generates internal control, selection and address signals required for the operation of the neuron circuit of FIG. 5.

FIG. 6 is a schematic diagram of the Status & Control Logic Circuit 18. The micro-controller/user 22, on the SEL/CTL-BUS and the INDATA-BUS, interfaces directly with the Status & Control Logic Circuit 18. The SEL/CTL-BUS includes two individual busses, a selection bus SEL-BUS and a control bus CTL-BUS. The SEL-BUS signals select the various chip registers. The CTL-BUS signals include standard control and clock signals such as STROBE, CHIP SELECT, CLOCK and the like, from the micro-controller/user 22. Decode logic circuit 181, decodes select signals from the SEL-BUS, to generate individual control signals for accessing specific data in a corresponding selected register. A Control Logic circuit 182, receives control signals on the CTL-BUS and generates therefrom all other on-chip control signals, including the individual weight memory 250 addresses. Also, logic circuit 182 may control the base chip 10 in interfacing it with, for example, an Industry Standard Architecture (ISA) bus or a Peripheral Component Interface (PCI) bus. The Control Logic circuit 182 output is distributed around the base chip 10 on the IADD/CTL-BUS. The state machine circuit 183 acting in concert with, and through Control Logic circuit 182 controls the chip's operating sequence, especially during the learning and recognition phases.

Figure 34:
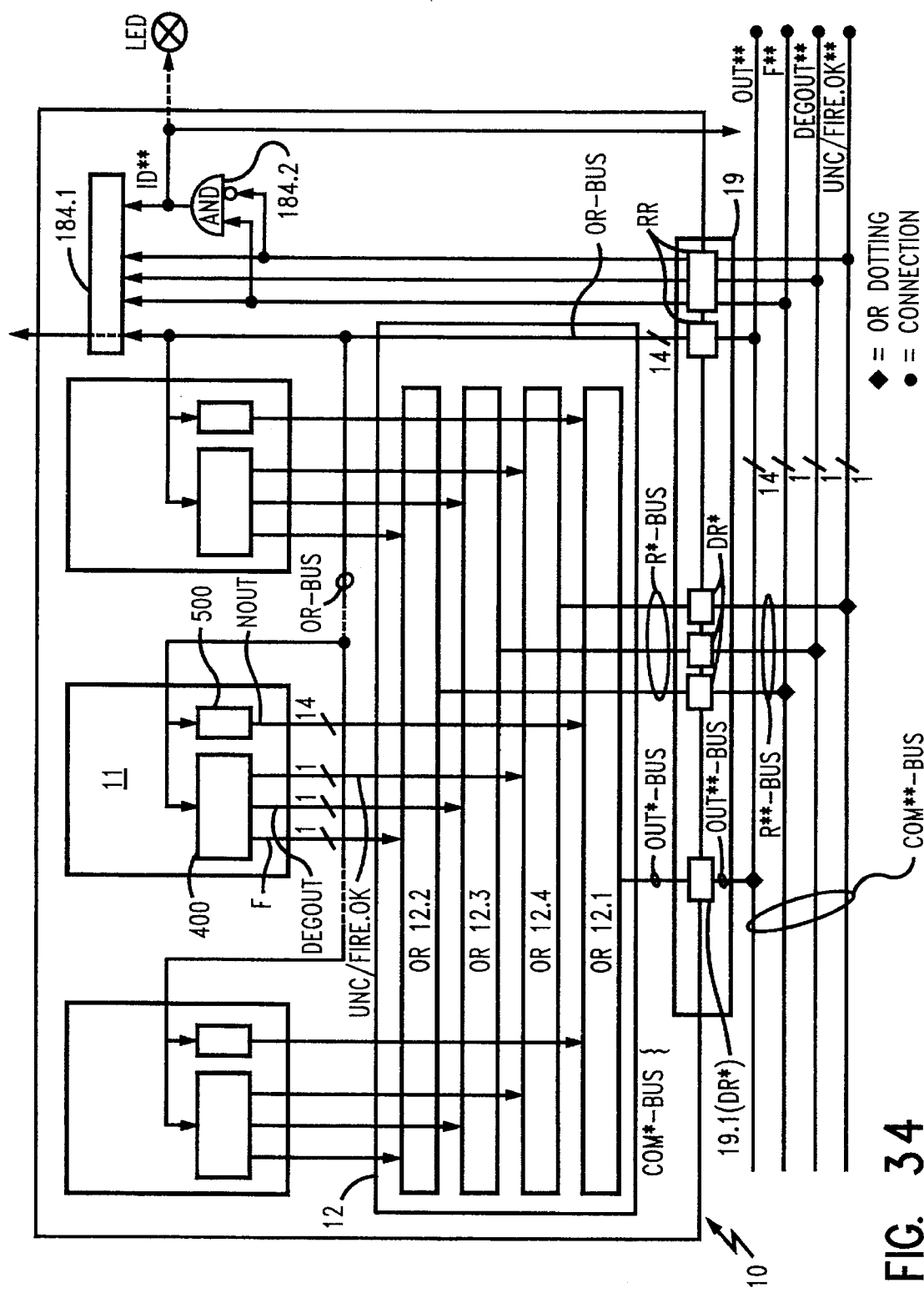
FIG. 34 is a schematic block diagram of the inter-neuron communication system of the multi-chip base neural chip of FIG. 4(B) wherein the OR function is performed by dotting onto an off-chip common communication bus.

Status/CTL Circuit 184 provides control for data exchange between the base chip 10 and the micro-controller/user 22. The Status/CTL Circuit 184 includes a register 184.1 and a two-way AND gate 184.2. The register 184.1 can store all of the control signals from the control logic circuit 182, as well as, the global result and output signals passed from neural network 11(A) to the Status & Control Logic Circuit 18 on the M-BUS. Also, the global result signals F* (or NID*), DEGOUT*, UNC/FIRE.OK* and ID* may be loaded into register 184.1. As described above, F* and the inversion of UNC/FIRE.OK* are AND'ed to generate ID*. This is done on chip in AND gate 184.2. To easily indicate to the micro-controller/user 22 whether the input vector was identified, ID* from AND gate 184.2 is stored in an easily accessible location register 184.1. In particular, a Light Emitting Diode (LED) may be connected to the ID* location of register 184.1, as represented in FIG. 34, to serve as a visual indication of whether the input vector has been identified. Additionally, register 184.1 holds set-up parameters and neural network 11(A) operating mode data for bi-directional communication with micro-controller/user 22 on the INDATA-BUS. The micro-controller/user 22 may access register 184.1 during a WRITE or a READ operation.

As described above and depicted in FIG. 4(A), global COMmunication BUS COM*-BUS includes the R*-BUS and the OUT*-BUS. The COM*-BUS thus carries the ZISC chip's 10 response to an input vector. The OR signal on the OR-BUS is identical to the OUT* signal. The stand alone base chip 10 of FIG. 4(A) includes a self-contained neural network 11(A) comprised of neural unit 11(#), OR circuit 12, the COM*-BUS and the OR-BUS (derived from the COM*-BUS). Thus, the stand alone chip 10 of FIG. 4(A) operates independently and is intended for applications that do not require an external output bus.

Figure 4B:
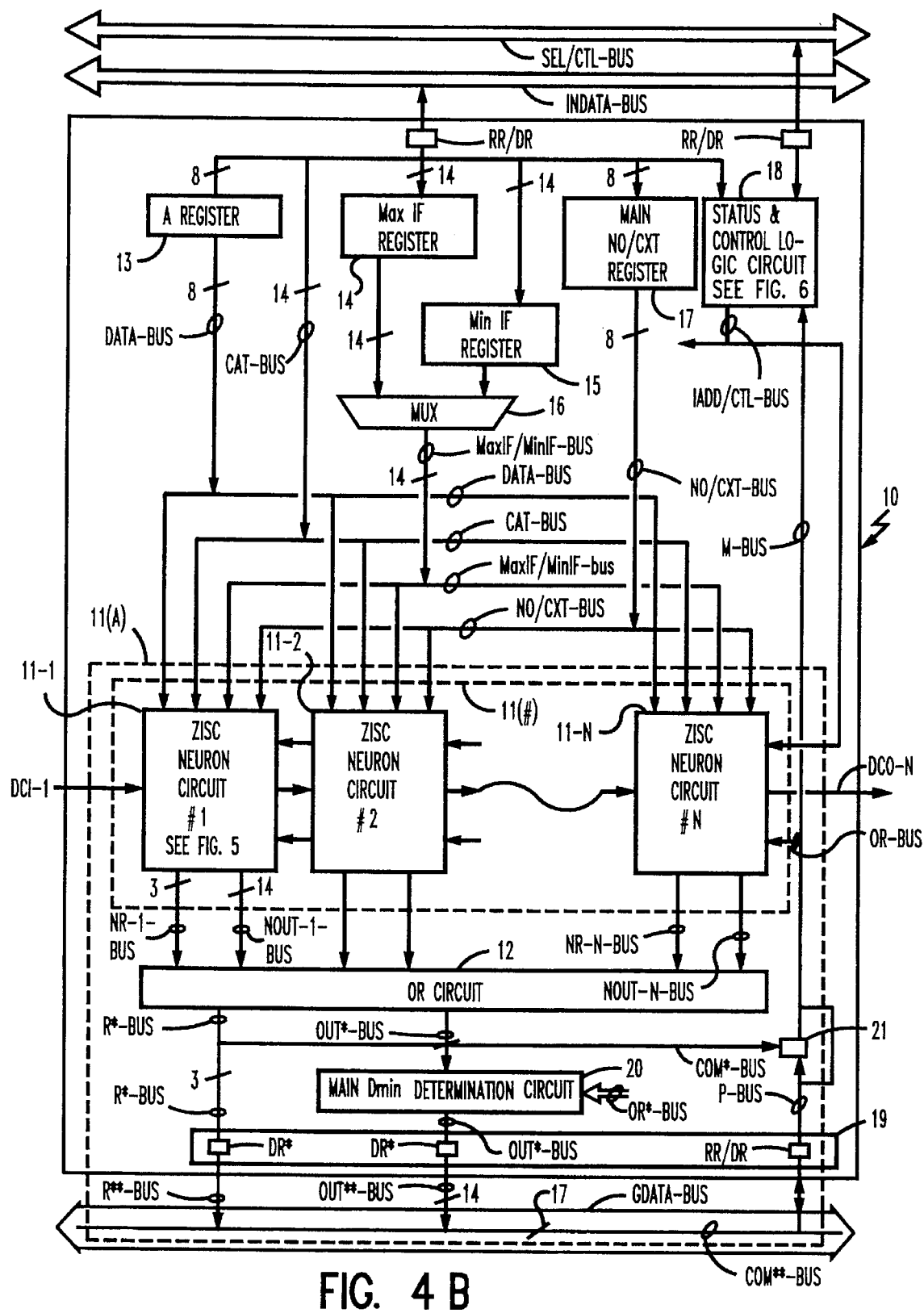
FIG. 4(B) is a schematic block diagram of a multi-chip base neural semiconductor chip designed for operating either for stand-alone or in combination with other identical base neural chips in a multi-chip environment and the base neural network incorporated therein according to the preferred embodiment of the present invention.

FIG. 4B is a schematic representation of a cascadable base chip 10 according to the preferred embodiment of the present invention for use in a multi-chip neural network. This cascadable base is architecturally identical to the stand alone base chip of FIG. 4(A). However, by adding components and an additional interchip communication bus, this cascadable chip allows expanding the Neural Network 11(A) size by cascading a plurality of these cascadable chips. In the drawings, where features of the cascadable base chip of FIG. 4(B) are identical to features of the stand alone base chip of FIG. 4(A), they are identified with the same reference number or mnemonic. Some corresponding features of the two base chips of FIGS. 4(A) and 4(B), while not identical, are similar and include nearly identical functions, except as necessary for making the base chip stand alone (FIG. 4(A)) or cascadable (FIG. 4(b)). Therefore, common or identical features are not described hereinbelow, only the differences between corresponding features are described.

The primary difference between the cascadable base chip and the stand-alone base chip, is the inclusion of a COM**-BUS, which provides intercommunication between interconnected (cascaded) base chips. Using the cascadable base chip of FIG. 4(B), the limitation on the number of neurons in a neural network associated with the stand-alone chip of FIG. 4(A), i.e., the number of neurons on the chip, is eliminated, theoretically. Instead, within normal physical limits, a neural network of any size may be formed by interconnecting as many cascadable base chips as desired or required.

The R*-BUS and the OUT*-BUS from OR-Circuit 12 are connected to Receiver-Driver block 19. Driver circuits DR* are designed, not only to redrive the R* and OUT* signals, but also to provide a dot OR logic function for connecting multiple chips to the off-chip common COMmunication BUS COM**-BUS. Corresponding global output signals from each chip's driver circuits DR* of Receiver-Driver block 19, R and OUT on their respective R-BUS and OUT-BUS are dot OR'ed with appropriate corresponding signals on the COM-BUS. In keeping with the above-described convention of the present invention, the second asterisk indicates that the global result or output is from an additional OR function (for interconnecting multiple base chips 10**) combining each chip output R* and OUT* at the driver circuits DR*. Hereinafter, the COM**-BUS refers to the inter-chip communication bus.

Preferably, instead of being passed directly to the drivers DR*, the OUT* signal on the OUT*-BUS is an input of Main Dmin Determination Circuit 20. Basically, Main Dmin Determination Circuit 20 is the same as search/sort circuit 502 in each neuron circuit 11. When the Main Dmin Determination Circuit 20 is included, the OUT** signal is feedback as the OR*-BUS input. The Main Dmin Determination Circuit 20 is particularly important when several cascadable base chips are interconnected in a neural network. The Main Dmin Determination Circuit 20 improves the overall neural network processing speed. A general purpose output data bus, the GDATA-BUS is, essentially, the COM-BUS, but may include additional signals, other than R and OUT. The micro-controller/user 22 may connect directly to the COM-BUS or, alternatively, be connected indirectly through register 184.1. Thus, by dot ORing multiple base chips to the COM**-BUS, the neural network size can exceed, significantly, that of a single chip.

For added flexibility, neural network size is not fixed by the number of interconnected cascadable base chips. Instead, the micro-controller/user 22 may configure the interconnected cascadable base chips either as one large neural network or as two or more individual, independent neural networks. The micro-controller/user 22 may select passing either the COM*-BUS (thus configuring the cascadable base chip as stand alone) or the P-BUS (thus configuring a multi-chip neural network described above) through multiplexer circuit 21 to the Q-BUS. The COM-BUS portion of the GDATA-BUS is fed back as the P-BUS through receivers in the driver/receiver circuit DR/RR of block 19. The Q-BUS, including signals passed directly from the P-BUS as indicated by the loop around multiplexer 21 in FIG. 4(B), drives both the OR-BUS to Neural Unit 11(#) and the M-BUS to the Status and Control Logic Circuit 18. Alternatively, multiplexer 21** may be omitted by directly connecting the P-BUS to the Q-BUS (and omitting the optional COM*-BUS connection). Thus configured for single chip operation, the cascadable base chip functions very similar to the stand alone base chip of FIG. 4(A).

In further explanation of the convention and notation of Table IV. A hyphen designates an individual neuron circuit (e.g. 11-i). For consistency, the same designation is carried through to individual neuron circuit's internal circuitry and signals (e.g. search/sort circuit 502-i and NOUT-i). Global result and output signals and related buses resulting from ORing in OR circuit 12 are labelled with a single asterisk (e.g. OUT* and OUT*-BUS in FIG. 4(A)). An additional asterisk indicates an additional stage of ORing. Thus, for example, at the output of driver circuits DR* of block 19 in FIG. 4(B), the global output signals and output buses are labelled with two asterisks (e.g. OUT and OUT-BUS). Parentheses designate major chip circuits formed from individual elements, e.g., the base neural network 11(A).

To summarize the foregoing description of the inputs to a preferred embodiment neuron circuit 11, each neuron has six input buses:

an 8-bit DATA-BUS which carries the input vector components;

a 14-bit MaxIF/MinIF-BUS which carries the maximum (MaxIF) and the minimum (MinIF) influence field values;

an 8-bit NO/CXT-BUS which includes a 1-bit input norm and a 7-bit context data input;

a 14-bit CAT-BUS which carries the input category data CAT;

an IADD/CTL-BUS which carries the address and control signals required for a inter-neuron operation; and, a 14-bit OR-BUS which carries distance or category type data from either the OUT* or the OUT** signal.

Further, each preferred embodiment neuron circuit has two output buses:

an NR-BUS which provides a composite local (or Neuron) Result signal comprised of F, DEGOUT and UNC/FIRE.OK. F indicates whether the neuron has "fired" i.e., recognized the input vector. DEGOUT indicates whether a firing neuron has degenerated, and, therefore, the neuron's "degenerated" status. UNC/FIRE.OK indicates whether a firing neuron has unambiguously identified the input vector, i.e., the input vector has been recognized by only one neuron; and, an NOUT-BUS which provides the local (or neuron) output, NOUT. Normally, NOUT is either the neuron calculated distance between the input vector and a prototype vector stored in the neuron's weight memory or, the local category in the neuron's category register 450. Whether in learn mode or in recognition mode, at the end of the Dmin determination process, one neuron, the neuron circuit with minimum calculated distance, has on its output NOUT=DMin; The remaining neuron circuits have NOUT=0. Thus, ORing the neuron outputs in OR circuit 12 results in NOUT*=Dmin. However, the Dmin determination circuit 500 may be bypassed to place any neuron value either from the neuron's weight memory or from any other selected neuron register, on NOUT. In the SAVE and RESTORE modes, NOUT passes set-up parameters, prototype vector components and the like.

Both the stand-alone and the cascadable base chip 10 have two input buses to interface the base chip 10 with the micro-controller/user 22. These two input buses are:

a 16-bit bi-directional INDATA-BUS wherein input vector data, set-up parameters, input norm/context and category data are passed between the micro-controller/user 22 and the base chip 10; and, a SEL/CTL-BUS where selection and control signals are passed to the base chip 10.

To make it cascadable, the cascadable base chip's output bus has key differences from that of the stand alone base chip. With the stand-alone base chip 10 in FIG. 4(A), the output bus is the on-chip common COMmunication BUS COM*-BUS. The COM*-BUS is the combination of the R*-BUS and OUT*-BUS outputs after of OR circuit 12. The R*-BUS includes the global result signals F*, DEGOUT* and UNC/FIRE.OK* that are the global responses of the neural network 11(A) to an input vector A. The OUT*-BUS is the global output signal OUT*. Essentially, OUT* is either: a minimum value (Dmin or Cmin) among all the values (distances calculated or categories held) in the engaged neuron circuits of the neural network 11(A) at the end of a (Dmin or Cmin) determination process; or, OUT* is the global category C*.

By contrast, the cascadable base chip, besides including the driver, receiver and driver/receiver circuits of block 19, the off-chip common communication bus COM-BUS interfaces the base chip 10 with the external world and, especially, with other base chips 10. The R-BUS is the logical extension of the R*-BUS and, the OUT**-BUS is the logical extension of the OUT*-BUS on the stand alone base chip. The R-BUS includes global result signals F, DEGOUT and UNC/FIRE.OK. The global output signal OUT is on the OUT-BUS. The R-BUS and OUT-BUS combine to form the COM-BUS. If Main Dmin Determination Circuit 20 is excluded in the cascadable base chip 10, then the OUT-BUS is fed back to the OR-BUS input of each neuron circuit 11. The 17-bit COM**-BUS may be supplemented with other global signals, as required for cascadable base chip 10 interconnection, to form the GDATA-BUS.

Finally, to maintain neural network expandability of the serial Daisy Chain Circuit connection, as with the stand alone base chip, the cascadable base chip includes a Daisy Chain In (DCI-1) and a Daisy Chain Out (DCO-N).

*ALTERNATE EMBODIMENTS OF THE BASE CHIP ARCHITECTURE

Figure 9:
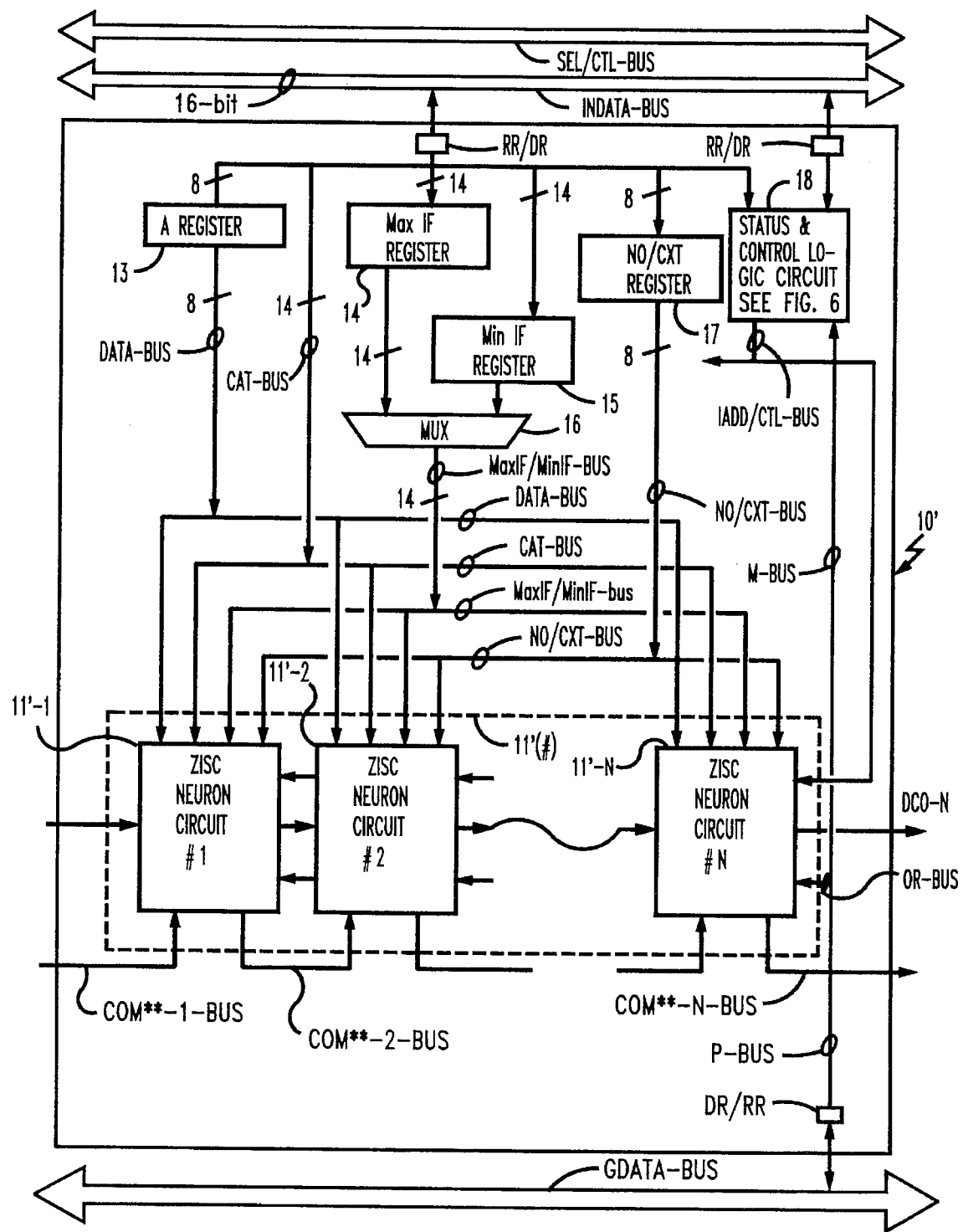
FIG. 9 shows a schematic block diagram of an alternate base neural chip of FIG. 4(B).

There are several contemplated alternate embodiments of the base chip architecture of the present invention. FIG. 9 is a schematic of a first alternate embodiment base chip 10' wherein OR circuit 12 is part of each neuron circuit 11'. In this alternate embodiment, the common communication bus has a serial structure including bus elements COM-1-BUS to COM-N-BUS. This first alternate embodiment is a relatively simple variation of the preferred embodiments. However, the parallel structure base chip 10 of FIG. 4(B) is not followed for alternate base chip 10'. Consequently, this alternate embodiment has a significantly slower overall processing time during the learning and recognition phases compared to the preferred embodiments. If several of the alternate embodiment base chips 10' are serially cascaded in a chain, the COM**-1-BUS inputs of the first base chip 10' in the chain are connected to a neutral logic level (zero), i.e. neutral for the OR function.

Figure 10:
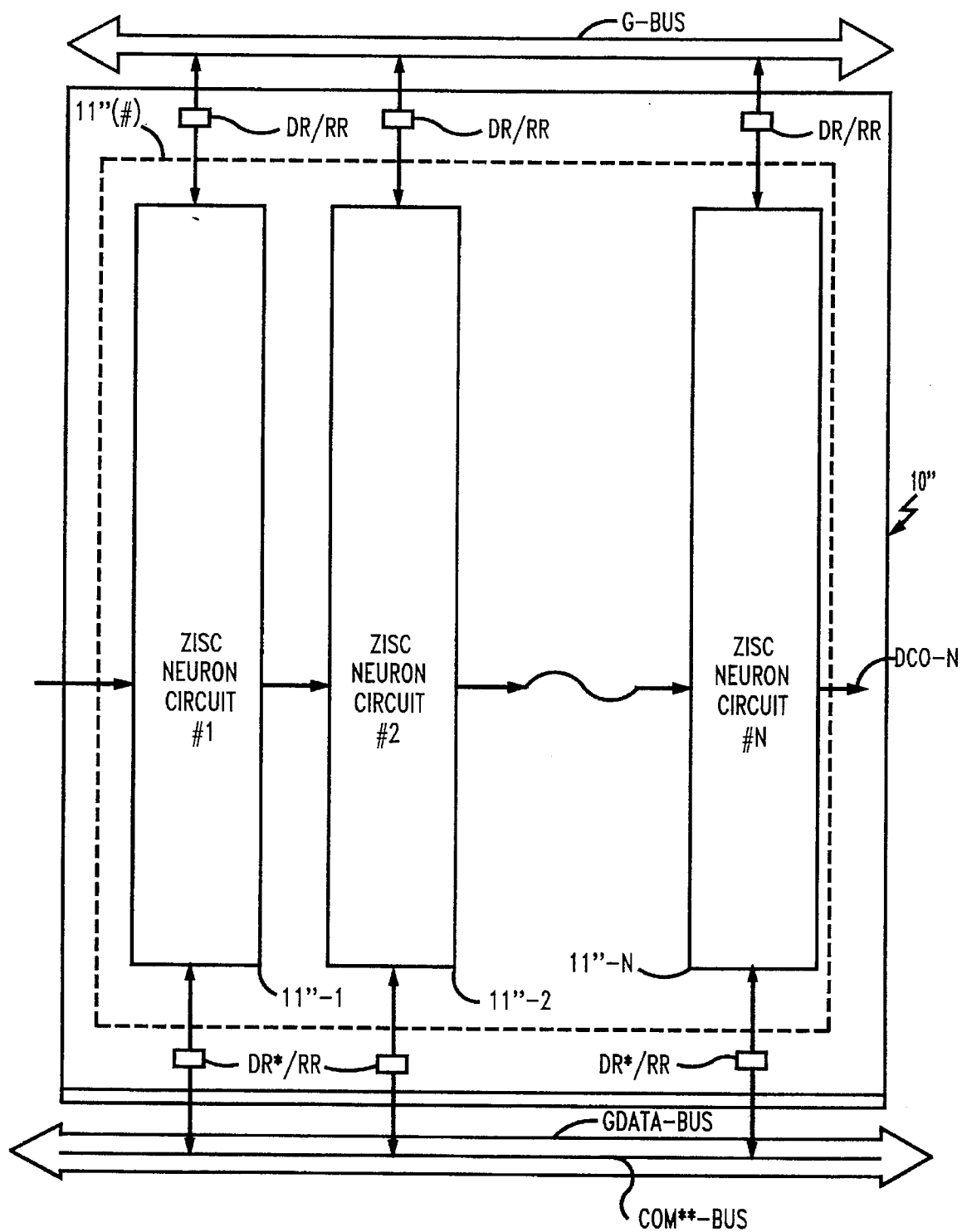
FIG. 10 shows a schematic block diagram of a second alternate base neural chip of FIG. 4(B).

FIG. 10 is a second alternative embodiment base chip 10" wherein OR circuit 12 is omitted. In this second alternate embodiment, a global OR function replaces OR circuit 12 and Receiver/Driver block 12. This second alternate embodiment base chip's outputs are the result of buffering each neuron's local NR and NOUT signals with a driver circuit DR* and, then, dotting the driver outputs directly to the COM-BUS. Optionally, instead of individual functions performed by blocks 13 to 18, these functions may be included in each neuron circuit 11", as illustrated in FIG. 10. Thus, each neuron 11" is essentially a complete bit slice of the preferred embodiment base chip 10. This alternate base chip 10" is therefore, a plurality of neuron circuits labelled 11"-1 to 11"-N forming neural unit 11"(#). In this second alternate embodiment base chip 10", the OR-BUS is merged with and is indistinct from the interconnects between each of the neuron circuits 11" and the COM-BUS (at driver/receiver circuit DR*/RR). Like the preferred embodiments, this second alternate embodiment base chip 10" is a parallel neuron architecture, but because OR gate 12 is not included, there are thirty one (3+14+14) COM-BUS connections for each neuron circuit 11" on the base chip 10". The two input buses, SEL/CTL-BUS and INDATA-BUS, are merged off-chip into a common Global input BUS G-BUS to improve the compactness and granularity of this alternate embodiment base chip 10". However, it is easy to see that, for each neuron with 31 COM-BUS connections and with a comparable number of neuron input connections to the G-BUS, this alternate embodiment base chip 10" quickly becomes I/O limited as the number of neurons increases.

A derivative of this alternate embodiment chip 10" is that an individual neuron circuit 11" may be included as a book in a gate array library. Since such a neuron book has a granularity of 1 (instead of 36 in the particular implementations of the preferred embodiment chip 10 and in first alternate embodiment chip 10' described above), a growable neural network macro could be built therefrom. The above alternate embodiments are provided for example only and are not intended as limitations. Other alternate embodiments, including intermediate architectures, also are contemplated. However, because of its versatility, the base chip 10 in FIG. 4(B) is the preferred embodiment for multi-chip applications.

* THE ELEMENTARY NEURAL NETWORK MODULE ARCHITECTURES *

In extending the convention defined above and used herein to multi base chip modules: To differentiate between multiple base chips on an elementary module, as provided above, parentheses designate a specific chip related reference (e.g. chip (q) designates the qth chip in a chain). Square brackets designate an elementary module reference, e.g. 10[A]. Likewise, buses and circuitry of an elementary module 10[A] are distinguished by their bracketed module designation. Further, a complex module including multiple elementary modules is designated with braces, e.g. 10{A}. For example, in distinguishing between different elementary modules of a complex module 10{A}, 10[r] designates the rth elementary module in the assembly. Likewise also, buses and circuitry of a complex module are distinguished by their module designation; e.g., the neural network formed in a complex module 10{A} is referenced 11{A}.

Figure 11:
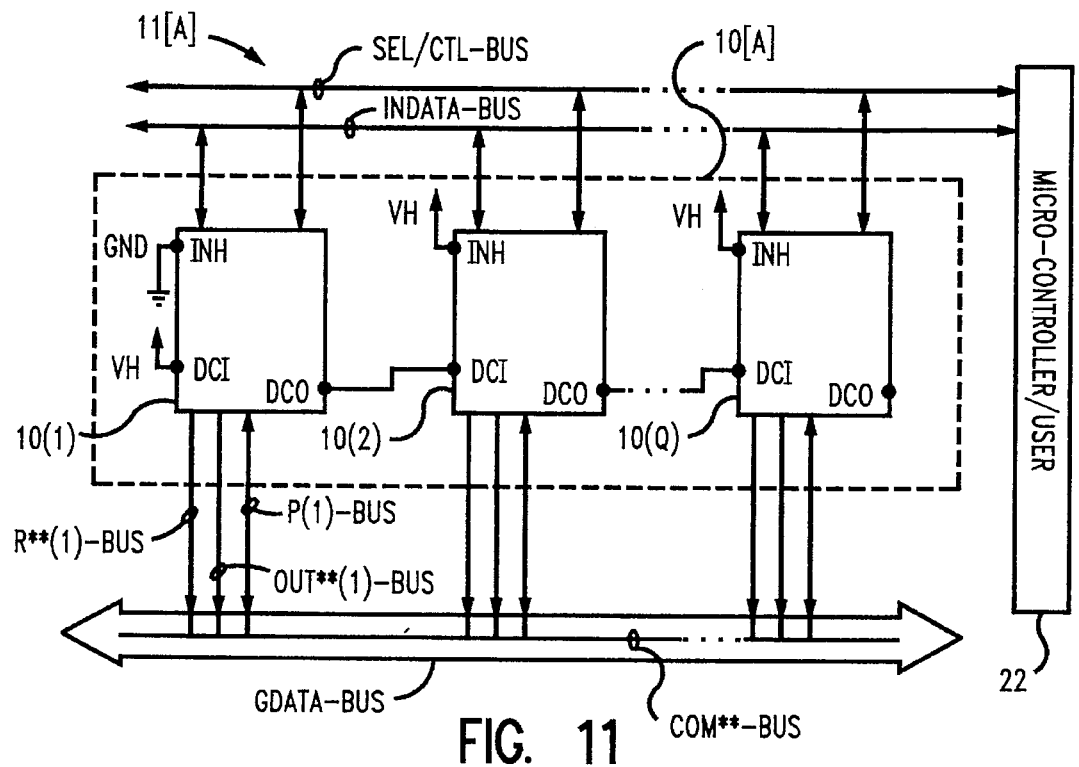
FIG. 11 shows an elementary module formed by assembling a plurality of base neural semiconductor chips of FIG. 4(B) connected in series to illustrate the cascadable capability of multi-chip neural chips of the present invention.

FIG. 11 is a schematic block diagram of elementary module network 10[A] formed from a plurality of cascaded base chips referenced 10(1) to 10(Q). Generally, Q represents the maximum number of base chips 10 that can be cascaded, limited only by technology considerations, e.g. I/O fan out. An elementary neural network 11[A] (not shown) is formed from the base neural networks 11(1) to 11(Q), in each respective base chip 10(1) to 10(Q). The elementary module 10[A] is constructed by cascading several multi-chip base chips 10 of FIG. 4(B) and connecting the elementary module 10[A] to micro-controller/user 22 on the INDATA-BUS and SEL/CTL-BUS. FIG. 11 shows the parallel connection of the base chips 10 to the INDATA-BUS, the SEL/CTL-BUS and the COM**-BUS. Thus, the neural capacity limit for a preferred embodiment neural network 11[A] is extended when base chips 10(1) to 10(Q) are serially linked to form an elementary module 10[A].

Further, as described above, the serial connection of daisy chain signals between chained neurons 11 is extended to chained base chips 10. As with the smaller neural networks 11(A) described above, the DCI input of the first base chip 10(1) is connected to a first reference voltage VH, applying a one thereto. To extend the chain, linking the first chip 10(1) to the second 10(2), the DCO output of chip 10(1) is connected to the DCI input of the second chip 10(2), and so on until chip 10(Q) is linked. Thus as each individual base chip's 10(Q) neurons become engaged, the DAISY registers of the neuron circuits are filled with one's, until the chip's FULL signal, the final neuron's Daisy Chain Output DCO(Q), is driven high. As indicated above, for each chip, each DCO(q) is a FULL signal. The entire neural network is full when DCO(Q)=1. The R-BUS, OUT-BUS and the P-BUS outputs from each base chip 10(1) to 10(Q) are dot OR'ed to the COM**-BUS of the GDATA-BUS.

Both the INDATA-BUS and the SEL/CTL-BUS are bidirectional. Since, every engaged neuron in the neural network is involved in recognition of an input vector, the micro-controller/user 22 can write simultaneously into register 184.1 of every base chip 10(1) to 10(Q) through the INDATA-BUS. However, the micro-controller/user can read each base chip's global response (stored in register 184.1) one chip at a time. An INHibit input INH is provided to each base chip 10 for selectively enabling or disabling the driver portion of the Receiver/Driver RR/DR on the INDATA-BUS and SEL/CTL-BUS Input/Outputs (I/O's). So, by holding INH high (at VH) for each of base chips 10(2)–10(Q) and by driving INH(1) low (to GND), the drivers in base chips 10(2)–10(Q) are inhibited; while in base chip 10(1), the drivers are enabled. Thus, only base chip 10(1) drives the INDATA-BUS and SEL/CTL-BUS and, for this example, micro-controller/user 22 reads only from base chip 10(1).

The INDATA-BUS, SEL/CTL-BUS and GDATA-BUS interconnect all the base chips in parallel. So, the elementary module 10[A] is formed simply by interconnecting (cascading) a selected number of base chips 10. The base neural network 11[A] formed from the cascaded base chips of elementary module 10[A] has a neural capacity equal to the sum of the neural capacity of chips 10(1) to 10(Q) and substantially, works as if a single monolithic base chip 10. This cascadable base chip enables forming an elementary neural network 11[A] of an unlimited base chips 10, at least theoretically, or as large as needed for a particular application without additional circuitry. Further, because of the flexibility of the base chips of the present invention, any elementary neural network 11[A] can be configured by the micro-controller/user 22, either as a single network or, as separate subsets thereof. Subsets may be formed by providing different contexts and, then, selectively comparing between the respective context the chip's main NO/CXT register 17 and local No/Cxt register 100 in each neuron circuit 11. Unfortunately, practical technology limitations result from dot ORing multiple base chips onto the COM**-BUS that limit cascading base chips, to a practical maximum of Q=8. However, this limit can be extended to allow for a much larger neural network, by adding an external OR circuit, 23 in FIG. 12.

Thus, a complex module 10{A} is formed by assembling, in this example, two elementary modules 10[1] and 10[2]. The global connection of the DCI and INH terminals of the first chip 10(1) of elementary module 10[A] also must be followed here for the first base chip 10 of this chain of elementary modules. Again, because the base chip 10, is at once modular and easily cascaded, the respective modules 10[1] and 10[2] are connected to communication buses, COM[1]-BUS and COM[2]-BUS, to a two way OR circuit 23 (which represents a block of seventeen two-input OR gates). Two way OR circuit 23 is buffered and redriven through a conventional driver DR, connected to the COM*-BUS. The COM*-BUS is connected to the P-BUS of each of the base chips in the complex module 10{A}. A skilled artisan would understand how to further expand the complex module 10{A} to any number of elementary modules 10[A] by appropriate substitution for two input OR circuit 23 with an n input OR circuit (where n is the number of elementary modules 10[A]).

It is intended that OR functions are either by hardware (e.g. OR circuit 12) or by dotting (e.g. the hard-wired OR function on the COM**-BUS). Optionally, OR functions may be through NAND gates by applying de Morgan theorem. For example, in the preferred embodiment, the global result fire signal F* is the result of ORing (in an OR sub-circuit) all of the local result fire signals of the neuron circuits 11-1 to 11-N, i.e. F*=F1 OR . . . OR FN. So, maintaining the logic relationship, this is equivalent to $\overline{F^*} = \overline{F1}$ AND . . . AND $\overline{FN}$.

DESCRIPTION OF BASE NEURAL NETWORK CHIP OPERATION

Figure 12:
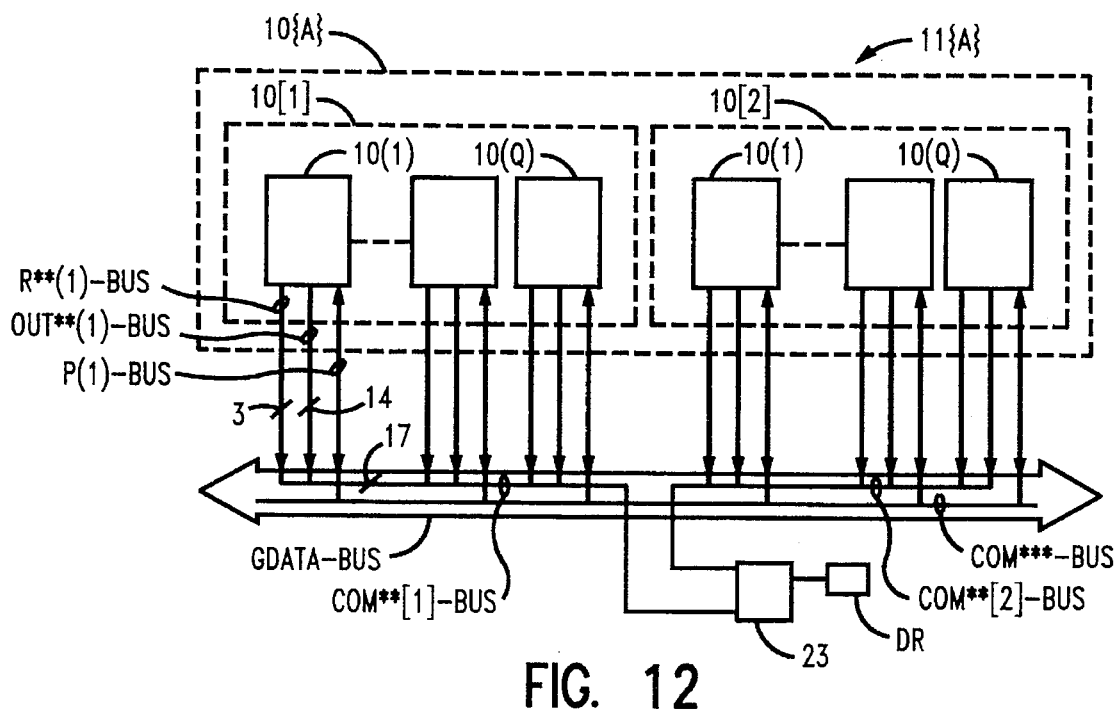
FIG. 12 shows a complex module formed by assembling two elementary modules of FIG. 11 with minimal additional circuitry.
Figure 13:
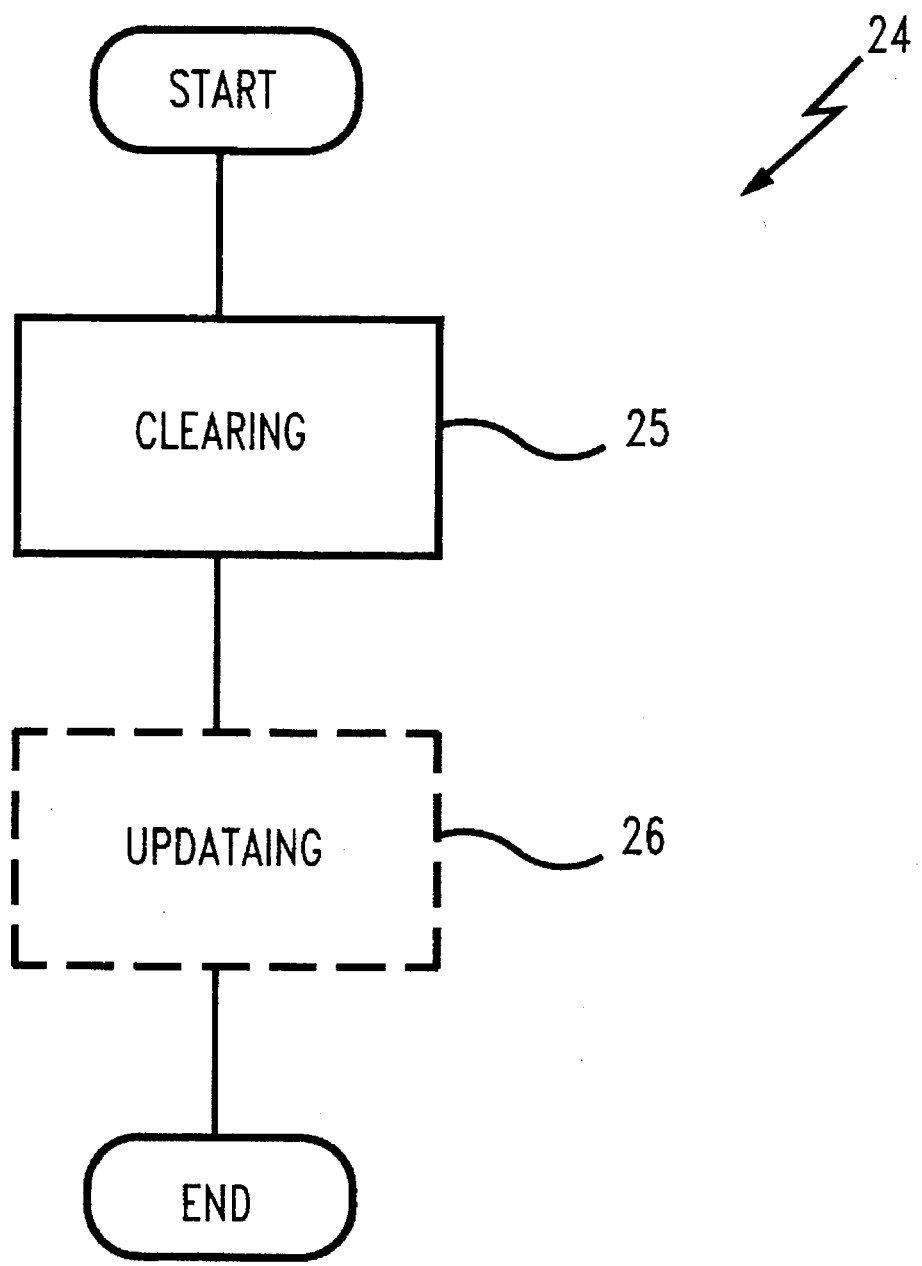
FIG. 13 shows the flow-chart of the initialization steps of a base neural network according to the present invention.
Figure 14A:
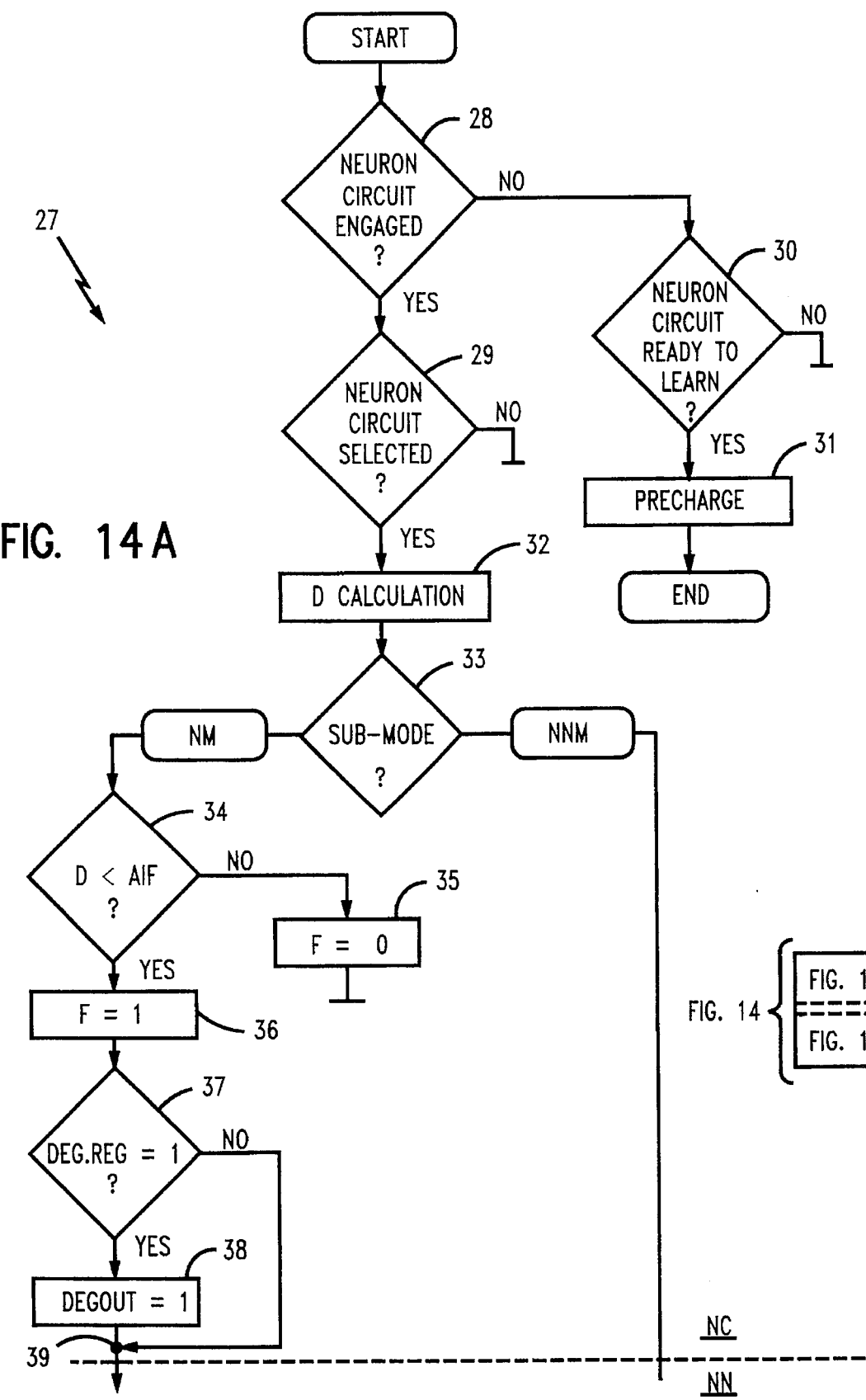
FIGS. 14(A) and (B) show the flow-chart of the steps of the recognition phase of a base neural network according to the present invention.
Figure 14:
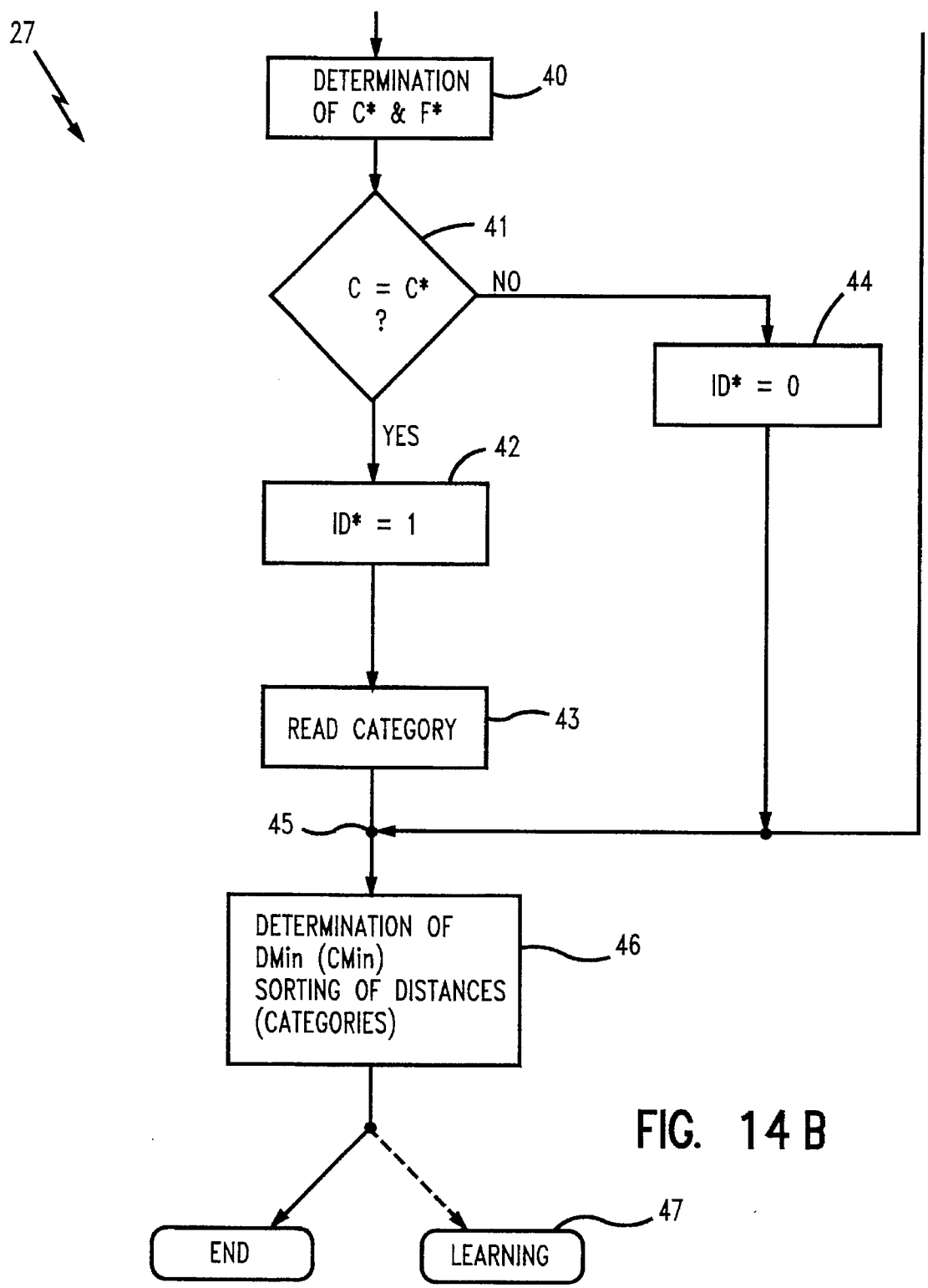
Figure 15:
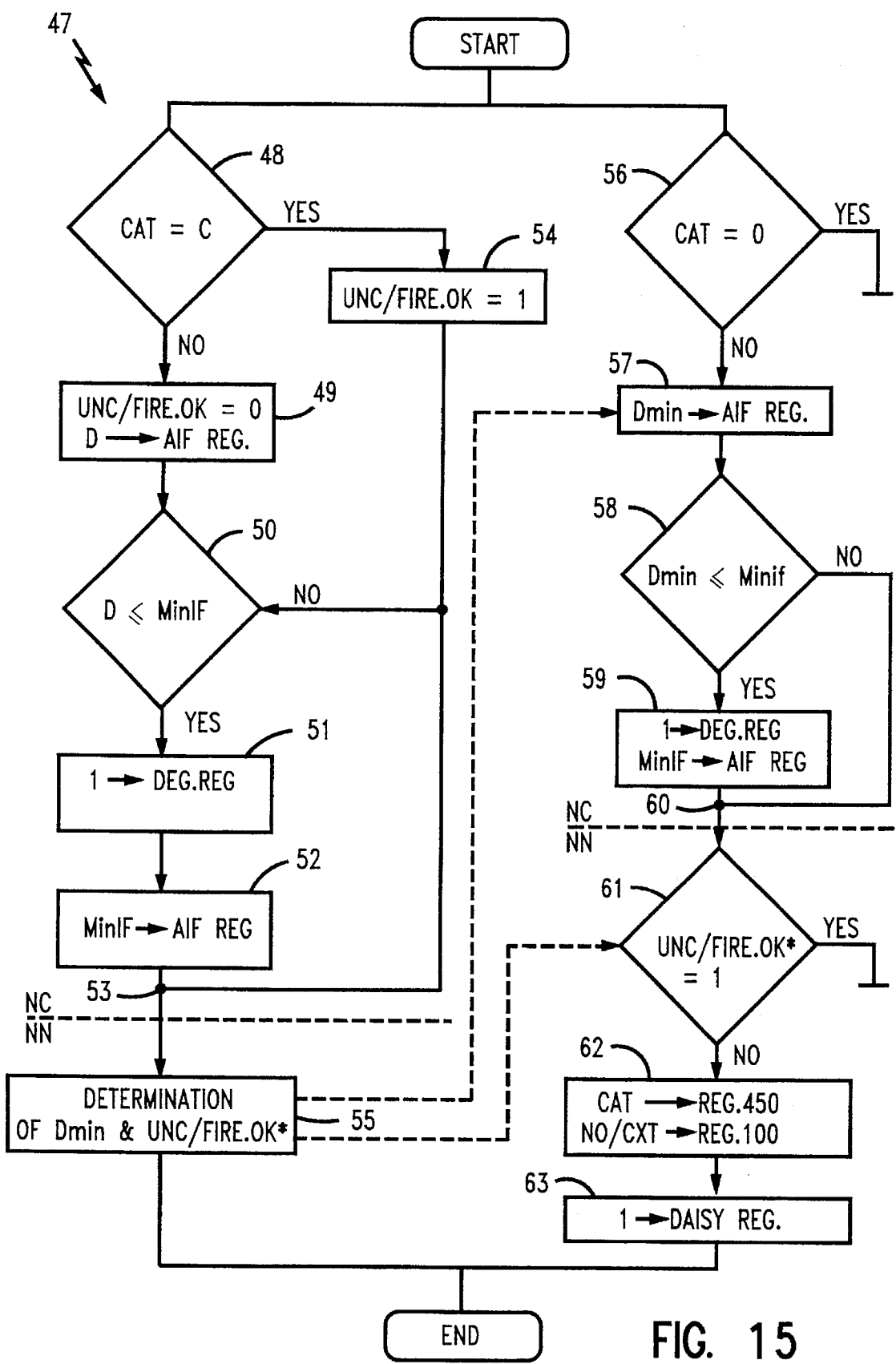
FIG. 15 shows the flow-chart of the steps of the learning phase of a base neural network which includes the reduction process and the engagement process according to the present invention.

FIGS. 13 to 15 are flow charts modes of operation of the Base Chip, i.e., the INITIALIZATION, RECOGNITION AND PRE-CHARGE and LEARNING modes. To facilitate understanding, where appropriate, reference is made to specific chip or neuron circuit blocks in FIGS. 4 to 12.

* INITIALIZATION MODE *

The base Chip 10 is in its Initialization mode during the initialization phase. FIG. 13 is a flow chart of the INITIALIZATION phase, which is essentially a single step, the clearing step 25. During the clearing step 25, the contents of certain base chip registers (including neuron registers) are loaded with initialization or default values. Thus, MaxIF register 14 and MinIF register 15 both are loaded with respective MaxIF and MinIF values. A predefined (e.g. zero) value is loaded in main NO/CXT register 17. A zero value (indicating the neuron is free) is loaded in the DAISY Register of each neuron's daisy chain circuit 600 and into each neuron's category register 450. Optionally, the R/W memory circuit 250 and the remaining registers need not be loaded with predetermined values, and are thus undefined at power-on.

An optional second step of updating 26 may be included. In this optional step, the micro-controller/user 22 may change some initialized values, e.g. the set-up parameters (MaxIF, MinIF), the input context and norm data in main NO/CXT register 17. In particular register 184.1, which holds operating mode data and global response data may be updated. These values are initialized 25 and updated 26 over the INDATA-BUS under the supervision of control signals from the SEL/CTL-BUS.

* RECOGNITION AND PRE-CHARGE MODES *

After the initialization phase is complete, the base chip 10 enters its normal operating phase, i.e., its recognition phase. The base chip is in its Recognition mode during the recognition phase. The Recognition mode is best understood by examining base chip operation after some neuron circuits are already engaged (i.e., some have learned) but, also, while some are still free. FIGS. 14(A) and 14(B) are a flow-chart 27 illustrating the steps performed in the base chip 10 during the recognition phase. FIG. 14(A) represents individual Neuron Circuit (NC) flow. FIG. 14(B) represents the base chip level flow, i.e., the Neural Network (NN) level flow.

The Neuron Circuit flow steps of FIG. 14(A) occurs in parallel in each neuron in the network, simultaneously. During the start of the recognition phase, the micro-controller/user 22 successively loads the components of an input vector A into the A register 13 of base chip 10 via the INDATA-BUS under control of signals from the IADD/CTL-BUS. The data loaded in the A register 13 are then passed on the DATA-BUS to all of the neuron circuits of neural unit 11(#), i.e. both those that are engaged as well as those still free. As described above, each neuron is tested 28 to determine whether it is engaged or free by comparing the neuron's DCI and DCO signals in its daisy chain circuit 600.

If, the result of the first test 28 indicates that the neuron circuit is not engaged, then it is free and the neuron is tested 30 to determine whether or not it is the first free one, (box 30) i.e. the ready to learn neuron circuit. If not, no further tests are made. However, if the test 30 result is YES, the ready to learn neuron circuit enters its "pre-charged" mode (box 31). When the ready to learn neuron is in its pre-charge mode 31, the components of the input vector are stored in the R/W memory circuit 250. Once a neuron circuit has learned and, therefore, is no longer free, it is engaged. For each engaged neuron circuit, the components of a prototype vector were stored, previously, in the neuron's R/W memory circuit 250 and are "frozen" therein by control signal RS disabling a WRITE operation.

However, if the neuron circuit is engaged (a YES at box 28) then it is tested to determine whether the local context portion (Cxt) of its norm/context register 100 matches the input context portion (CXT) held in the main NO/CXT register 17. If Cxt=CXT, the neuron is also selected. A neuron that is both engaged 28 and selected 29 is "committed." However, if the input context portion is equal to zero, all engaged neuron circuits of the base chip 10 participate in the recognition phase. In this case, "committed" is treated as equivalent to "engaged". Recognition occurs only in a committed neuron circuit 11, i.e., those wherein the tests in boxes 28 and 29 have resulted in an affirmative answer.

For reduced power consumption, if an engaged neuron circuit 11 is not selected 29, its operation is halted. Optionally, engaged neurons that are not selected may be allowed to continue to operate, as described for a committed neuron, at the cost of increased chip power consumption. However, in either case, the local response of an uncommitted neuron is a "don't care" and, therefore, does not influence the global result and output data.

Next, in box 32, each committed neuron's distance evaluator circuit 200, calculates, the distance D between the input vector A and the prototype vector B. Because the local norm (No) used selects the method of calculation, this calculated distance D may vary. After calculating the distance D between the prototype vector B and the input vector A in block 32, then in block 33, each committed neuron enters either its Normal sub-Mode (NM) or its Nearest Neighbor sub-Mode (NNM). In its Normal sub-Mode NM, the distance compare circuit 300 compares the calculated distance D with the AIF value stored in the neuron's AIF register 352, in block 34, to generate the LT signal. This test in block 34 determines whether the input vector A is within the neuron's actual influence field, i.e. D<AIF. If not, then, in block 35, neuron circuit 11 does not fire and F remains inactive, i.e. F=0. If the neuron does not fire, that neuron has completed its involvement in the recognition process. However, if the input vector A is within the neuron's influence field, i.e. D<AIF, then LT is active (LT=1) and the neuron circuit 11 fires in block 36. The active LT signal is passed to the identification circuit 400 to set F active (F=1).

If the neuron circuit 11 fires, it has recognized the input vector A and continues recognition to determine whether it has identified the input vector. So, next, in box 37, it is determined whether the firing neuron has degenerated or not. The DEG register content in identification circuit 400 is tested, a one therein indicating that the neuron has degenerated. If the neuron circuit 11 has degenerated (because the DEG register is a "1"), then, in box 38, the DEG signal (also identified as DEG.REG) is active, and in turn, the DEGOUT signal is set active (i.e. DEGOUT=F AND DEG=1). The Neuron's output includes both the DEGOUT output in box 38 and, the NO output of test box 37. These two branches are merged in common node 39 and, then, passed to Neural Network flow diagram 14(B). This transition between the neuron circuit flow and the neural network flow is labelled NC/NN and is represented by the dotted line in FIG. 14(A).

Each of the firing neuron circuits generate local results and local outputs that are combined to form a global result and a global output. These global results and global outputs are formed at the Neural Network level. Thus, in box 40, all the local categories of the committed neuron circuits are ORed in OR circuit 12 to produce the global category C* on the OUT*-BUS, which is subsequently fed back to the neural network on the OR-BUS. Also in box 40, if at least one committed neuron circuit has fired in box 36, then, the global result signal F* is active (F*=1). Global result signals F* and DEGOUT* are passed from their respective dedicated OR sub-circuits to the R*-BUS.

Next, after determining whether firing neuron circuits 11 have degenerated or not, in box 41 it is determined whether the input vector has been identified or not. If more than one committed neuron circuit of base neural network 11(A) has fired, the result may be ambiguous. Therefore, each firing neuron compares its local category C with global C* in its identification circuit 400. If the comparison result is positive for every firing neuron, then there is no ambiguity, the local category C is equal to the global category C*, and, in box 42, the input vector has been identified (ID*=1). Also, each identifying neuron's ambiguity signal UNC/FIRE.OK, as well as every non-firing neuron's ambiguity signal remains inactive (UNC/FIRE.OK=0). Therefore, in box 42, if all of the local ambiguity signals remain inactive, the global result (ambiguity) signal UNC/FIRE.OK* remains equal to zero. Consequently, global IDentification result signal, ID*=F* AND UNC/FIRE.OK* is active, i.e. ID*=1 (box 42). Thus, the input vector has been identified (ID*=1) as having a category C*. This category C* on the COM*-BUS is stored in register 184.1. Optionally, this category C* may be read in box 43 by the micro-controller/user 22.

However, in box 41, if one firing neuron circuit has a local category C that does not match the global result category C*, then the input vector has not been identified, unambiguously. Instead, the result is ambiguous because, although the input vector has been recognized by two or more neurons, the recognizing neurons include more than one category. Therefore, the input vector cannot be associated with any one category in particular. So, in the unmatched neuron circuits, UNC/FIRE.OK is set to "one". Therefore, global result signal UNC/FIRE.OK*=1 and, in box 44, ID*=0. ID*=0 indicates that the input vector has not been identified.

Although, the outputs of boxes 43 and 44 merge with the NNM branch in a common node labelled 45, in the NM sub-mode, the micro-controller/user 22 may require additional processing. For example, the micro-controller (user) may require a minimum distance or category determination as well as sorting all distances or categories and then, making the sorted results available on the COM*-BUS. So, in box 46, the Dmin or Cmin must first be determined. The aggregation of each individual committed neuron circuit's search/sort circuits collectively determine the minimum distance Dmin (or Cmin), i.e. the smallest calculated distances D (or C) from among the committed neuron circuits. Also, in box 46, after finding that minimum value, if further required by the micro-controller/user 22, the aggregated search/sort circuits also sort the remaining distances, preferably in increasing order, and place the sort results on the OUT*-BUS. Also, if more than one neuron circuit has fired, the resulting distances and/or related categories may be output either interleaved or in a continuous sequence upon request and under the supervision of the state machine 183. However, if only one neuron circuit has fired, only its distance or its category data are output on the OUT*-BUS. The sorted distance or the sorted category data are provided either directly from the COM*-BUS to the micro-controller/ user 22 or, alternatively latched in register 184.1 to be read subsequently, by the micro-controller/user 22.

In the other Recognition sub-mode, the Nearest Neighbor sub-Mode (NNM), there is no comparison between calculated distance D and the AIF value. Instead, the micro-controller/user 22 requires all of the neuron's search/sort circuits, without restriction (i.e. whether having fired or not) to determine the minimum distance or category (Dmin or Cmin) and, then, to sort and output the remaining distances (or categories) as described above. As is apparent from FIG. 14, NNM is only the step performed in box 46.

Finally, both sub-modes end when the RECOGNITION mode ends in the box labelled END in FIG. 14(B). Alternatively, at the end of the recognition phase, a neuron circuit 11 may enter the learning mode box 47.

\* LEARNING MODE \*

There are several reasons a neuron circuit may enter the learning mode such as for the first use of a "blank" or "virgin" neural network 11(A). Also, if the micro-controller/ user is not satisfied with a global response, e.g. the neural network 11(A) provides an incorrect category, a neuron may enter the learning mode. During a neural network's first use, none of the neuron circuits have learned, so none fire. Therefore, F*=0, UNC/FIRE.OK*=0 and, consequently, ID*=0, the global results after the first use indicate that the input vector A has not been identified by the neural network 11(A). A significant advantage of the present invention is that during the previously described recognition phase, in boxes 30 and 31, the ready to learn neuron is pre-charged as the components of the input vector A are stored therein. In a blank neural network 11(A), the ready to learn neuron is the first neuron in the chain.

Once the first neuron is engaged (i.e. has learned), and as long as other neurons remain free, the LEARNING mode is, basically, either: The reduction process in all engaged neurons; or, The engagement process in the ready to learn neuron. During the reduction process, any firing neuron circuit with a local category C different from the input category CAT, has its AIF register 352 automatically reduced so that its influence field (firing range) is contracted and, therefore, does not encompass the input vector.

On the other hand, if none of the neurons have recognized the input vector, then the ready to learn neuron circuit is selected and engaged. For simplicity, although part of the learning phase is in pre-charging the ready to learn neuron, the learning phase is taken as occurring after the recognition phase. Learning is performed under the supervision of the Status and Control Logic Circuit's 18 state machine 183. The state machine 183 provides control to sequence all the neuron circuits of the neural network 11(A) in parallel.

FIG. 15 is a flow diagram of the reduction and engagement process steps for firing neurons entering the learning mode in box 47 of FIG. 14(B). The left part of FIG. 15, boxes 48–55, is the flow of the reduction process in a fired neuron circuit, while the right is the flow of the engagement process, steps 56–63, in the ready to learn neuron. The learning process begins by setting the Learning Signal L active (L=1) in the box labelled START.

First, in box 48, if a neuron has fired, but the input vector was not recognized, input category CAT is tested against local category C for equality in comparator 402 in FIG. 25. If CAT and C are different, the comparator 402 output is "1" (NO). Although the neuron circuit 11 has fired, it has not identified the input vector and, so, its AIF must be reduced. A special case that always results NO, is where input category CAT=0. This result is always NO because the local category of a committed neuron circuit, by definition, is different than zero. So, if the result of the comparison 48 is negative, the "1" from comparator 402 is inverted by XOR gate 403. The "0" from XOR gate 403 is AND'ed with the Fire Signal F in AND gate 409 to drive UNC/FIRE.OK. The UNC/FIRE.OK output from identification circuit 400 goes to zero in box 49. In the LEARNING mode, the neuron's UNC/FIRE.OK signal indicates whether the neuron's influence field must be reduced. Also in box 49, the calculated distance D, previously stored in a dedicated register of evaluator circuit 200, is loaded into the AIF register 352.

Next, in box 50, distance D is compared with MinIF in compare circuit 300 to generate the LTE signal. If D is less than or equal to MinIF, a positive comparison (LTE=1) result indicates that the neuron circuit 11 has degenerated. So, in box 51, the output of AND gate 406 goes high and is passed through DEG.REG 400 is also active (DEG=1) as the DEG output of the identification circuit 400. In box 52, the active DEG signal gates the MinIF value into the AIF register 352, thereby overwriting the previously stored D value to reduce it. If, on the other hand, the result of the comparison of box 50 is negative, steps 51 and 52 are bypassed 53.

However, the firing neuron circuit has identified the input vector if the result of category comparison in box 48 is positive, i.e if CAT=C. Therefore, for this result, the neuron's AIF is not reduced. Instead, in box 54, the UNC/FIRE.OK signal of that firing neuron circuit 11 is active (UNC/FIRE.OK=1). Steps 49–52 are bypassed, merging the results of boxes 54 and 54 at common node 53.

Finally, in box 55, the minimum distance Dmin and global result UNC/FIRE.OK* are determined. Both values are required in engaging the ready to learn neuron circuit (if it is engaged). These determined values are placed on their respective buses (as described above in the description of FIG. 14) and are latched into register 184.1 of the ready-to-learn neuron.

As with the reduction process, engaging the ready to learn neuron, as provided in the right part of FIG. 15, is initiated at the box labelled START, setting L=1. First, the value of the input category CAT is tested in box 56, to determine whether CAT is equal to zero or not. If CAT=0, then engagement stops and only the reduction process continues in committed neurons as described above. However, if CAT is different than zero, then, in box 57, the lesser of Max IF and the minimum distance Dmin (as determined in box 55) is loaded into the ready to learn neuron's AIF register 352. Next, in box 58, Dmin is compared with MinIF to determine if Dmin is less than or equal to MinIF. If the comparison result is positive, then the output of AND gate 406 is high, and, in box 59, a "one" is loaded in the DEG register 407. Simultaneously, with loading DEG.REF 407, the MinIF value is loaded into the AIF register 352. If, instead, Dmin is greater than MinIF, box 59 is bypassed 60.

Next, the global result signal UNC/FIRE.OK*, determined in box 55, is tested in box 61 as to whether the input vector has been identified by at least one neuron circuit, which terminates the engagement process. Alternatively, this step 61 of determining whether the input vector has been identified may be done earlier, between determining whether the input category CAT is non-zero 56 and loading Dmin into the AIF Register 57. If, however, the input vector has not been identified (i.e. UNC/FIRE.OK*=0), then, the ready to learn neuron must be engaged, and so the engagement process continues. Next, in box 62, the input category data CAT are loaded into the ready-to-learn neuron's local category register 450 from the CAT-BUS and the input norm/context data are loaded into the ready to learn neuron's local Norm/Contest Register 100 from the main NO/CXT register 17 on the NO/CXT-BUS. Finally, in box 63, a "one" is shifted into the DAISY register from the ready-to-learn neuron's DCI input. With the Daisy Register loaded, the neuron is engaged and the engagement process ends. The DAISY Chain circuit 600 input DCI and output DCO of the newly engaged neuron circuit are both equal to one.

The learning phase ends when either: The AIF value has been readjusted in all firing neuron circuits that had incorrectly recognized the input vector; and/or when the newly engaged neuron circuit has its local category and norm/context registers loaded and its AIF value established.

Although the above description of reduction and engagement describes the learning process after recognition has begun, i.e., after at least one neuron is engaged, initially, all of the neuron circuits are free. When the first input vector is presented to the neural network 11(A) for recognition, the input vector's components are successively applied on the INDATA-BUS, in parallel, to each neuron's R/W memory circuit 250. The calculation that is then performed in the neurons' distance evaluator circuits 200 and the comparison in each neuron's distance compare circuit 300 is not significant. Since, at first, none of the neurons are engaged, none recognize the first input vector. Therefore, every neuron's identification circuit's 400 local result fire signal F is zero, as is global result fire signal (F*=0). The first neuron 11-1 in the chain, which is the ready-to-learn neuron circuit, therefore, learns this first input vector, as described above. As a result of loading the components of this initial input vector during the initial recognition phase, the first (free) neuron circuit is pre-charged. Thus, the first neuron circuit is engaged by precharging it with the initial input vector as its prototype vector and, then, loading its AIF register 352 with MaxIF.

Advantageously, each neuron of the base chip may be efficiently pre-charged with the components of input vectors A by loading the components into the ready to learn neuron's R/W memory circuit 250 during the recognition phase. The ready to learn neuron circuit is easily identified, because it is the only neuron circuit of the neural network 11(A) having DCI and DCO signals that are complements of each other. This pre-charge function is unlike prior art neurons and neural networks which required a separate step of storing input vector components as a preliminary step of the learning phase and, then, a second subsequent step during which the input vector is presented again to the neural network. As a result, during the recognition phase, the ready to learn neuron circuit is automatically pre-charged, i.e. prepared for being subsequently engaged, as determined by the neural network itself. However, a pre-charged neuron circuit is still not engaged until both the input category CAT is loaded into its category register 450 and a one is loaded into the DAISY register (601 in FIG. 31) of Daisy Chain Circuit 600. Each time an input vector is identified, learning is not required. Therefore, the stored (pre-charged) components are overwritten with the components of the next input vector, when the neuron is again precharged in that recognition phase. Once a neuron circuit is engaged, the control signal RS changes to its READ state to prevent a subsequent WRITE into the newly engaged neuron's R/W memory circuit 250.

The learning phase encompasses both reduction in engaged neurons and engagement in the ready to learn neuron. The first part of the engagement process, pre-charge, is during the recognition phase, when the input vector is stored in the R/W memory circuit 250 of the ready-to-learn neuron circuit. The engagement process terminates once the desired input category is loaded into the category register 450 and a "one" is loaded into the DAISY register of the daisy chain 600. During the reduction process, when required, the value in the AIF register 352 is reduced in firing neuron circuits that have local categories different from the input category CAT.

The neural network 11(A), itself, controls all of the steps of the learning phase. The neural network alone, free from any external supervision, (i.e. from the micro-controller/user 22) simultaneously and automatically reduces the influence field in all affected neuron circuits or, engages the ready to learn neuron. All of the neurons simultaneously sequence through either the engagement process or the reduction process, individually, synchronously controlled by the individual neuron's state machine 183. Therefore, the learning process is totally contained by the neural network and completely automatic. In contrast to conventional neural networks, and in accordance with a key advantage of the present invention, the recognition phase and the learning phase are distinct from each other and the pre-charge for the learning phase is done simultaneously with the recognition phase.

* SAVE AND RESTORE MODES *

Additionally, the preferred embodiment neural network chip 10 of the present invention has two other modes. They are a SAVE mode and a RESTORE mode. As their names imply, these modes allow saving the state of a neural network and, then, subsequently restoring the neural network to that saved state. Thus, for example, the state of a neural network may be saved at power-down and, then, restored upon power-up.

During the SAVE phase, the chip enters its SAVE mode. All data in the various base chip registers (including those of individual neuron circuits) are accessed (READ) by the micro-controller/user 22 and, then, saved on non-volatile storage media, such as on a hard disk. The saved data includes: Each engaged neuron's prototype vector B components from its R/W memory circuit 250; Each neuron's AIF register 352 contents; Each neuron's category register 450 contents; Each neuron's Local Norm/Context Register 100 contents; the neural network's set up parameters; etc. The RESTORE mode is, basically, the reverse of the SAVE mode. The micro-controller/user 22 may restore the neural network exactly as it was saved by loading appropriate registers and weight memory. Optionally, the micro-controller/user 22 may modify the saved data, and then restore (WRITE) the modified saved data into appropriate registers. With the preferred embodiment base chip 10, the SAVE and RESTORE operations take advantage of multiplexer 501 in the Dmin determination circuit 500 (FIG. 8) and of the inherent characteristics of the daisy chain circuit 600.

The base chip is placed in the SAVE mode by providing it with a input vector A with all of its components equal to zero. Just as it selects the first free neuron, the Daisy Chain Circuit 600 sequentially selects individual neuron circuits for saving. Then, the base chip, places each selected neuron's prototype vector B components on its DIST-BUS. As each neuron is selected, multiplexer 351 passes the contents of its AIF register 352, the data from the neuron's DIST-BUS or, the MaxIF/MinIF value on its MaxIF/MinIF-BUS to its output, the J-BUS. The J-BUS, the local category data C and the local norm/context No/Cxt data are the inputs to multiplexer 501 in FIG. 8. The multiplexer 501 output is a first input signal to search/sort circuit 502. Control signals from the IADD/CTL-BUS to both multiplexers 351 and 501, select what is passed to search/sort circuit 502. Finally during save, data at the selected neuron's search/sort circuit 502 input is passed out from the neuron's Dmin determination circuit 500 output on the NOUT-BUS. The local output NOUT of all other neurons is zero (neutral). All of the neuron outputs NOUT are OR'ed in OR circuit 12 and passed to the OUT*-BUS.

As the data is placed on the OUT*-BUS, it is fed back on the M-BUS to register 184.1 where it may be stored, temporarily, and then passed to the micro-controller/user 22. Alternatively, the fed back data may be passed directly to the micro-controller user 22 through a multiplexer (not shown) connected between the INDATA-BUS and the M-BUS. An interface circuit, (not shown) located in Control Logic circuit 182 and, controlled by the State Machine 180, selectively passes the data back on the INDATA-BUS, when requested by the micro-controller/user 22. The micro-controller/user 22 sequentially selects each neuron in the neural network using controls on the COM*-BUS. The daisy Chain Circuit 600 using these signals on the COM*-BUS ensures that only one neuron circuit 11 is selected at a time.

In the RESTORE phase, the micro-controller/user 22 sequentially places the data on the INDATA-BUS. Each appropriate register is successively selected by control signals on the IADD/CTL-BUS. Then, the data on the INDATA-BUS is stored in the selected register or, in appropriate R/W memory circuit 250 locations in individual neurons.

Both the SAVE and the RESTORE phase are simple, each requiring only a few steps. First, the micro-controller/user 22 sets the (SAVE or RESTORE) mode. In both modes, there is a preliminary step, wherein all the neuron's DAISY registers are reset, i.e. initialized. In Restore, the micro-controller/user 22 selects data for one of the registers or, for a particular location in a neuron's weight memory 250 and, then, placing the appropriate address on the SEL/CTL-BUS, selects the appropriate register or memory location. Then, with a destination selected, the register/memory is loaded with the data from the INDATA-BUS. Each neuron circuit is processed in sequence as selected by the daisy chain circuits 600 just as in the engagement process FIG. 15. This loading step is repeated for each register/memory location as many times as necessary to restore the neural network. In the SAVE mode, individual neurons are read in sequence until the first neuron circuit with a local category value equal to zero is encountered. In the RESTORE mode, individual neurons are loaded in sequence until a local category equal to zero is encountered. The contents of the local category register 450, thus serves as a convenient means of detecting the end of either phase. At the end of the SAVE or RESTORE phase, all registers of all of the neuron circuits, including the DAISY registers of daisy chain circuits 600, are in the same state that they were in before phase was initiated. Finally, when all the engaged registers have been read or written, the base chip is returned to either its RECOGNITION or its LEARNING mode.

Providing a SAVE and RESTORE capability in the base chip requires very little additional circuitry. Since these modes use the same processing steps to access each neuron's registers and weight memory, the logic for each mode is basically the same. Additionally, the saveable restorable neural network size is unlimited.

Optionally, some or all of the registers, as well as some or all of each neuron's weight memory may be Programmable Read Only Memory (EPROM), flash EPROM or some combination thereof. In this optional embodiment, appropriate logic must be included to provide for preserving data stored therein at power down, or at any selected interval.

Thus, the preferred embodiment base neural network 11(A) of FIG. 4(B) may be used to form a neural network of any size, either in the elementary module of FIG. 11 or, in the complex module of FIG. 12. Both modules operate in all four described modes. This is a direct result of the parallel architecture of the base chip 10. The chip level global signals R* and OUT* are formed on each chip 10 (1) to 10 (Q) by ORing the local result and local output signals in dedicated sub-circuits of each respective chip's OR circuit 12. In turn, these chip global signals R*(1) to R*(Q) and OUT*(1) to OUT*(Q), respectively, are ORed, to produce respective module global signals R and OUT on the COM-BUS. The COM-BUS is connected in common to all base chips 10(1) to 10(Q) that form the elementary module 10[A]. The combined neural networks of the base chips 11(1) to 11(Q) form a complex neural network 11[A]. When several base chips 10 are connected together in parallel, the main Dmin determination circuit 20 in FIG. 4(B), may be used to determine the minimum distance Dmin, from among all the chips in the elementary module 10[A] or, in a complex module 10{A}.

As a result of the cascadability of the neuron and, the expandability of the resulting neural network, it is unimportant whether the neural network is a base neural network, an elementary neural network or a complex neural network. Regardless of type, whether type 11[A] in FIG. 11 or type 11{A} in FIG. 12, any neural network operates identically to the stand alone chip neural network 11(A) of FIG. 4(A) from the micro-controller/user's 22 perspective. The number of base chips 10 assembled to form an elementary module, which, in turn, are assembled to form a complex module and that finally results in a complex neural network of a desired size with a desired total number of neuron circuits is transparent to the micro-controller/user 22. Moreover, within certain physical limits, the operation of such a neural network is independent of its size. Therefore, unless specifically differentiated, below, the generic term of neural networks refers to any and all of the different types of neural networks described above.

DETAILED DESCRIPTION OF THE BASE NEURAL NETWORK CHIP

* THE CONTEXT REGISTER AND MATCHING CIRCUIT (100/150) *

Figure 16:
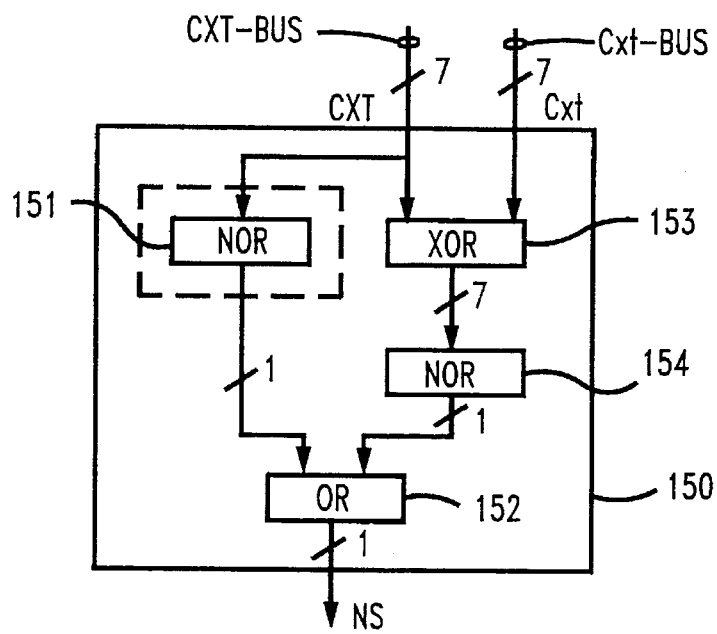
FIG. 16 is a schematic block diagram of the matching circuit 150 of FIG. 5.

FIG. 16 is a logic block diagram of Matching Circuit 150, used by a neuron to determine whether or not it is selected. Matching Circuit 150 includes a NOR circuit 151 to check whether or not the input context CXT value from main NO/CXT register 17 is null. If input context CXT is equal to zero, NOR 151 generates a logic one. The output of NOR 151 is the first input of a 2-way OR gate 152. Although, in the preferred embodiments, each neuron includes a NOR circuit 151, it is contemplated that a single NOR circuit could provide this check for all the neurons on the base chip 10, because the base chip has only one main NO/CXT register 17. NOR circuit 151 is a single 7-way NOR gate. Matching circuit 150 further includes an XOR circuit 153 to compare the input context CXT with the local context Cxt. In the preferred embodiment, XOR circuit 153 is seven 2-way XOR gates. If the input CXT matches the local Cxt, then all 7 XOR 153 outputs are low. Otherwise, one or more XOR 153 outputs are high. The XOR circuit 153 output are inputs to NOR circuit 154. In the preferred embodiment, the NOR circuit 154 is a single 7-way NOR gate. If all 7 inputs to NOR gate 154 are low, i.e. indicating a match, NOR gate 154's output is high. Otherwise, the output of NOR gate 154 is low. The output of NOR 154 is the second input of OR gate 152. The output of OR gate 152 is the NS (Neuron Selection) signal. When either CXT=0 or when CXT=Cxt, NS is active (NS=1) indicating that the neuron circuit 11 is selected. Therefore, a neuron circuit 11 is selected only if CXT matches the neuron's local context data Cxt or, if all neurons are selected with context CXT being null.

Figure 17:
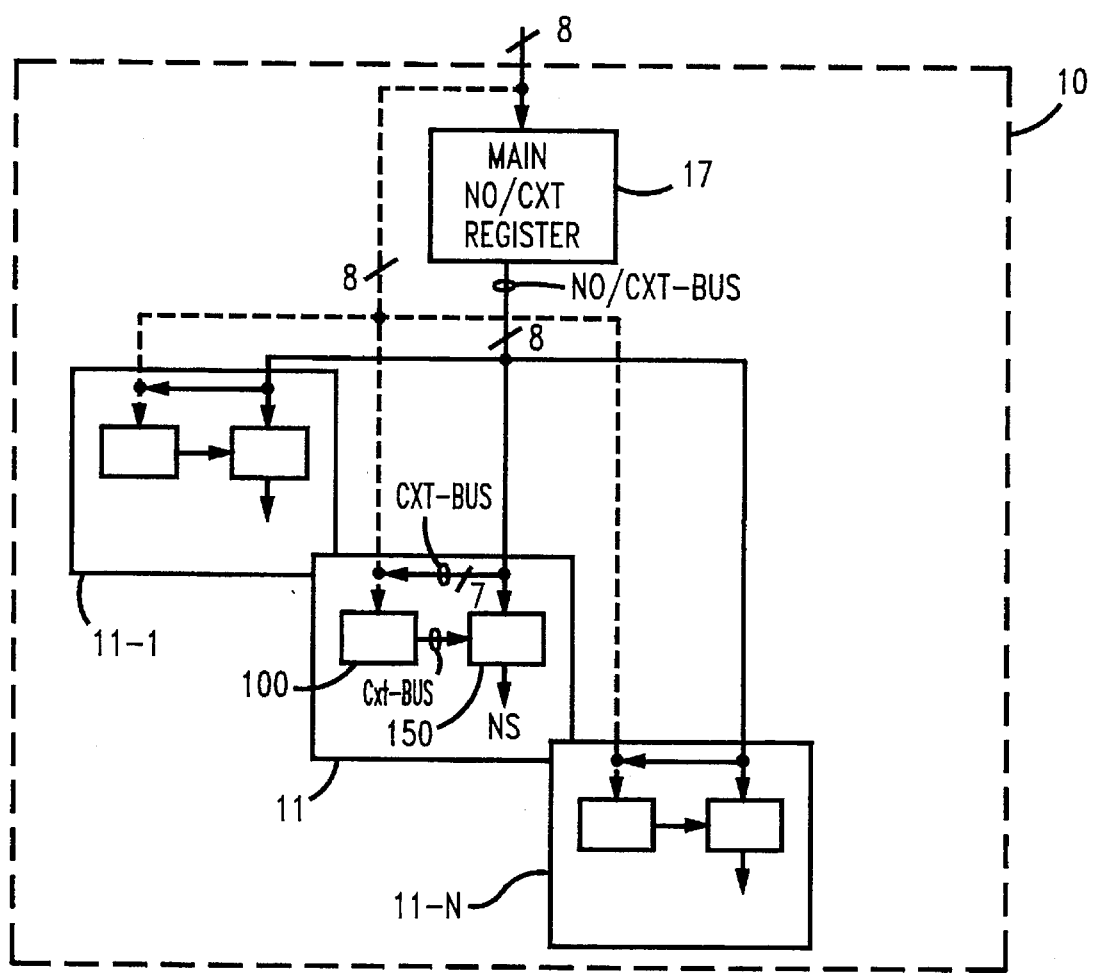
FIG. 17 illustrates the use of the context approach to defining different subsets in the base neural network of FIG. 4(B).

FIG. 17 schematically illustrates the context approach to neuron assignment in the preferred embodiment neural network chip 10. All the neuron circuits 11-1 to 11-N process the same input vector context CXT stored in the context portion of main NO/CXT register 17, in parallel. As each neuron is engaged, the local context portion of its No/Cxt register 100 is loaded from main NO/CXT register 17 over the CXT-BUS.

This association of a local context to each engaged neuron allows dynamic allocation of any desired number of neuron in a base neural network 11(A) to groups for specific recognition tasks. An example of how this local context allows grouping neurons is the selective recognition of a series of input vectors by two groups of neuron circuits in a neural network. First a group is engaged with L1 norm and receives a first context (context1). Then, a second group is engaged with Lsup norm and receives a second context (context2). The first group is easily selected and the second group is easily excluded, because of the different contexts, for recognition of an input vector by only those neuron circuits engaged with the L1 norm.

Another example of different contexts used to group neuron circuits is where input vectors are different lengths. For example, with two input vectors lengths, wherein one group learns with an input vector of a first length (e.g. n=64) and a second group learns with input vectors of a second length (e.g. n=32). When input vectors of the second length are presented to the base neural network 11(A), the context (i.e. vector length) does not match the local context of the first group of neurons. Therefore, the first group are inhibited, and so, their responses to the input vector are ignored.

Context based selection allows a more flexible use of the preferred base neural network chips. For example, by providing each neuron with a different context, then each neuron may be used as a base processing unit in a multi-processor system. Each processor in such a multi-processing system handles input data in parallel, in a similar manner to base neural network 11(A). So, in some cases, the input data pattern may be dispatched to only one or to a few base processing units. As can be seen in this example, the preferred embodiment context based selection eliminates the need for a pattern dispatcher (which normally is required) in front of the multi-processor unit. Conventional pattern dispatchers are very complex circuits. In the preferred embodiment of the present invention, the pattern dispatcher is replaced by a single register (the main NO/CXT register 17 of FIG. 17).

In this multi-processor system, each base processing unit includes its own dedicated local context register (the local No/Cxt register 100). A bus interconnects the main NO/CXT register 17 to each local NO/CXT register. Context data is loaded directly into the main context register 17. After the main NO/CXT register 17 is loaded, input data may be provided to the multi-processor unit for processing in one (or more) context selected base processing unit (neuron). Whenever the contents of the local context register 100 matches the input context value in the main context register 17, then the input data pattern (and subsequent patterns as well, provided CXT does not change) is processed by the selected processing unit.

Additionally, because of NOR gate 151 and OR gate 152, all of the base processing units may be selected, simultaneously, by forcing the input context equal to zero. Inclusion of these gates 151, 152 incurs a minimal delay in normally processing data. This delay may be avoided by omitting both of these gates 151, 152. With these gates 151, 152 omitted, the main context register contents must be equal to zero in order to simultaneously select all base processing units with the input context zero. Loading a context value into the input data pattern whenever the input context needs to be updated adds another delay penalty. This penalty is maximum when each input data pattern requires a new context value.

In summary, context selection in preferred embodiment neurons provides the flexibility to dynamically configure the neural network (multi-processor system) either as a single network (processor system), or as individual groups (separate sub-systems) thereof that can work independently without interfering with each other.

* THE R/W MEMORY CIRCUIT (250) *

Figure 18A:
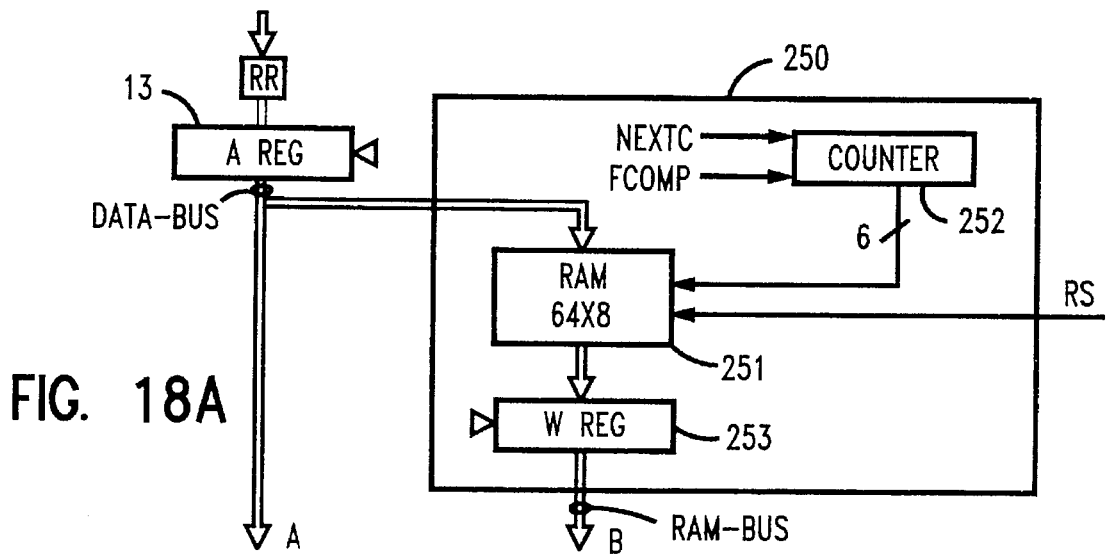
FIG. 18(A) is a schematic block diagram of the R/W memory circuit 250 of FIG. 5.

FIG. 18(A) schematically represents R/W Memory Circuit 250 which includes 64×8 bit RAM 251 (referred to the weight memory), an address counter 252 and, optionally, a W register 253. As used herein, Weight RAM refers to both R/W Memory Clrcuit 250 and to 64×8 bit. The components of input vector A are received by receiver RR and passed therefrom to A REGister 13. The output of A register 13, on the DATA-BUS, provides the input vector A components to weight memory 251. The stored prototype vector B components are provided to the neuron from the output of W register 253 (if included) on the RAM-BUS. The W register 253 latches data output from the RAM 251. Thus, RAM 251 may be isolated during automatic tests, performed during chip manufacture. If optional W register 253 is included, then, preferably, an additional balancing register (not shown) is also included in the input vector data path. This optional balancing register would balance the register delay in the two data paths to evaluator circuit 200. Inclusion of the optional balancing register is recommended especially for pipeline operation and for synchronous (BURST) mode operation. W Register 253 is a free running register, i.e. the data are loaded therein at each cycle, unlike the gated A register 13 which is loaded when enabled by a control signal.

Address counter 252 counts the components of the input vector and, provides an address to the RAM 251 for each counted component. Address Counter 252 is controlled by two control signals: NEXT Component (NEXTC) sequences the counter when vector components are loaded; and, First COMPonent (FCOMP) resets the counter before the first component is loaded. Counter 252 is thus reset by FCOMP at the beginning of each new recognition phase and, incremented by NEXTC as each input vector component is stored in the RAM 251. Although Address Counter 252 is described as part of R/W memory circuit 250, its inclusion therein is optional. Preferably, the Address Counter 252 is physically placed elsewhere in the neuron circuit of FIG. 5. In the preferred embodiment base chip 10 of the present invention, each neuron does not include its own address counter 252, but instead, there is a single address counter 252 for all of the neurons in the Status and Control Logic Circuit 18. In the preferred embodiment, therefore, R/W Memory Circuit 250 is just the RAM 251 and the W Register 253. Counter 252 generates common RAM address signals for all the neuron circuits on the base chip 10. Optionally, W Register 253 could have a complemented output for faster B signal processing in distance evaluator circuit 200.

In each neuron circuit 11, the RS signal from its Daisy Chain Circuit 600 is a direct input to RAM 251. RS is the equivalent of a conventional R/W signal, such as typically used in any standard RAM. When RS is active (RS=1), the RAM 251 is written, i.e. the input vector components are loaded, in sequence, to RAM locations addressed by address counter 252. When RS is inactive (RS=0), the RAM 251 can only be read. RS is inactive for all engaged neuron circuits. RS is active only for the ready to learn neuron circuit to precharge the ready to learn neuron with the input vector components.

Figure 18B:
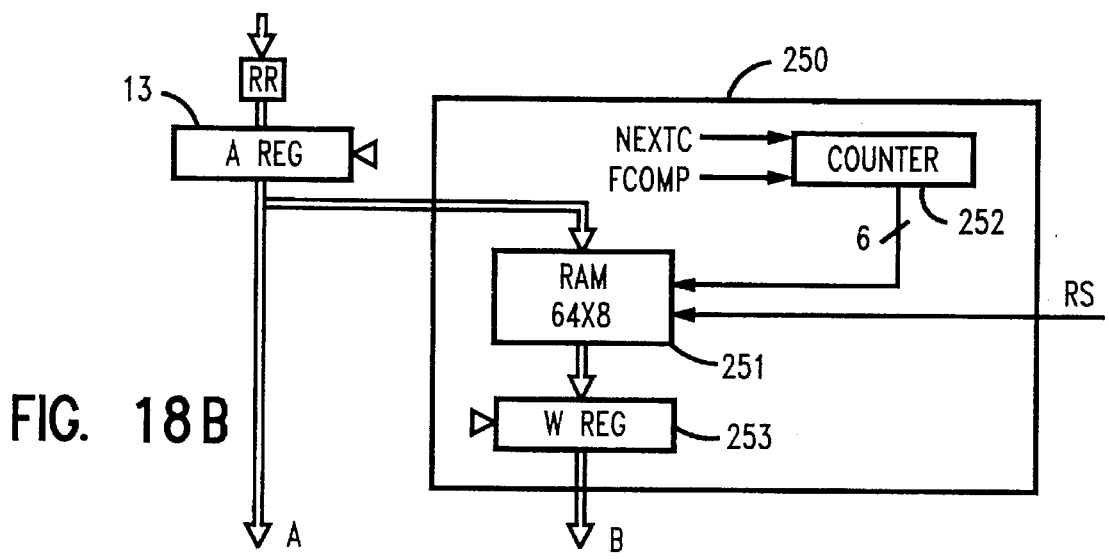
FIG. 18(B) shows the data flow in circuit 250 during the recognition phase for an engaged neuron circuit.

FIG. 18(B) schematically represents the data flow for an engaged neuron circuit during the recognition phase. RS is inactive because the neuron is engaged. RS being inactive (READ) blocks writing the input vector components into RAM 251 (the path to the RAM 251 is shown "blanked") for engaged neuron circuits. Therefore, the components of the input vector A, once loaded in A Register 13, are not loaded in RAM 251. This maintains the integrity of the engaged neurons' stored prototype vector components. The A Register 13 output and the R/W memory 250 output are available for comparison by distance evaluator circuit 200.

Figure 18C:
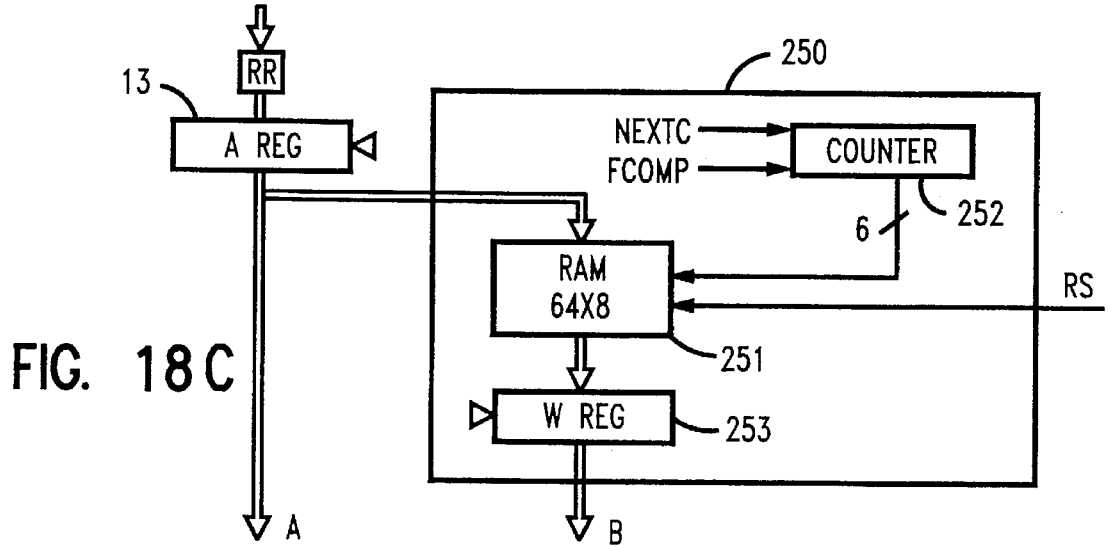
FIG. 18(C) shows the data flow during the recognition phase for the first free neuron circuit, which includes the step of pre-charging the RAM memory with input vector components.

FIG. 18(C) schematically represents data flow for the ready to learn neuron circuit during the recognition phase. RS is active in the ready to learn neuron to allow precharging the neuron. So, components of the input vector A are stored (pre-charged) in the RAM 251 as the weights of the new prototype vector. As illustrated by the blanked paths in FIG. 18(C), the A and B signals are blocked from the distance evaluator circuit 200 in the ready to learn neuron.

In the preferred embodiment of the base chip 10, the R/W memory circuit 250 in combination with the daisy chain circuit 600 form a "pre-charge circuit". The daisy chain circuit 600 provides a means for identifying the ready to learn neuron and the control for selectively loading the weight memory with the input vector components. This capability of precharging the ready to learn neuron's RAM 251 with the input vector components during the recognition phase is a significant advantage of the present invention over the prior art. Compared to prior art solutions, this pre-charge step is advantageous because it speeds learning by eliminating any need for a second presentation of an unidentified input vector to the ready to learn neuron during the learning phase. Thus, this precharge capability significantly shortens learning time required after a decision is made to engage the ready to learn neuron circuit.

* THE DISTANCE EVALUATOR CIRCUIT (200) *

Figure 19:
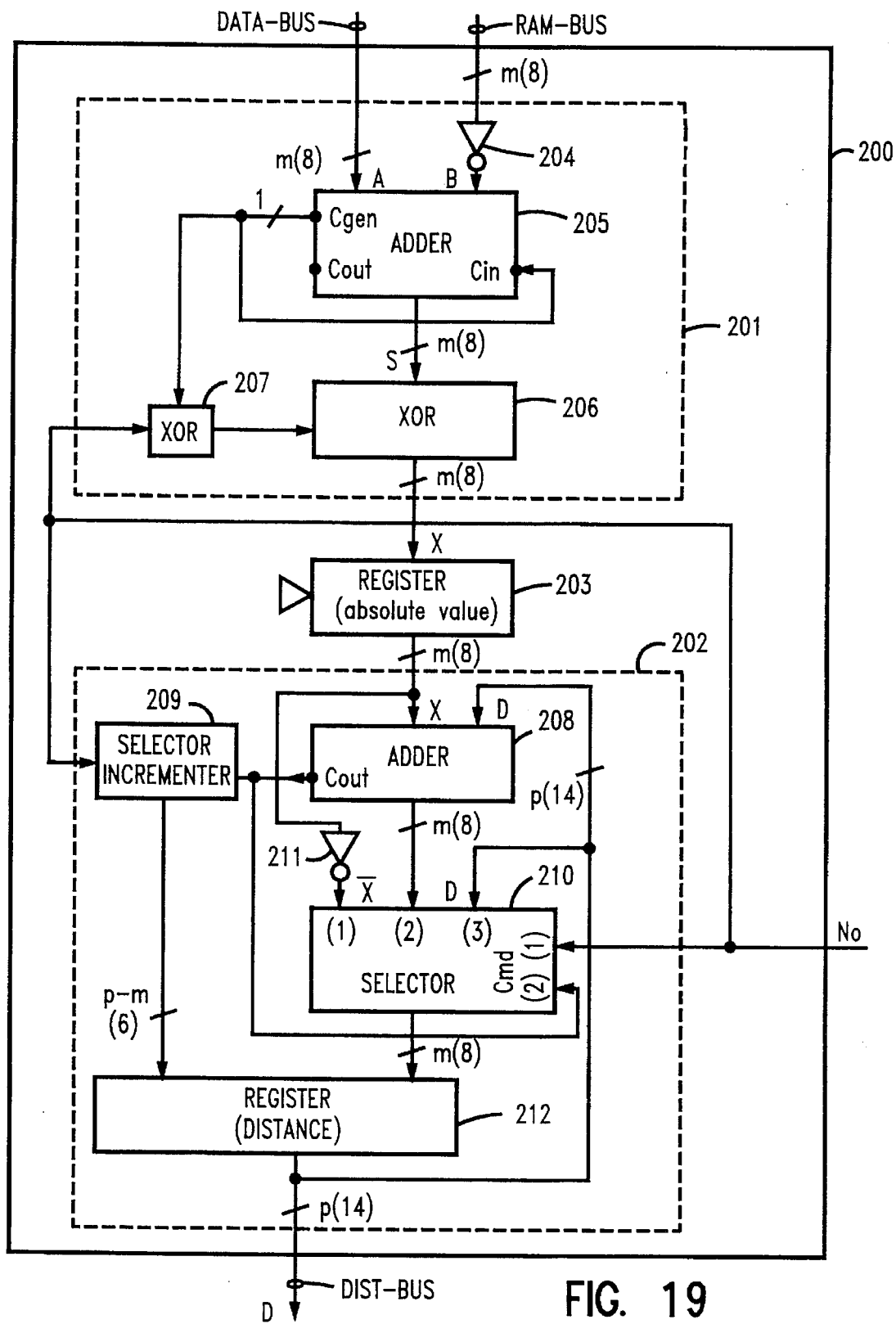
FIG. 19 shows a schematic block diagram of the distance evaluator circuit 200 of FIG. 5, which is, basically, two sub-blocks each including an adder, for calculating the distance between an input vector and a prototype vector stored in the neuron circuit according to a user selected by norm.

FIG. 19 is a schematic representation of the multi-norm Distance Evaluator Circuit 200. The Distance Evaluator Circuit 200 includes two sub-circuits 201 and 202 and, optionally, includes a register 203 therebetween. The RAM memory 251 of FIG. 18 and sub-blocks 201 and 202 of Distance Evaluator Circuit 200 form a pipelined three-stage structure.

The 8-bit DATA-BUS (providing input vector A) and the 8-bit RAM-BUS (providing the stored prototype vector B) are inputs to sub-block 201. Local Norm signal No is a control input to both sub-blocks 201 and 202. Distance Evaluator Circuit 200 determines the distance between the input vector A and the neuron's stored prototype vector B. The output of the Distance Evaluator Circuit 200 is the distance signal D on the 14-bit DIST-BUS. Distance Evaluator Circuit 200 is a processing unit that computes the distance between the input vector A and the prototype vector B, using either L1 norm (MANHATTAN) or Lsup norm (SQUARE). If micro-controller/user 22 presents the neuron with an input vector A equal to zero, (with L1 norm) the Distance Evaluator Circuit 200 passes all the components of the prototype vector B to the DIST-BUS. This is how the stored prototype vector B components are read in the SAVE mode.

Local Norm signal No on the 1-bit No-BUS selects the desired distance computation norm. If norm signal No is equal to 1, the distance between input vector A and prototype vector B is calculated according to L1 norm. Conversely, if norm signal No is equal to 0, the distance is calculated according to Lsup norm. Therefore, representing components of input vector A and of prototype vector B as A=A1, ..., Ai, ..., An and B=B1, ... Bi, ..., Bn (each Ai or Bi component being m bits wide), the distance D between A and B is calculated either by sum(abs(Ai-Bi)) (where abs means "absolute value" and i=1, ..., n) for the L1 norm or, by max(abs(Ai-Bi)) for the Lsup norm. For example, with four component vectors A and B represented by A=7, 1, 8 and 2 and, B=6, 3, 4 and 5. The distance is equal to 10 with the L1 norm and to 4 with the Lsup norm.

The distance D determined in Distance Evaluator Circuit 200 on the DIST-BUS is variable width and D=d0, ..., dp-1 (where p is the width of the distance signal D). The width of the distance signal D depends on the selected norm. For the Lsup norm, D is as wide as A or B, i.e. p=m. However, for the L1 norm, p is also dependent on the number of vector components n. For the above example, with n=4, the maximum Distance D for L1 norm is $(2**8)*4=210=1024$. Therefore, the result is 10 bits wide and p=10. In the prototype base chip 10 of the preferred embodiment, there are n=64 vector components, each coded on m=8 bits. The L1 norm maximum Distance D is $(28)*64=2**14$. Thus, the DIST-BUS is 14-bits wide in FIG. 19.

Regardless of the Distance calculation method, first, in sub-block 201, the absolute value of the difference between each corresponding pair of components Ai and Bi of the input and prototype vectors respectively is computed, i.e. (abs(Ai-Bi)). Computing the difference between A and B is equivalent to computing the sum of A and $\overline{B}$. Thus, B is complemented in a battery of m=8 inverters 204 in the input path between the output R/W memory circuit 250 and the input of adder 205. Alternatively, B can be provided, already inverted, from R/W memory circuit 250 and the inverters 204 omitted. Adder 205 computes an internal carry, Cgen generated by bits 0 to m-1. The partial sum from adder 205 is input to a bank of two-way XOR circuits 206. Cgen is fed back to adder 205 as the input carry signal Cin and, also, provided to two-way XOR circuit 207. Local norm signal No is the other input of the XOR 207. Thus, the output of XOR circuit 207 controls the polarity of the output signal X generated by XOR circuit 206 based on norm signal No. The adder 205 is designed to allow using Cgen as the Carry in signal Cin.

The adder 205 is tailored for comparing the input vector with the prototype vector. So, if Ai>Bi, adder 205 produces a partial sum and internal carry Cgeni=1. Cgeni is fed back as Cini and added to the partial sum to produce (Ai-Bi). If, in this case, No=1 (L1 norm), the output of XOR 207 is "0" and the XOR bank 206 passes the partial sum Si to Xi which is, therefore, equal to abs(Ai-Bi). If No=0 (L1 sup), then in this case, the output of XOR 207 is "1" so that XOR bank 206 inverts partial sum Si, which is the complement of $\overline{abs(Ai-Bi)}$. If Ai<Bi or Ai=Bi, then adder 205 does not produce an internal carry, i.e. Cgeni=0. If No=1 in this case, then XOR 207 output is "1" and XOR bank 206 complements the adder 205 output Si to produce the correct result Xi. However, if No=0 in this second case, then XOR 207 output is "0" and XOR bank 206 passes Si uncomplemented. Result X is latched in register 203, if included, or else passed directly to sub-block 202.

The following examples of 4-bit component addition illustrate sub-block 201 operation for two cases: Ai<Bi and Ai>Bi (for Ai=Bi the adder operation is essentially the same as for Ai<Bi).

First example: Ai>Bi (e.g. Ai=2 and Bi=1)

Ai=0 0 1 0 ===> Ai=0 0 1 0
Bi=0 0 0 1 ===> $\overline{Bi}$=1 1 1 0 adder ===> 0 0 0 0 and Cgeni=1 ===> Cini=1
Cini ===>         1

If No=1: Xi=0 0 0 1 (No XOR Cgeni)=0 i.e. Xi= abs(Ai-Bi)
If No=0: Xi=1 1 1 0 (No XOR Cgeni)=1 i.e. Xi= $\overline{abs(Ai-Bi)}$ As is apparent, adder 205 generates the intermediate sum (Ai+$\overline{Bi}$)=0000 and a carry Cgeni=1, so that Cini=1. In turn, this Cini value is the input carry to adder 205 and thus is added to the intermediate sum, such that 0000+1=0001. Subsequently, the Cgen carry is XORed with the local norm signal No at XOR gate 207. Then, the output of XOR 207 is XOR'ed in XOR circuit 206 with the partial component sum Si from adder 205. Finally, the component output of XOR circuit 206 Xi=((No XOR Cgeni) XOR Si), so that in this case, Xi corresponds to either abs(Ai-Bi) or $\overline{abs(Ai-Bi)}$.

Second example: Ai<Bi (e.g. Ai=1 and Bi=2)

Ai=0 0 0 1 ===> Ai=0 0 0 1
Bi=0 0 1 0 ===> $\overline{Bi}$=1 1 0 1 adder ===> 1 1 1 0    Cgeni=0 ===> Cini=0
Cini ===>       0

If No=0: Xi=1 1 1 0 (No XOR Cgeni)=0 i.e. Xi= $\overline{abs(Ai-Bi)}$
If No=1: Xi=0 0 0 1 (No XOR Cgeni)=1 i.e. Xi= abs(Ai-Bi)

In summary, for each component i of the input and prototype vectors the Xi output of sub-block 201 is either abs(Ai-Bi) if No=1 (i.e. L1 norm), or its complement, $\overline{abs(Ai-Bi)}$, if No=0 (i.e. Lsup norm).

The second sub-block 202 computes the distance D from the Xi output components from sub-block 201. The optional free-running register 203, located added between sub-circuits 201 and 202, is normally included for pipelining.

Each output components Xi is applied to one input of adder 208 and the other input is the fed back accumulated distance D. Adder 208 may either be the same as adder 205 or, alternatively, any type of conventional two way adder. Adder 208 has two functions. For No=1 (L1 norm), the adder 208 sums each current value of X with the accumulated distance D. For No=0 (Lsup norm), the adder 208 compares the current value of X with the current distance D. The carry out signal, Cout, from adder 208 is an input to an incrementer 209, which is also driven by the local norm signal No. The incrementer 209 is only used for the L1 norm, so it operates normally if No=1 (L1 Norm) and is inhibited (generating only zero's) if No=0 (Lsup Norm). Therefore, because of the inclusion of incrementer 209, the width of adder 208 can be reduced from p bits to m bits, regardless of the norm used. So, adder 208 is only an m-bit adder.

The X signal is inverted through a bank of eight inverters 211 (one inverter per bit) and, then, passed to the first input terminal (1) of a selector circuit 210. The output of adder 208 is connected directly to the second input terminal (2) of selector 210. The third input (3) of sector circuit 210 is D. The norm signal No and the Cout of adder 208, respectively, are the selector's command (Cmd) inputs (1) and (2). If No=1 (L1 norm), input terminal (2) is selected. When No=0 (Lsup norm), then Cout selects between input terminal (1) and (3), so that, input terminal (1) is selected if X>D and input terminal (3) is selected if X<=D. Therefore, the norm signal No and Cout, select the result passed by selector 210.

As each different Xi component is calculated, a distance register 212 holds either the current distance (No=0), or an accumulated distance sum (No=1), and, thus, functions as an accumulator. Register 212 is initialized to zero at the beginning of each distance calculation process. When the distance calculation is complete, the calculation result, the distance D is the contents of the distance register 212 and is available therefrom on the 14-bit DIST-BUS.

If No=1 (L1 norm), then adder 208 adds each difference component Xi=(abs(Ai-Bi)) to the accumulated partial distance sum in the distance register 212. Once all of the difference components have been added, accumulator 212 holds the distance D. For this case, the accumulated distance at input (2) of selector 210 is selected and passed to register 212, where it is latched during the subsequent cycle. If the accumulated distance is wider than m bits, then, the adder 208 also generates a carry Cout that increments incrementer 209. At each cycle, the (p-m) most significant bits of the accumulated distance are updated in the incrementer 209, as determined by the norm signal No and the Cout signals. The entire accumulated distance, the (p-m) most significant bits and the remaining m (least significant) bits, are the first and second inputs (couples) of distance register 212. After the final couple is calculated and inputted, the distance register 212 contains the distance D between input vector A and prototype vector B.

Alternatively, if No=0 (L1 sup), the adder 208 determines the difference between abs(Ai-Bi) and the current distance D. As described above, absolute value register 203 holds $\overline{abs(Ai-Bi)}$. Thus, adding D and Xi, where Xi=$\overline{abs(Ai-Bi)}$, results in D-$\overline{Si}$, i.e., the desired comparison result. If the summation generates a carry, i.e. Couti=1, then D>abs(Ai-Bi) and the current value of D at selector 210 input (3) is selected as the larger of the two numbers. The bank of inverters 211 inverts $\overline{abs(Ai-Bi)}$ from Register 203 to provide $\overline{Xi}$=(abs(Ai-Bi) at input (1) of adder 208. If Couti=0, then abs(Ai-Bi)>D and, since $\overline{Xi}$=abs(Ai-Bi), selector 210 input (1) is selected as the maximum. The selected larger of the two (either X or the current value of D) is stored in Distance Register 212. Operation of second sub-block 202, with No=0, is more readily understood by reference to the two following examples 3 and 4.

EXAMPLE 3 abs(Ai–Bi)=0 0 1 1 ==> Xi = 1 1 0 0
D=0 0 0 1 ==> D = 0 0 0 1
-----
adder ==> 1 1 0 1 Cout=0 ===> abs(Ai–Bi)>D

EXAMPLE 4 abs(Ai–Bi)=0 0 0 1 ==> Xi = 1 1 1 0
D=0 0 1 1 ==> D = 0 0 1 1
-----
adder ==> 0 0 0 1 Cout=1 ===> abs(Ai–Bi)<D In example 3, selector 210 input (1) is selected, the value $\overline{Xi}$=abs(Ai-Bi) is loaded into register 212. In example 4, the current distance D at selector 210 input (3) is selected and loaded into register 212. Thus, for No=0, Cout selects whether $\overline{Xi}$ or D is loaded into register 212.

Alternatively, inverter bank 211 may be omitted. In this alternate embodiment, $\overline{max(abs(Xi-D))}$ is stored in distance register 212. Suppression of the inverter bank 211 complicates the calculation, slightly, but (especially for a large m) eliminates extra logic, i.e., m inverters. In this alternate embodiment, with No=0, Cout=0 selects input (3) on select 210 and Cout=1 selects input terminal (1) (opposite selection to that of the preferred embodiment wherein the inverter bank is included). In this alternate embodiment, the result stored in distance register 212, $\overline{max(abs(Ai-Bi))}$, requires inverting thereafter in order to arrive at the desired result, D=max(abs(Ai-Bi)).

As indicated above, adder 205 of sub-block 201 is a unique 8 bit adder, designed especially for use in the preferred embodiment base chip of the present invention. FIGS. 20 to 23 schematically represent the adder 205 and the various unique functional logic blocks from which it is made, and in particular, selector circuits used for generating the internal carry (carry generate).

Figure 20:
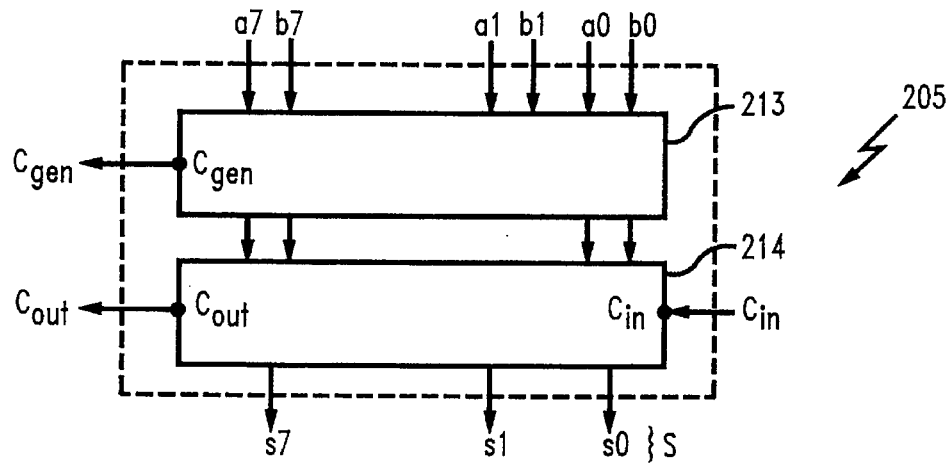
FIG. 20 shows a schematic block diagram of the adder in the first sub-block of the distance evaluator circuit 200.

FIG. 20 represents adder 205 as 2 sub-circuits 213 and 214. Sub-circuit 213 has two primary inputs A and B. The outputs from subcircuit 213 are intermediate signals, generated from components of the Input Vector A0 to A7 and each component of the prototype vector B0 to B7. These intermediate outputs from sub-circuit 213 are designated generically, (in FIGS. 21–23) by letters c (carry), f (force) and p (propagate), and the internal carry Cgen. Cgen is the carry out from the addition of A and B with no input carry. For performance and efficiency, both sub-circuits 213 and 214 are made, substantially, from inverting logic blocks. Thus, generally, a logic signal propagating through the sub-circuit levels is inverted in each level. Therefore, the state variables (p and f) alternate between levels to indicate this polarity charge. Sub-circuit 214 combines the intermediate outputs from sub-circuit 213 with an additional input, a Carry in signal Cin, to compute the final sum S. Sub-circuit 213 is further designed such that Cgen may be connected directly to Cin of sub-circuit 214 without incurring additional delay.

Figure 22A:
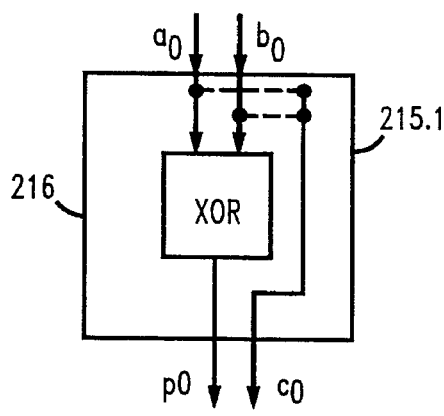
FIG. 22(A) is a block diagram of an XOR circuit with different types of connections as used in the adder of FIG. 21.
Figure 21:
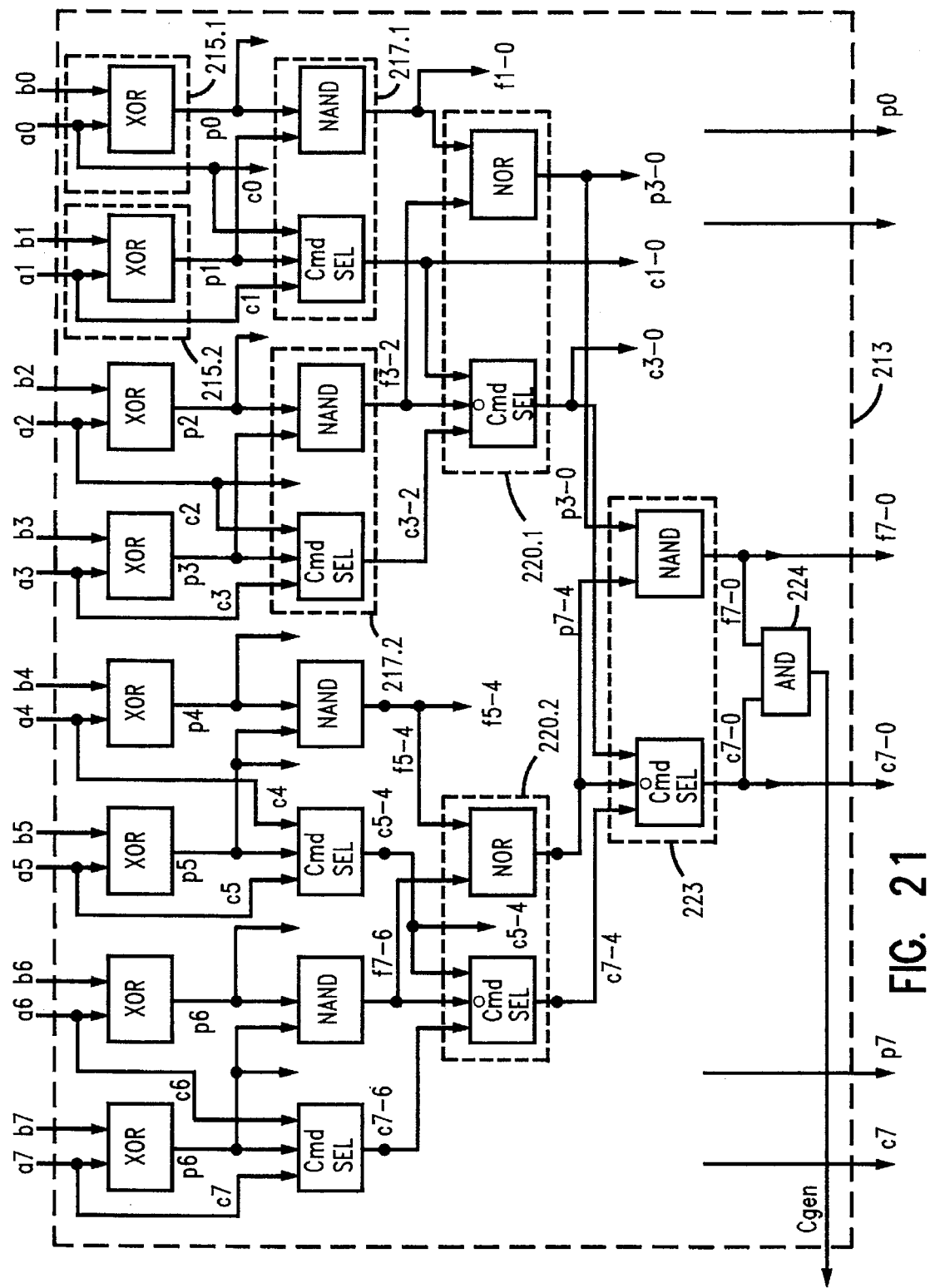
FIG. 21 is a detailed block diagram of the first part of the adder of FIG. 20.

FIG. 21 is a block diagram of sub-circuit 213. Each pair of input bits (or "slice") e.g. a0 and b0, are combined in a first level circuit 215.1. FIG. 22 (A) is a block diagram of the first level circuit 215.1, which is essentially a two-way XOR 216. Each circuit 215.1 generates two output bits, e.g. p0 and c0. In the preferred embodiment, p0=(a0 XOR b0) and c0=a0 from sub-circuit 215.1. In this first level, as in subsequent levels of this sub-circuit 213, each pair of block 215.1 outputs represent a logic state. The p output indicates whether a carry might be generated by the inputs. If, as indicated by the p output, the inputs might generate a carry, the c output is the carry generated for the block. Thus, in block 215.1, if P0 is 1, there is no carry. If P0=0, then c0 is the carry. In the preferred embodiment, as represented in FIG. 22(A), Ci may be hard wired to either ai or bi. Alternatively, Co may be (ai AND bi) or (ai OR bi) generated either through logic gates or, through dotting, if allowed electrically.

Outputs of 215.1, p0 and c0, are passed to the second level circuits 217 in FIG. 21, wherein signals generated by pairs of first level circuits are combined to generate a result "state" for that 2 bit slice. For instance, circuit 217.1 logically combines outputs p0 and c0 from circuit 215.1 with outputs p1 and c1 from circuit 215.2 to generate f1-0 and c1-0.

Figure 22D:
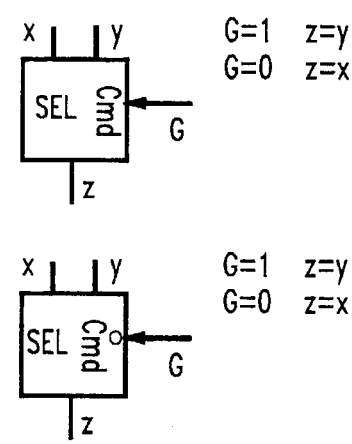
FIG. 22(D) is a block diagram of the two types of selectors (SEL) that are used in circuits of FIGS. 22(B) and (C) as used in the adder of FIG. 21.
Figure 22B:
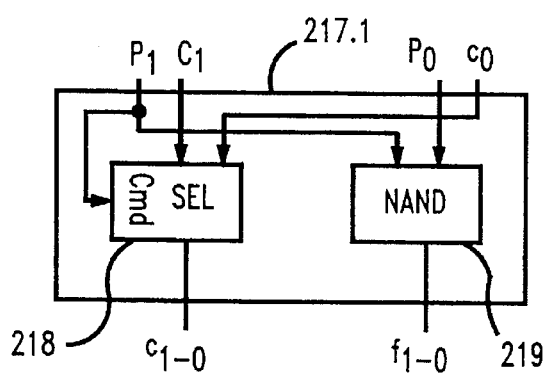
FIG. 22(B) is a block diagram of a selector/NAND combined circuit as used in the adder of FIG. 21.
Figure 22C:
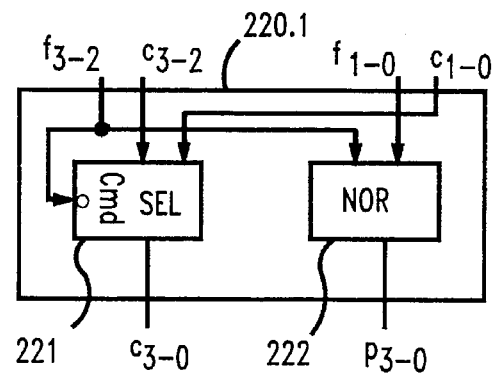
FIG. 22(C) is a block diagram of a selector/NOR combined circuit as used in the adder of FIG. 21.

FIG. 22(B) is a logic block diagram of circuit 217.1. Each circuit 217 includes, basically, a selector 218 and a two-way NAND gate 219. Second level circuit 217.1 output bits c1-0 and f1-0 are combined, internally, in sub-circuit 213 and, then, passed to sub-circuit 214. Also, second level outputs c1-0 and f1-0 are combined in third level logic block 220.1 with c3-2 and f3-2. Third level block 220.1 is functionally equivalent to 217.1 with appropriate logic functions inverted. As is apparent in FIG. 22(c), which is a block diagram of block 220.1, circuit 220 includes a selector 221 and a two-way NOR gate 222. The third level sub-circuit 213 circuits 220.1 and 220.2 generate bits c3-0 and p3-0 and bits C7-4 and P7-4, respectively. FIG. 22(D) is a state table for the two selectors 218 and 221.

In summary, for Circuit 217.1:

| | | | |
|---|---|---|---|
| p1=1 | ===> | c1-0=c0, | (i.e. if generated, the carry comes from bit 0) |
| p1=0 | ===> | c1-0=c1 | (carry from bit 1) |
| If p1=1 and p0=1 | ===> | f1-0=0 | (propagate carry through bits 1 & 0) |
| else | ===> | f1-0=1 | (carry generated by bit 1 or 0) | and for Circuit 220.1:

| | | | |
|---|---|---|---|
| f3-2=0 | ===> | c3-0 = c1-0 | (if generated the carry comes from bit 1-0) |
| f3-2=1 | ===> | c3-0 = c3-2 | (carry from bit 3-2) |
| If f3-2=1 or f1-0=1 | ===> | p3-0=0 | (carry generated by bits 1 or 0) |
| else | ===> | p3-0=1 | (propagate carry through bits 1 & 0) |

Finally, sub-circuit 213 last or, fourth level circuit 223, which is identical within 217.1, combines the third level outputs to generate f7-0 and c7-0. These two outputs are ANDed in a two-way AND gate 224. The output of AND gate 224 is Cgen which is the internal carry for primary input bits 0 to 7. Because the primary input bits are processed in parallel, the carry Cgen delay is small. Sub-circuit 213 outputs includes Cgen and all the intermediate bits generated at each level therein. These outputs of sub-circuit 213 are inputs to sub-circuit 214.

Figure 23:
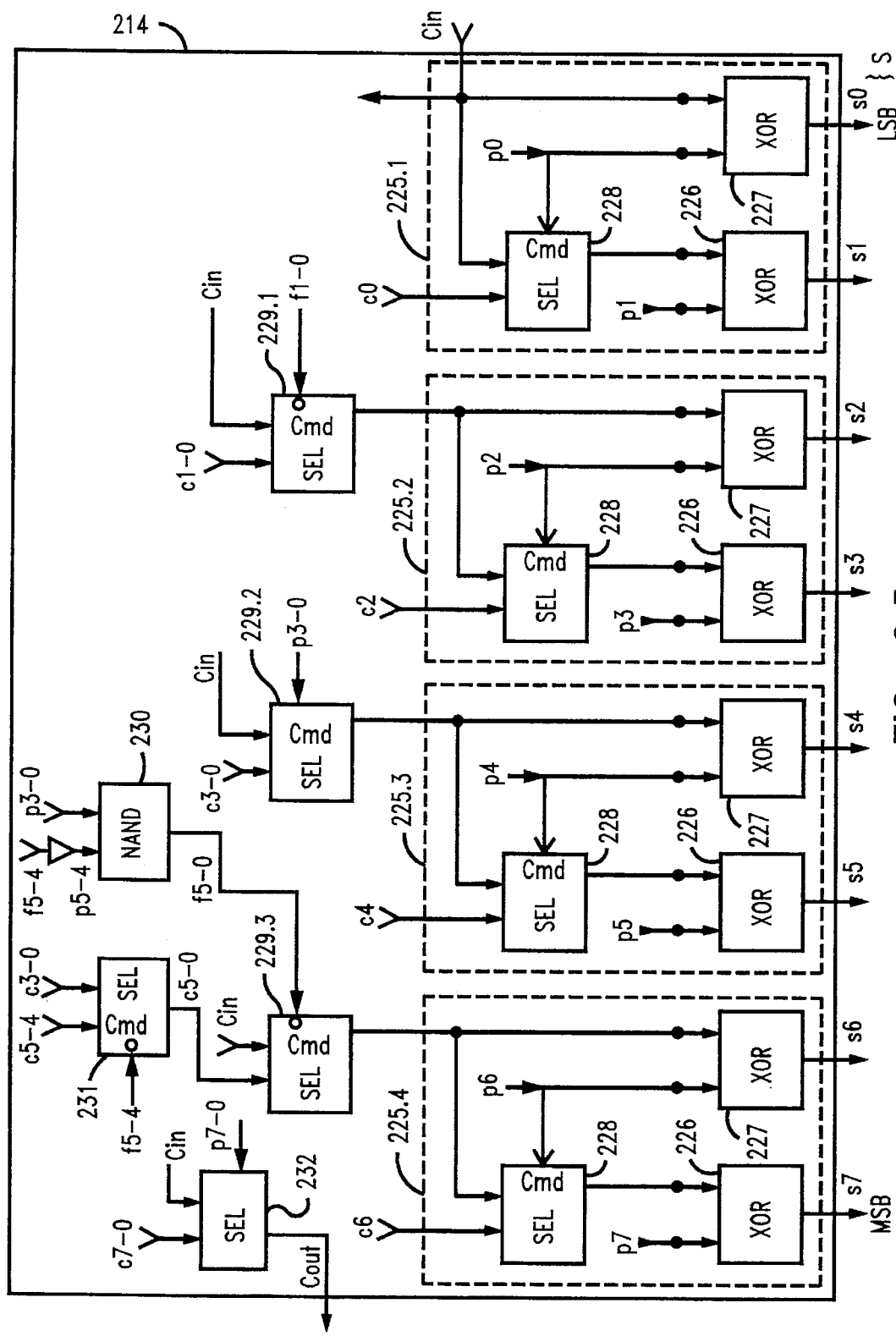
FIG. 23 is a block diagram of the second part of the adder of FIG. 20.

FIG. 23 is a logic block diagram of sub-circuit 214 that is made mainly from four identical circuits 225.1 to 225.4. Each circuit 225 includes 2 two-way XOR circuits 226 and 227 and a selector 228. All four circuits 225.1 to 225.4 function identically. Therefore, only the operation of 225.1 is described in detail herein. The generation of remaining three circuits 225.2 to 225.4 may be understood by appropriate input/output signal substitution. The Cin bit is the first input of selector 228 with the c0 bit as the remaining input. The p0 bit at the command input (Cmd) controls selector 228. The selector 228 output and the p1 bit are XOR'ed in XOR 226 coincident with bits p0 and Cin being XOR'ed in XOR 227. The sum bits s1 and s0 are the outputs of XOR circuits 226 and 227, respectively. Similarly, circuits 225.2 to 225.4, combine bits c2 to c6, and bits p2 to p7, respectively, but with appropriate substitution of the output of 229.1 to 229.3 for Cin. The output of 229.1 is either c1-0 or Cin as selected by f1-0 which controls selector 229.1. The output of 229.2 is either c3-0 or Cin as selected by p3-0 which controls 229.2. Control bit f5-0 is generated by NANDing p5-4 and p3-0 in two-way NAND gate 230. Further, C5-0 is generated from selector 231 and is either c5-4 or c3-0 as selected by bit f5-4. Thus, the output of 229.3 is either Cin or C5-0 as selected by f5-0 which controls 229.3. Finally, Cout is the output of individual selector 232, and is either Cin or c7-0 as selected by bit p7-0 which controls 232. As is apparent from FIG. 23, circuits 225.2 to 225.4, respectively generate pairs of sum bits (s2, s3), (s4, s5) and (s6, s7) in addition to the pair of sum bits (s0, s1) generated by circuit 225.1 as explained above.

As can be seen from sub-circuits 213 and 214 in FIGS. 21 and 23, respectively, the adder delay is in two parts. Sub-circuit 213 has 4 delay stages in generating intermediate signals, and 5 delay stages in generating Cgen. Sub-circuit 214 has 4 delay stages. Optionally, the number of elementary circuits used in sub-circuits 213 and 214, may be reduced at the cost of increasing the number of delay stages and, thus, trading logic complexity for performance.

* THE DISTANCE COMPARE AND IF CIRCUITS (300/350) *

Figure 24:
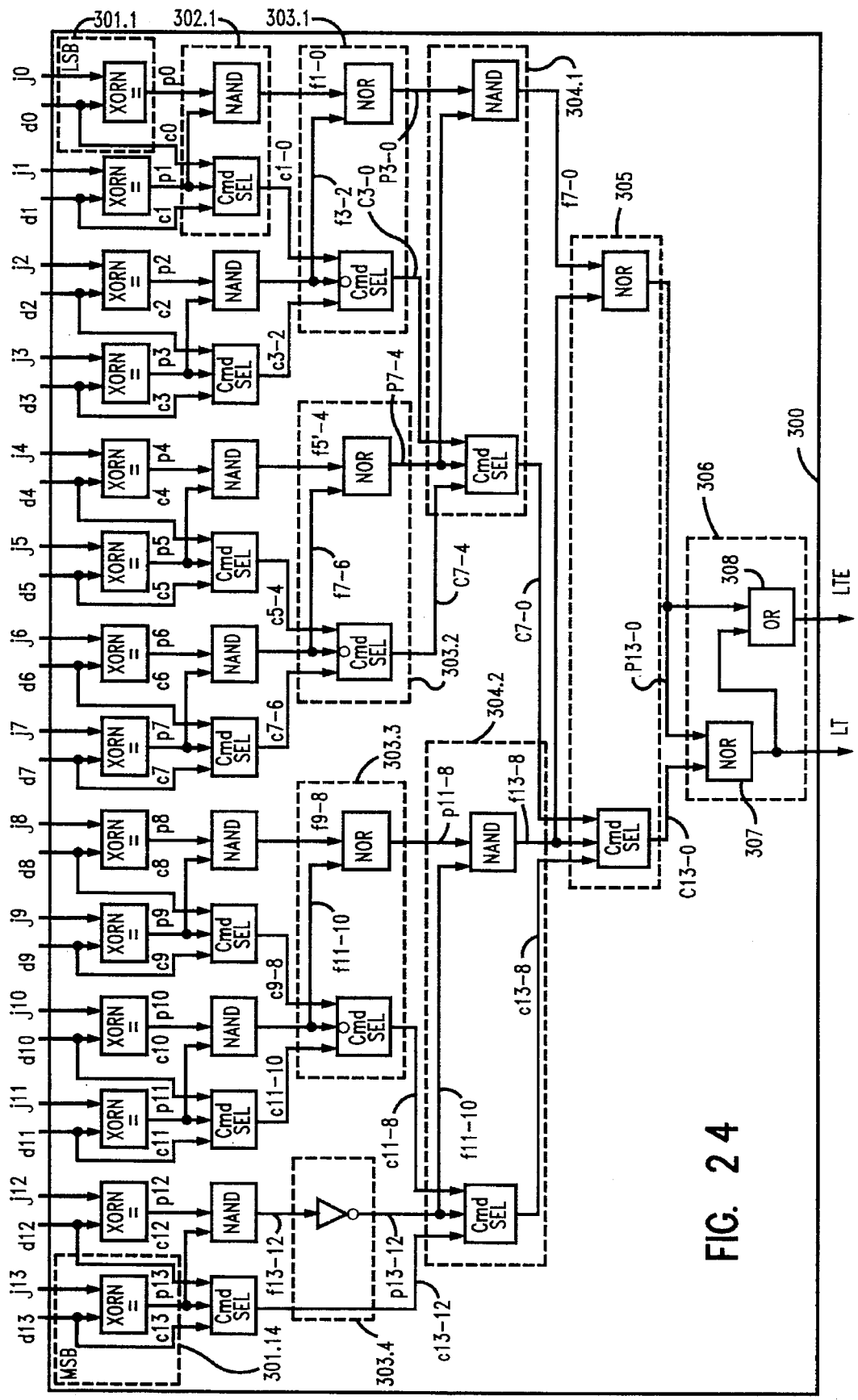
FIG. 24 is a block diagram of compare circuit 300 of FIG. 5 which generates intermediate LT and LTE signals that are subsequently processed in the identification circuit 400.

FIG. 24 is a block diagram of the Distance Compare Circuit 300 in each neuron circuit 11 (FIG. 5), wherein the neuron's calculated distance signal D is compared with the J signal from IF Circuit 350 (FIG. 7). As described above with respect to FIG. 7, the J signal is selected from either the DIST-BUS, the OR-BUS, the MinIF/MaxIF-BUS or, is the AIF value from the AIF register 352. The Distance Compare Circuit 300 receives the 14 bit wide distance signal D, d0 to d13 from the distance evaluator circuit 200 as a first input. The 14 bit wide J signal, j0 to j13 from the IF circuit 350, is a second input. From comparing these two signals, J and D, the Distance Compare Circuit 300 generates two outputs LT (Lower Than) and LTE (Lower Than or Equal). LT and LTE are, in turn, inputs to the identification circuit 400. Thus, the Distance Compare Circuit 300 indicates if D is (1) less than J (LT) or (2) less than or equal to J (LTE).

During the recognition phase, the AIF register 352 value is placed on J. The calculated distance D is compared with the AIF value (on the J-BUS) to determine whether the input vector is in the neuron's influence field, i.e., whether D<AIF. However, during the learning phase, J is set equal to MinIF and then, the calculated distance D is compared to MinIF to determine whether the neuron has degenerated, i.e. whether D<=MinIF. TABLE I indicates the meaning of the comparison results LT and LTE signals in each respective mode.

TABLE I

| In the RECOGNITION mode: | |
|---|---|
| LT | conclusions |
| 0 | no firing (D >= AIF) |
| 1 | firing (D < AIF) |
| In the LEARNING mode: | |
| LTE | conclusions |
| 0 | not degenerated (D > MinIF) |
| 1 | potentially degenerated (D <= MinIF) |

For optimal performance, each corresponding bit of J and D are compared in parallel. As in the adder sub-circuits 213 and 214, a state is determined for each primary input bit pair (or couple), e.g. d0 and j0, in a first level block 301. The state of each first level block 301.1 to 301.4 indicates whether the two bits are equal or not. Circuit 301.1 is structurally similar to circuit 215.1 of FIG. 22(A). However, instead of a two-way XOR 216, circuit 301.1 is an XORNOT (XORN) (adding a level of inversion). Circuit 301.1 generates two output bits, p0 and c0. If p0=1, then the input bits d0 and j0 are equal; conversely, if p0=0, the two input bits are not equal. In this preferred embodiment, d0 is hard driven through as first level output c0. Circuits 301.1–301.14 combine first pairs of outputs d0 and j0 to d13 and j13 to generate first level outputs p0 and c0 to p13 and c13. Circuits 301.2 to 301.14 are essentially identical to 301.1.

In the next level of circuit 300, two adjacent pairs of first level circuit 301.1 to 301.14 outputs are combined to form a second level state. For instance, circuit 302.1 combines p0, c0 from circuit 301.1 with p1, c1 from circuit 301.2 to generate a pair of second level outputs c1-0 and f1-0. Second level Circuit 302.1 is identical to circuit 217.1 in FIG. 22(B). Therefore, a second level circuit 302.1, is a selector 218 and a two-way NAND gate 219 interconnected as shown. Although not specifically blocked off in FIG. 24, other second level circuits identical to 302.1 combine other corresponding pairs of second level inputs to generate corresponding second level output pairs. As with adder sub-circuit 213, each level of Distance Compare Circuit 300 has an inverted output as indicated by the p or f designation of the state variable of the particular level. Therefore, as with the third level of adder sub-circuit 213, the third level Circuit 303.1 to 303.3 of Distance Compare Circuit 300 is identical to circuit 220.1 of FIG. 22(C). Thus, each third level circuit 303.1 to 303.3 includes a selector 221 and a two-way NOR gate 222 interconnected as in FIG. 22 (C). Third level Circuits 303.1 to 303.3 generate output pairs, p3-0, c3, 0, p7-4, c7-4 and p11-8, c11-8, respectively. Third level circuit 303.4, however, is just an inverter for generating output bits p13-12, with c13-12 passing directly through from second level circuit 302.7.

The fourth level circuits 304.1 and 304.2 of Distance Compare Circuit 300 generate output bit pairs f7-0, c7-0 and f13-8, c13-8, respectively. These two third level circuits are identical circuit 217.1 of FIG. 22(B). Finally, the outputs from the fourth level are input to a single fifth level circuit 305 which generates output pair p13-0 and c13-0. Fifth level circuit 305 is identical to circuit 220.1 of FIG. 22(C). This fifth level output pair is the input to circuit 306 which generates LT and LTE therefrom. LT is the output of a two-way NOR gate 307, so, LT=(c13-0 NOR p13-0). LT is OR'ed with p13-0 in two-way OR gate 308. As with the distance evaluator adder 205, the primary inputs to the Distance Compare Circuit 300 are combined in parallel to generate LT and LTE with minimal overall delay.

* THE IDENTIFICATION CIRCUIT (400) *

FIG. 25 is a block diagram of the identification circuit 400 of neuron circuit 11. The input category CAT signal on the 14-bit CAT-BUS and global category C* on the OR-BUS are inputs to two-way multiplexer 401. The mux 401 output is the first input of comparator 402. Depending on the operating mode, the multiplexer 401 passes either the input category signal CAT or the global category signal C* to the first input of comparator 402. Comparator 402 is a conventional comparator of fourteen 2-way XOR gates driving a single 14-way OR gate. The output of comparator 402 is the first input of two-way XOR gate 403. Alternatively, multiplexer 401 may be replaced by a single main multiplexer circuit on the base chip for all the neuron circuits. In this alternate embodiment, the current dual bus input connection (OR-BUS and CAT-BUS) to each neuron is eliminated and replaced by a single main mux output bus carrying either the CAT or C* data as selected.

The other input of XOR gate 403 is the LEARNING signal L. Learning signal L from the IADD/CTL-BUS and is generated in the Status and Control Logic Circuit 18 under micro-controller/user 22 control. XOR gate 403 generates a 1 bit output K. L is active (L=1) during the learning phase and inactive (L=0) during the recognition phase. Identification Circuit 400 makes the final decision, during the learning phase, as to whether a neuron circuit must store an input vector.

As explained herein, the Daisy Chain Circuit 600 identifies and selects the ready to learn neuron circuit. Therefore, the Daisy Chain Circuit 600 sets the COmmitted signal CO active (CO=1) as soon as neuron circuit is committed. The LT and CO signals are inputs to a two-way AND gate 404. The AND gate 404 output is stored, preferably, in an optional one-bit F Register 405, which is controlled by the $\overline{L}$ signal (which is the inverse of L). The F Register 405 output is the local result Fire signal F. F is active (F=1) when, during recognition, the neuron circuit 11 has fired.

LTE and CO and the comparator 402 output are ANDed in a three-way AND gate 406. The AND gate 406 output is stored in 1-bit DEG register 407 which is gated by L. The DEG register 407 output is the neuron's DEGeneration status signal DEG and, so, is the DEG output from identification circuit 400. Therefore, DEG Register 407 holds a "1" when the neuron circuit 11 has degenerated (in this case, AIF register 352 contents equal MinIF). DEG and F are ANDed in two-way AND gate 408 to generate the local result DEGOUT signal. DEGOUT is active during the recognition phase whenever the neuron has degenerated and has fired.

Finally, F and K are ANDed in two-way AND gate 409 to generate the local result ambiguity signal UNC/FIRE.OK. The meaning of the ambiguity signal UNC/FIRE.OK depends on the neuron's operating mode. In the recognition mode, UNC/FIRE.OK is active only if there is an ambiguous result, i.e., the input vector has been recognized by at least two neuron circuits with different categories and, therefore, has not been identified. In the learning mode, if UNC/FIRE.OK=1, then the input vector has been recognized by at least one neuron circuit of the neural network and the ready to learn neuron is not engaged.

These three local result signals F, DEGOUT and UNC/FIRE.OK generated by Identification Circuit 400 indicate the neuron's response to the input vector. The Identification Circuit 400 also generates one status signal DEG. These local result signals are neuron outputs that combine with other corresponding neuron local result signals to form global result signals, F*, UNC/FIRE.OK* and DEGOUT*, that in part control neural network operation.

The global ambiguity signal is low, only if all of the neural network's neuron's local ambiguity signals UNC/FIRE.OK are low. Therefore, in the recognition mode, UNC/FIRE.OK*=0 means that either the input vector has not been recognized at all or it has been identified; UNC/FIRE.OK*=1 means that the input vector was not identified because at least two neuron circuits with two different categories have recognized the input vector. So, in the recognition mode, which involves only engaged neurons, comparator 402 compares the local category C, stored in the neuron's category register 450, with the global category C* on the OR-BUS. For engaged neurons, L is inactive (L=0). If C and C* match, then the output of comparator 402 is low, the output of XOR 403 is low and UNC/FIRE.OK is low.

However, if C and C* are different, then the output of comparator 402 is high. So K, from XOR gate 403, is also a "1". If F is active (F=1), then output signal UNC/FIRE.OK is equal to 1. If UNC/FIRE.OK equals 1, then, at least two neuron circuits with different local categories have fired. Thus, more than 1 neuron has recognized the input vector, but because the firing neurons have different categories, the input vector has not been identified. If, for the neural network, at least one ambiguity UNC/FIRE.OK is 1, then, the global result UNC/FIRE.OK*=1, i.e., the result of the ORing of all local result signals is a 1. So, UNC/FIRE.OK*=1 indicates that at least two committed neuron circuits have recognized the input vector and so, have fired, but have different local categories and, therefore, the input vector has not been identified. If, however, all firing neuron circuits have the same local category C, equal to and indicated by the global category C*, then all of the local result ambiguity signals UNC/FIRE.OK from all of the firing neurons are equal to 0. Therefore, the global result signal UNC/FIRE.OK* is equal to 0, indicating that the input vector is identified and its category is equal to C*.

The neural network enters the Learning mode from the recognition phase if the input vector has not been identified, i.e, ID*=0. In the learning mode, the global result signal UNC/FIRE.OK* determines whether to enter the reduction sub-mode or to engage the ready to learn neuron circuit and thereby freeze the input vector in that neuron's weight memory 251. The ready to learn neuron was pre-charged during the previous recognition phase. In the learning phase (L=1), for each engaged neuron circuit, the input category CAT supplied by the micro-controller/user 22 on the CAT-BUS is compared to the local category C in comparator 402. If C is equal to CAT, then the comparator input is low. XOR gate 403 output K is high, UNC/FIRE.OK=1 and, because of the low passed from the comparator 402 output to the input of AND gate 406, LTE is ignored. The reduction process is begun because a neuron circuit has recognized the input vector and the neuron's local category matches the input category CAT.

However, if C and CAT are different, depending on LTE (the result of the distance comparison between D and the MinIF), two cases are considered. If LTE=1 (i.e. D<=MinIF), then neuron circuit 11 has degenerated. If so, a logic one from AND gate 406 is stored in the DEG register 407 and the MinIF value is stored in AIF register 352. However, if LTE=0 (i.e. D>MinIF), then the output of AND gate 406 remains low as does the contents of DEG register 407 and, the neuron's influence field is reduced. Determining whether neuron circuit 11 has degenerated or not is an important step of the reduction process. If a neuron identifies the input vector, then the ready to learn neuron circuit is not engaged and remains the ready to learn neuron. So, the pre-charged input vector is not "frozen" as a new prototype vector in ready to learn neuron's weight RAM 251. Thus, both recognition phase and during the learning phase, the global ambiguity result signal UNC/FIRE.OK* controls every neuron in parallel, instead of each neuron being controlled, individually, by its local ambiguity signal UNC/FIRE.OK.

* THE Dmin DETERMINATION
CIRCUIT (500) *

Figure 26:
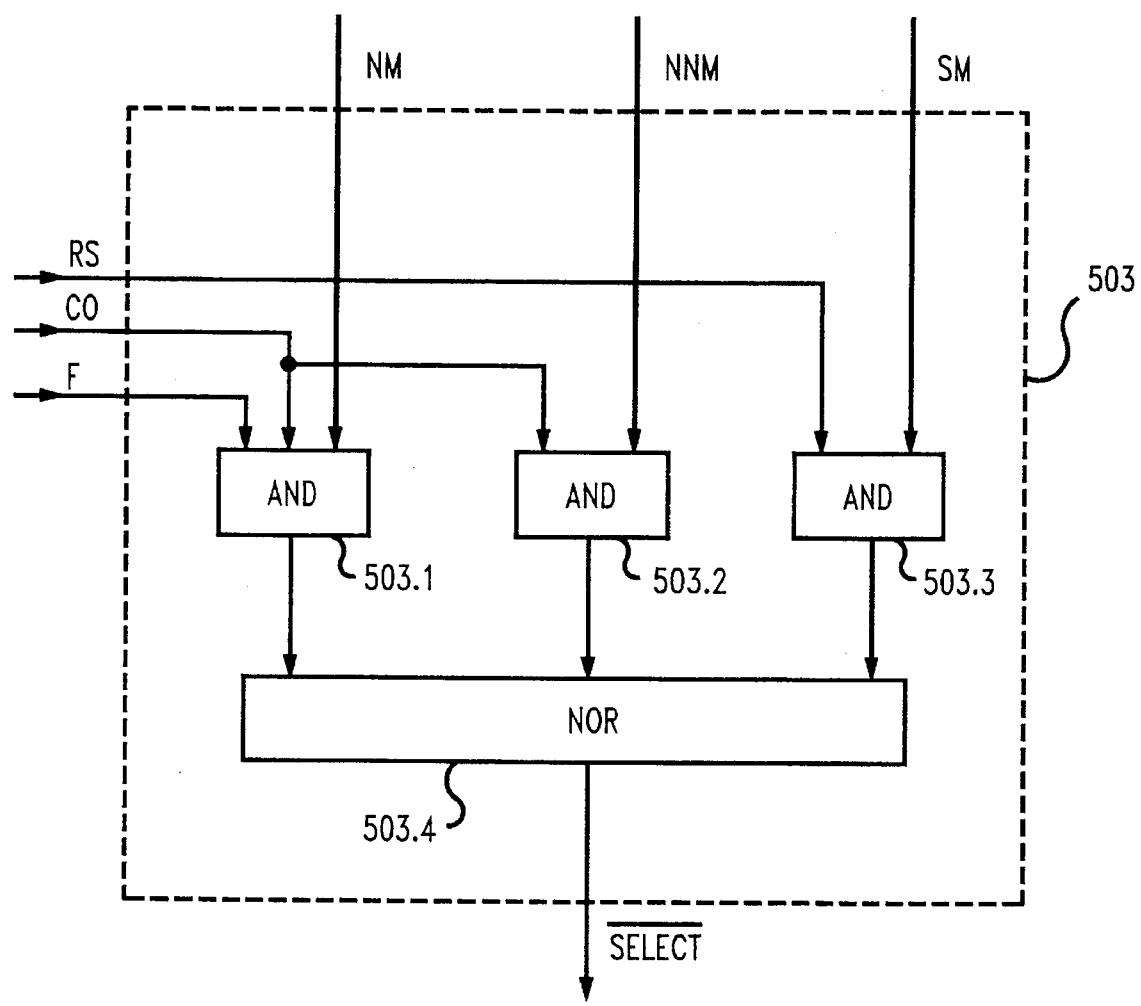
FIG. 26 is a schematic block diagram of the logic circuit 503 in the Dmin determination circuit 500 of FIG. 8.

The Dmin determination circuit 500 in FIG. 8, includes a multiplexer 501, a search/sort circuit 502 and a logic circuit 503. FIG. 26 is a block diagram of the logic circuit 503 which generates the $\overline{\text{SELECT}}$ control signal for search/sort circuit 502. The Logic circuit 503 generates $\overline{\text{SELECT}}$, F, CO and RS from control inputs depending on three operating modes/sub-mode of the base chip 10. These three chip operating modes are the NORMAL (NM), the NEAREST NEIGHBOR (NNM) (See FIG. 14 (A)) and the SAVE Mode (SM). These three mode signals are generated in the Status and Control Logic Circuit 18 and provided on the IADD/CTL-BUS to logic circuit 503. Logic circuit 503, is preferably one 3-way AND gate 503.1, two 2-way AND gates 503.2 and 503.3 and, one 3-way NOR gate 503.4. The CO, F and NM signals are AND'ed in AND gate 503.1. The CO and NNM signals are AND'ed in AND gate 503.2. The RS and SM signals are AND'ed in AND gate 503.3. The outputs of the three AND gates 503.1–503.3 are NOR'ed in NOR gate 503.4 to generate the $\overline{\text{SELECT}}$ signal. The $\overline{\text{SELECT}}$ signal is actually an inhibit signal, controlling Search/Sort Circuit 502.

Search/Sort Circuit 502 aggregates with other engaged neuron search/sort circuits to search all of the distances calculated by those engaged neuron circuits of a neural network and, then, determines the minimum distance Dmin therefrom. After finding Dmin, the aggregated Search/Sort Circuit 502 sort the remaining distances in increasing order. The Search/Sort Circuit 502 is used, secondarily, for searching and sorting category data.

Data searching and sorting is conducted collectively by all the neuron circuits of the neural network. First, the Search/Sort Circuits 502, identify a minimum parameter value (e.g. Dmin) among a group of such parameter values (e.g. D) and, then, sorts the remaining parameter values in increasing order. Alternatively, the Search/Sort circuit 502 of the preferred embodiment may be modified for finding a maximum parameter value and then, sorting the remaining parameter values in decreasing order.

Figure 27:
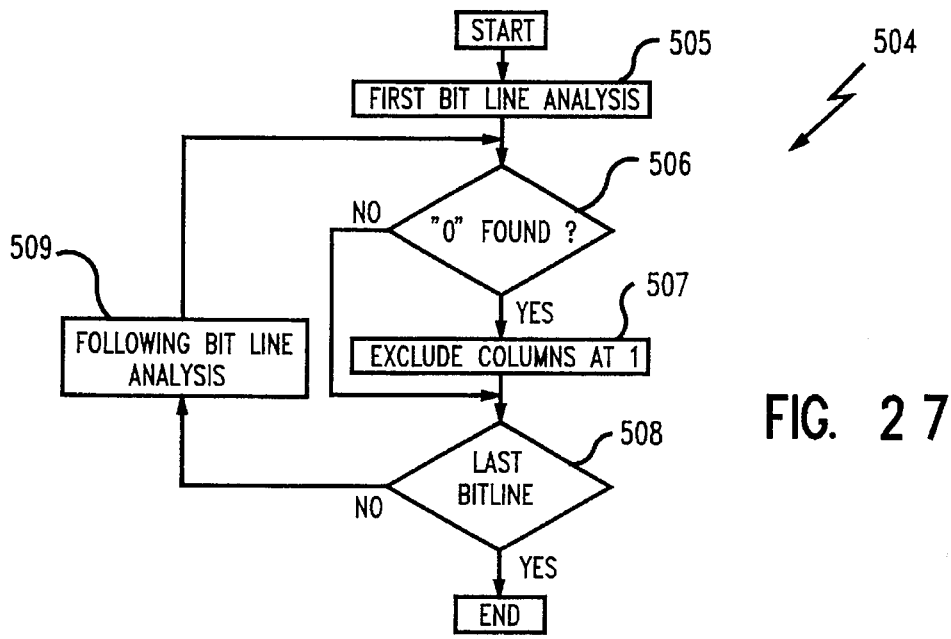
FIG. 27 shows a flow-chart of the search/sort algorithm for the base of the FIG. 8 search/sort circuit 502 operation.

FIG. 27 is a flow diagram of the search process 504 of the preferred embodiment of the present invention. For example only, the search process 504 is described herein for determining Dmin among four neuron circuits 11-1 to 11-4. The determination occurs after each neuron of the example has calculated its respective distance (D1, D2, D3, or D4) between the input vector and its stored prototype vector. First, prior to starting the search process 504 the four calculated distances are arranged in four columns and their corresponding bits arranged in rows to form a matrix. TABLE II below shows the resulting matrix for four distances D1, D2, D3, and D4 each consisting of a four bit binary word wherein as D1=0110, D2=1001, D3=1101, and D4=0101. The first row L1 of Table II are the MSBs for each word, with each successive row being formed from each successive bit until the last row L4 is formed from the LSB's. The bit notation dki indicates the bit of the kth row and the ith column. Variable k (in the present example, k=1 to 4) is the rank of the bit in the binary word representing a distance. Variable i (i=1 to 4) is the rank of the particular neuron circuit. As a result, in the matrix of TABLE II, each row forms a binary word (e.g. L1=0110 is formed by the MSBs of each distance word).

TABLE II

|    | D1       | D2       | D3       | D4       |       |
|----|----------|----------|----------|----------|-------|
| L1 | d11 = 0  | d12 = 1  | d13 = 1  | d14 = 0  | (MSB) |
| L2 | d21 = 1  | d22 = 0  | d23 = 1  | d24 = 1  |       |
| L3 | d31 = 1  | d32 = 0  | d33 = 0  | d34 = 0  |       |
| L4 | d41 = 0  | d42 = 1  | d43 = 1  | d44 = 1  | (LSB) |

After forming the matrix, the Search Process 504 is begun. After the search process 504 has been initiated (started), the bits of the first row or line L1 are analyzed 505. Line L1 is tested in box 506 to determine whether or not any of the bits are "0". In the present example, the first line L1 includes two zeroes. Thus, in box 507, those distances D1 and D4, identified as having a "0", include the minimum value Dmin. The MSBs of remaining distances, D2 and D3, are 1's and, so, the corresponding columns are excluded from subsequent processing steps. So, for the present example, the column location of each excluded distance is marked with an X, as schematically indicated in the Status Line (SL) below:

```
     D1   D2   D3   D4
L1   0    1    1    0    ==>  0 found
                                !
SL        X    X    <_____!
```

The Status Line indicates by the Xs that the columns corresponding to distances D2 and D3 are excluded. The current line (L1) is checked in box 508 to determine if it is the last line.

So since, line L1 is not the last line, the search process continues in box 509. Only columns D1 and D4 of the following line L2 are examined for the presence of a "0" in box 506. Box 507 is by-passed, because in L2 neither bit is a zero and, so, neither of these two remaining columns are excluded. Therefore, because line L2 did not include zeros, the previous status line SL, as illustrated below, is unchanged.

```
     D1   D2   D3   D4
L2   1    X    X    1    ==>  0 not found
                                !
SL        X    X    <_____!
```

After checking in box 508 to determine if L2 is the last line, the search process continues on line L3, wherein, a zero is detected in bit d34 of distance D4. So, Distance D1 is excluded in box 507, as illustrated below.

```
     D1   D2   D3   D4
L3   1    X    X    0    ==>  0 found
                                !
SL   X    X    X    <_____!
```

Finally, after checking in box 508 to determine whether L3 is the last line, line L4 is examined in box 506. Since only a "1" is found in line L4, box 507 is by-passed. Thus the above status line is final as indicated below. Since, distances D1, D2, D3 were excluded, distance D4 in neuron circuit 11-4 is Dmin=D4=0101.

```
     D1   D2   D3   D4
L4   X    X    X    1    ==>  0 not found
                                !
SL   X    X    X    <_____!
```

Because line L4 is the last line, the search process terminates in box labelled "END" after box 508.

Figure 28A:
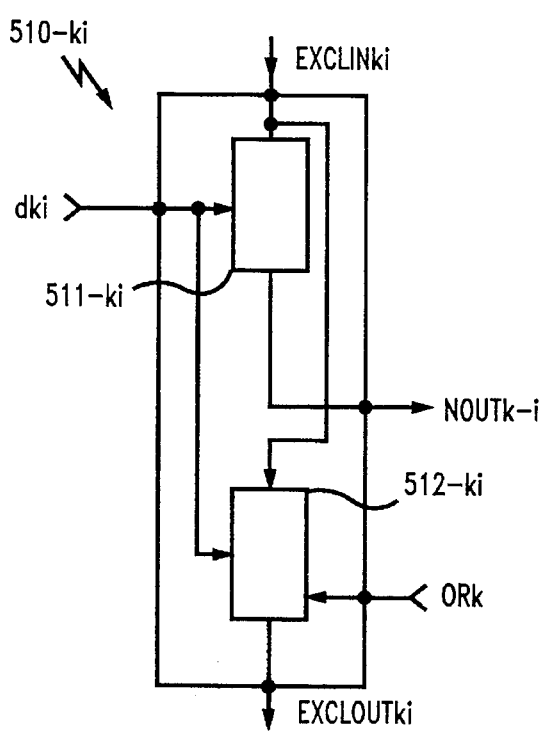
FIG. 28(A) is a schematic block diagram of the preferred elementary search/sort unit used in the search/sort circuit 502 of FIG. 8 to process each bit of the distance signal calculated by the neuron circuit.

FIG. 28(A) is a block diagram of the elementary Search/Sort unit 510, forming the Search/Sort Circuit 502 according to the present invention. The particular reference, e.g., 510-ki, designates a particular elementary Search/Sort unit 510 for a particular bit dki (line k, column i where k=1 to p and, i=1 to N) of the distance signal Di from the evaluator circuit 200 of neuron circuit 11-i. Each unit Search/Sort 510-ki includes two sub-units 511-ki and 512-ki. There are three input signals to each unit 510-ki: distance input bit dki; column exclude input EXCLINki; and, feedback signal ORk. There are two outputs from each unit 510-ki, local output NOUTk-i and column exclude output EXCLOUTki.

EXCLINki selects or inhibits the Search/Sort unit 510-ki during the search process, e.g. the Dmin determination. For example, if EXCLINki is inactive (EXCLINki=0), unit 510-ki is enabled (not excluded). Conversely, if EXCLINki is active (EXCLINki=1), unit 511-ki disabled (excluded) and NOUTk-i is inactive (NOUTk-i=0 for the preferred embodiment). Essentially, NOUTk-i=0 does not effect the output of OR circuit 12. When Search/Sort unit 510-ki is enabled, sub-unit 511-ki determines whether or not bit dki is a "0". Thus, Di bit dki and EXCLINki are combined to generate the output NOUTk-i. The second sub-unit 512-ki generates an input control signal for controlling a subsequent search/sort unit 510-(k+1)i. Therefore, EXCLOUTki, is a function of EXCLINki, dki and signal ORk. Sub-unit 512-ki determines if distance Di is to be excluded from the search in the subsequent matrix line. Input ORk is a gating signal generated by ORing of all the NOUTk-i signals from line k (ORk=NOUTk-1 OR . . . OR NOUTk-N).

Figure 28B:
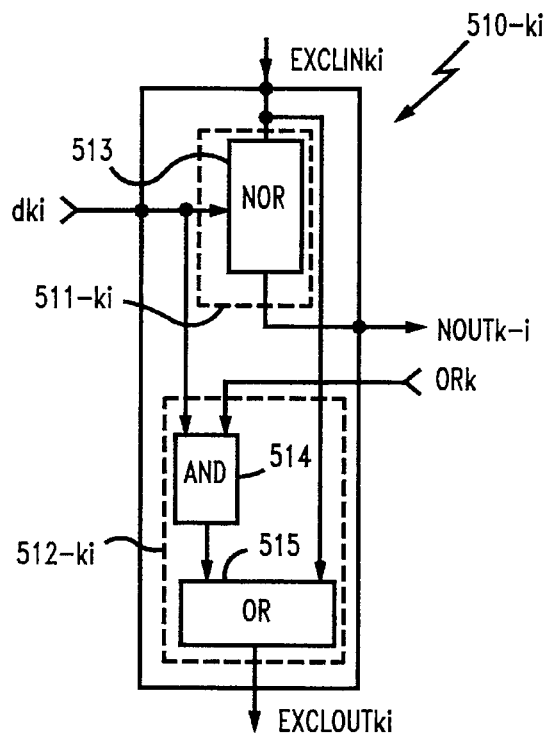
FIG. 28(B) is a detailed block diagram of the elementary search/sort unit of FIG. 28(A) in standard logic gates.

FIG. 28(B) is a detailed block diagram of a preferred embodiment of search/sort sub-unit 510-ki. Sub-unit 511-ki is a NOR gate 513 that generates NOUTk-i=dki NOR EXCLINki. So, if EXCLINki=1, then NOUTk-i is forced to zero (neutral to OR gate 12) regardless of dki. Sub-unit 512-ki, which also determines whether Di is included is an AND-OR function formed by AND gate 514 and OR gate 515. AND-OR gate 512-ki generates EXCLOUTki=EXCLINki OR (dki AND ORk). If EXCLINki=0 (dki is not excluded), NOUTk-i is equal to $\overline{dki}$. Therefore, if dki=0, then NOUTk-i=1, indicating that dki is a zero. NOUTRk-i=1 forces ORk equal to one and, because dki=0 and signal EXCLINki=0, EXCLOUTki=0. Thus, the subsequent Search/Sort unit 510-ki+1 is included (not inhibited). By contrast, however, if dki=1, then, because EXCLINki is 0, NOUTk-i is 0. Thus, in each line k, there are two alternate responses for each sub-unit 512k-i, each depending upon the state of other included input bits dki in the line k. First, if all the included input bits dki are "1", then, all Search/Sort unit 510ki outputs of line k (for all the values of i) are equal to zero, i.e. ORk=0 and EXCLOUTki=0 (indicating no exclusion). Second if, at least one included input bit dki is equal to 0, then, the corresponding local result NOUTk-i is equal to 1. Therefore, ORk=1 and EXCLOUTki=1, thereby excluding any column with dki=1.

Figure 29:
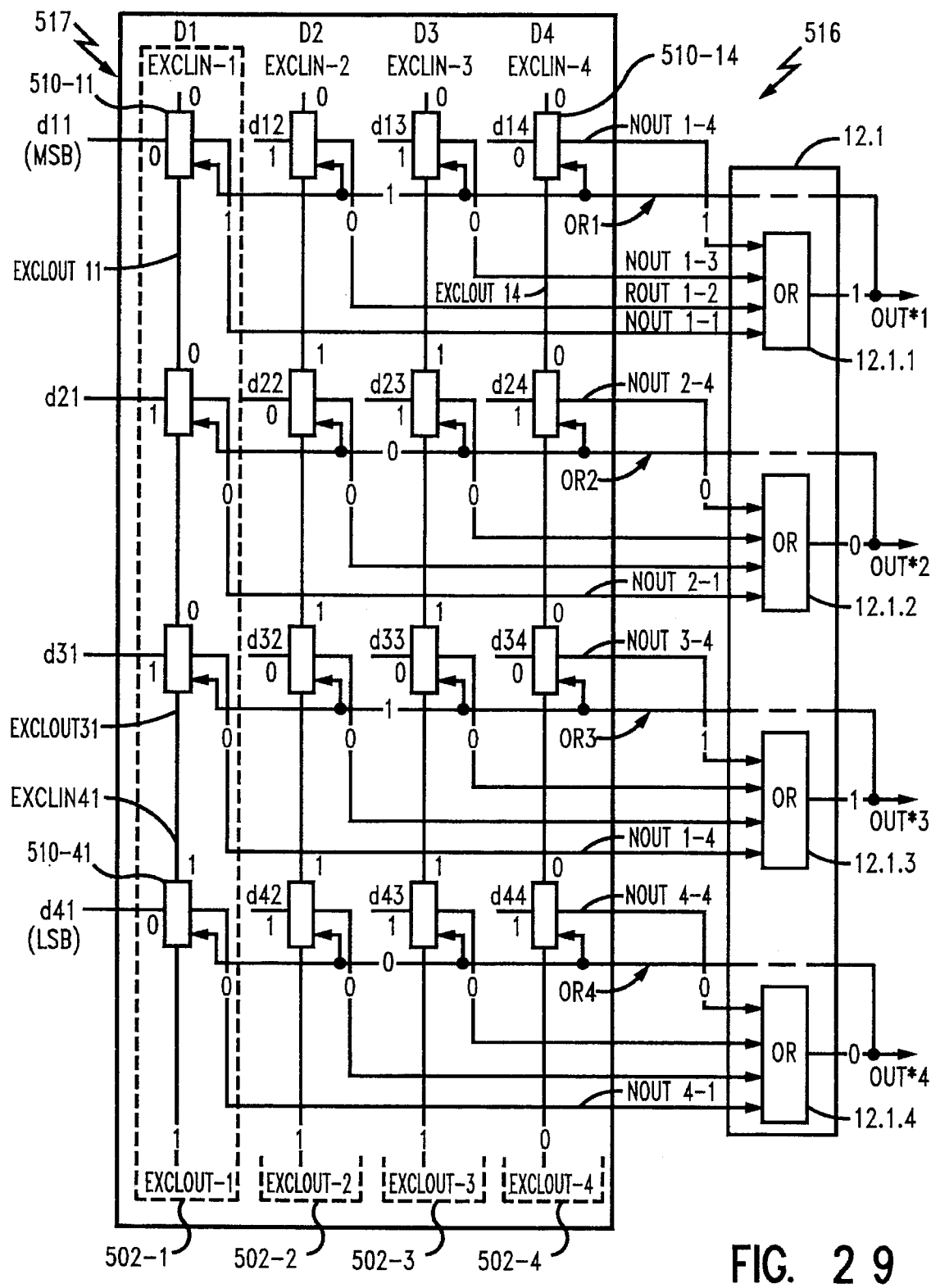
FIG. 29 is a schematic block diagram of an example of an alternate aggregate circuit formed from four search/sort circuits 502 for the determination of the minimum distance among four four-bit distances in the neural network according to FIG. 4(A).
Figure 30:
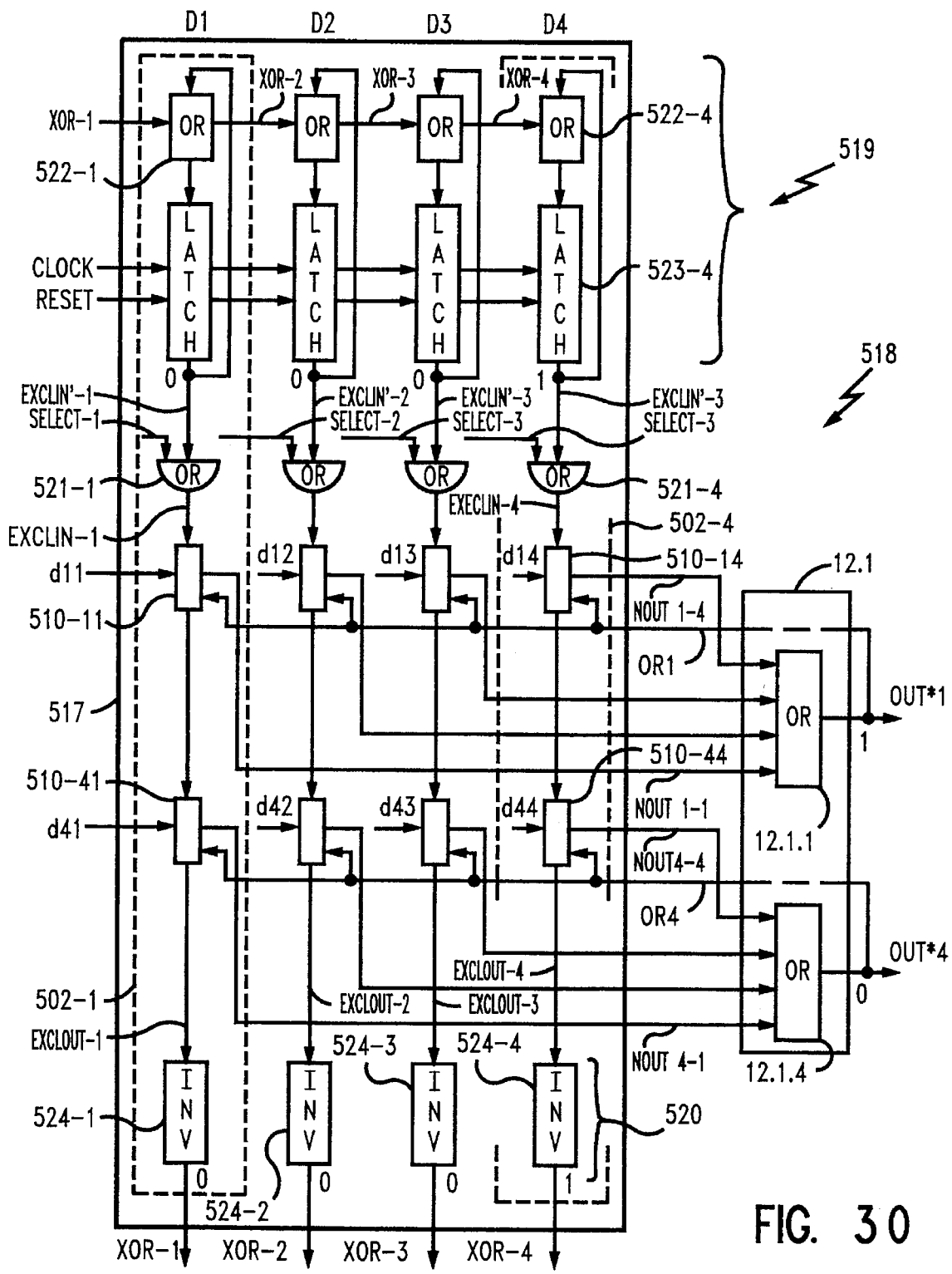
FIG. 30 is a schematic block diagram of an example of a preferred aggregate circuit including the alternate aggregate circuit of FIG. 29 and further including storage elements to allow the remaining distances to be sorted in the increasing order.

FIG. 29 is a simple example of an alternate embodiment aggregate search/sort circuit (FIG. 30 is a block diagram of an example of the preferred embodiment) wherein four search/sort circuits 502-1 to 502-4 (aggregated from four different neuron circuits 11-1 to 11-4) are combined in a 4 bit OR sub-circuit 12.1 of OR circuit 12 to generate OUT*1 to OUT*4 of global output signal OUT*. This example is 4 bits only for illustration and is not intended as a limitation. It is, therefore, understood that the search/sort circuit 502 may be any width and is 14 bits wide in the preferred embodiment. The 4 bit search/sort circuit 516 in FIG. 29 includes the four identical search/sort circuits 502-1 to 502-4 that form an aggregate search/sort circuit 517 and dedicated OR sub-circuit 12.1. The aggregate circuit 517 is an array of sixteen elementary search/sort units 510-11 to 510-44. Furthermore, each of these individual four search/sort circuits 502-1 to 502-4 is located in a neuron circuit 11-1 to 11-4. Thus, each neuron circuit (11) of the base chip 10 includes a search/sort circuit 502 formed from 14 cascaded elementary search/sort units 510 to form a column of an aggregate search/sort circuit 517.

Since the search/sort circuits 502 are each in a neuron circuit 11, all of the search/sort circuits 502-1 to 502-4 are identical. The first line of search/sort units 510-11 to 510-14 process MSB bits d11 to d14. In the present example, search/sort unit 510 inputs EXCLIN1i and outputs EXCLOUT4i that are circuit inputs and outputs to aggregate circuit 516. The aggregate circuit inputs are labelled EXCLIN-i and outputs are labelled EXCLOUT-i. Thus, global exclude inputs EXCLIN-1 to EXCLIN-4 are also inputs to search/sort units 510-11 to 510-14, respectively, which, in turn, generate outputs NOUT1-1 to NOUT1-4. NOUT-1 to NOUT-4 are each an input to OR gate 12.1.1 where they are combined to provide global output OUT*1 OUT*1 is fed back as the OR1 input to search/sort units 510-11 to 510-14 in the first row or line. OUT*2 to OUT*4 are generated in OR gates 12.1.2 to 12.1.4, respectively, identically to OUT*1 Search/sort units 510-11 to 510-14 also generate intermediate outputs EXCLOUT11 to EXCLOUT14 that are inputs to each respective EXCLIN of second row search/sort units 510-21 to 510-24. Subsequent lines of aggregate circuit 517, except for the last line (the fourth line in this example), are connected, essentially, the same as the second. In the last line, search/sort units 510-41 to 510-44 generate global outputs EXCLOUT-1 (or EXCLOUT-41) to EXCLOUT-4 (or EXCLOUT-44). Alternatively, NOR gates could replace OR gates 12.1.1–12.1.4, provided the NOR gate outputs are inverted prior to being fed back to the search/sort circuits 502 in order to maintain the resultant logic relationship ORk=OUT*k=NOUTk-1 OR . . . OR NOUTk-N.

In FIG. 29, for convenience in understanding operation of circuit 516, the logic level of each node is marked according to the example of TABLE II. When the search is started, the Exclude inputs EXCLIN-1 to EXCLIN-4 are zero to select each column and, so, EXCLIN-1=. . . =EXCLIN-4=0. Once the search process is initiated, distance bits d11 to d44 are provided to each of their respective inputs of units 510-11 to 510-44 in accordance with TABLE II. Therefore, as indicated in FIG. 29, the MSBs, d11, d12, d13 and d14 are provided to their respective search/sort units 510-11 to 510-14 in the first line L1 (L1=0110). Following the above described search/sort process, the local output word from the search/sort units is NOUT1-1|NOUT1-2|NOUT1-3|NOUT1-4=1001, i.e. $\overline{L1}$. These four local output signals are ORed in OR gate 12.1.1 to generate the first bit OUT*1 of global output signal OUT*. In this example, OUT*1=1 because zeros has been inverted and, therefore, NOUT1-1 and NOUT 1-4 are both 1. So, OUT*1=1 indicates that at least one zero has been identified in the first line. If all 4 local outputs were 1, OUT*1 would be zero. Output bit OUT*1 is fed back as OR1 into each of units 510-11 to 510-14.

EXCLOUT11–EXCLOUT14 are generated by sub-unit 512 of each of the search/sort units 510-11 to 510-14 of the first line. For the present example, EXCLOUT11=0, EXCLOUT12=1, EXCLOUT13=1 and EXCLOUT14=0. These four first line outputs are exclude inputs to corresponding search/sort units of the second line. So, in the present example, search/sort units 510-21 to 510-24, are selected, while base units 510-22 and 510-23 are excluded by the ones on EXCLOUT12 and EXCLOUT13. Whenever, an EXCLIN is a 1, the corresponding search/sort unit 510 is inhibited and passes the 1 to inhibit subsequent search/sort units 510 of subsequent lines in the same column. Thus, in each line, only the remaining enabled bits are checked for zeros. So, in the present invention, because d31 is a one, EXCLIN41 input to unit 510-41 is a 1, excluding that column for line 4. This result is unmodified by the LSBs in the fourth line.

The final result of the search process, is the output of OR gates 12.1.1 to 12.1.4, given by OUT*= OUT*1|OUT*2|OUT*3|OUT*4=1010. Thus, OUT* is the complement of the minimum distance D4, calculated by neuron circuit 11-4. Additionally, outputs EXCLOUT-1 through EXCLOUT-3 signals are "1" and, only output EXCLOUT-4 is "0". In summary, the minimum distance Dmin value D4 has been identified as D4. OUT* (which is the output of circuit 516) is the complement of Dmin; and the closest neuron circuit has been identified (in this example, neuron circuit 11-4) as the only neuron circuit with EXCLOUT equal to zero.

In the present example, 4 search/circuits 502-1 to 502-4 are combined to handle 4 bit values for the sake of illustration only, and not as limitation. A person skilled in the art would understand how to combine N p-bit wide (p=14 in the preferred embodiment base chip 10) search/sort circuits 502-1 to 502-N to result in an aggregate circuit 517 for determining the minimum distance Dmin among N distances D1, . . . , DN. Furthermore, in such a combination, OR sub-circuit 12.1 is p N-way OR gates 12.1.1 to 12.1.p to generate a p-bit wide output signal OUT* (OUT*1 to OUT*p). The OR input is also p-bits wide, OR1 to ORp. OR1 to ORps are fed back to the neural network from the OUT*1 to OUT*p.

FIG. 30 is a block diagram of an example of the preferred embodiment aggregate circuit 517. Besides the elements of the circuit of FIG. 29, this preferred embodiment circuit includes additional circuitry to allow sorting the distances in the increasing order, if desired. This additional circuitry includes the logic 519 at the top of the aggregate circuit 517 and, the bank of inverters 520 at the bottom. The logic 519 in each column (neuron) includes 2 two-way OR gates 521-1, 522-1 and a storage element 523-1, e.g., a latch. OR gate 522-1 and latch 523-1 are connected in series, the output of the OR gate 522-1 driving the data input of the latch 523-1. The output of the latch 523-1 is fed back to one input of OR gate 522-1. An XOR-1 signal is the other input of OR gate 522-1. Standard CLOCK and RESET signals control the latch 523-1. The output of latch 523-1 is also the first input of OR gate 521-1, generating an EXCLIN'-1 signal. The other input of OR gate 521-1 is $\overline{\text{SELECT}}$. The output from OR gate 521-1 is the EXCLIN-1 signal to search/sort unit 510-11 of search/sort circuit 502-1. Finally, for column D1, the preferred embodiment circuit 520 includes an inverter 524-1 inverting the EXCLOUT-1 output of search/sort circuit 510-41 generating XOR-1. XOR-1 is fed back and as an input to OR gate 522-1. In the preferred embodiment circuits 519 and 520 are included in each neuron's search/sort circuit 502. So, in applying the preferred embodiment to the example of FIG. 19, circuits 519 and 520 are also included in each of columns D2 to D4. The rest of the preferred embodiment Search/Sort Circuit 502 is essentially identical with that of FIG. 29, and, therefore, sorts and searches in accordance with Table II.

However, the added circuits 519 and 520 add search operations for the preferred embodiment search/sort FIG. 30. First, during initialization, by asserting RESET, each of latches 523-1 to 523-4 are reset, forcing EXCLIN'-1 to EXCLIN'-4 to zero. After the latches 523-1 to 523-4 are reset, if all four neurons are engaged, sorters 502-1 to 502-4 are not inhibited, ($\overline{\text{SELECT-1}}$ to $\overline{\text{SELECT-4}}$ are not a 1) and, so, are selected from logic circuit 503 (FIG. 26). Therefore, EXCLIN-1 to EXCLIN-4 are equal to zero (indicating no exclusion). For the above example of Table II, the subsequent search is identical to that described for FIG. 29, until the minimum distance is identified as distance D4. So, as a result of the search, EXCLOUT-1 to EXCLOUT-4 form the binary 4 bit word 1110. After being inverted in inverters 523-1 to 523-4 of circuit 520, the resulting outputs XOR-1 to XOR-4 form the binary word 0001 as shown in FIG. 30. Thus, for the preferred embodiment, after the search step, Dmin is identified by the XOR position of the 1.

After first determining Dmin, the sort process is begun. Each of XOR-1 to XOR-4 are fed back and ORed in OR gates 522-1 to 522-4 with the corresponding one of EXCLIN'-1 to EXCLIN'-4 (which is equal to binary word 0000). The outputs of OR gates 522-1 to 522-4 are latched in latches 523-1 to 523-4, respectively. The new latched value of the EXCLIN-1 to EXCLIN-4 is then passed through OR gates 521-1 to 521-4 as binary word 0001, which is the first sort input to row 1. Because only EXCLIN-1 to EXCLIN-3 are equal to 0, only the corresponding search/sort circuits 502-1 to 502-3 participate in the sort process. Search/sort circuit 502-4 is excluded from the sort because distance D4 is already identified as Dmin and, therefore, excluded (EXCLIN 4=1). So, aggregate circuit 518 re-initiates a Search process to determine which is the minimum of the three remaining distances D1, D2 or D3, the same search process as described above in determining Dmin. In this second search, Distance D1 is identified from the minimum distance of the three. Because XOR-1 is high, column 1 is excluded which switches EXCLIN-1 high. So, the remaining distance D2 and D3 are sorted in ascending order by searching these remaining distances for a next minimum distance and, then, excluding that identified minimum distance until all of the distances have been excluded. Therefore, as a result of the search/sort in the present example, D4, and then D1, D2 and D3, are placed, sequentially, on the OUT*-BUS.

Adapting the preferred embodiment search/sort circuit to search the maximum distance and then to sort the remaining distances in the decreasing order, requires appropriate logic inversions in the search/sort units 510. A person skilled in the art would understand where such inversions would be required.

In summary, each neuron includes one search/sort circuit 502. All of the search/sort circuits 502 in engaged neurons in a neural network are aggregated to form an aggregate circuit (such as 517). The Aggregate Circuit is very fast, because all p (14) bits of all of the distances D1 to DN are searched in parallel. Therefore, unlike prior art neural networks, a sequencer is not required. Further, the number of neuron circuits in the network does not impact the overall delay of an aggregate circuit. The number of neurons does, however, increase the required number of inputs in dedicated OR sub-unit 12.1. Advantageously, aggregate circuit 517 is modular and requires a minimal number of gates and transistors.

* THE DAISY CHAIN CIRCUIT (600) *

FIG. 31 is a block diagram of Daisy Chain Circuit 600. The Daisy Chain Circuit 600 is, primarily a 1-bit DAISY Register 601 that is controlled by ST. ST is derived, directly, from UNC/FIRE.OK* and L. DCI is the first input of a 2-way AND gate 602 and $\overline{\text{RESET}}$ is the other input. The output of AND gate 602 is the input to Daisy Register 601. The output of Daisy Register 601 is the first input to a 2-way OR gate 603 and, ALL is the other input. ST, $\overline{\text{RESET}}$ and ALL are common inputs to every neuron's daisy chain circuit 600 on the base chip 10. DCO is the output from OR gate 603 and an output of Daisy Chain Circuit 600 and a neuron output.

At initialization, RESET is active ($\overline{\text{RESET}}$=0). Therefore, the output of AND gate 602 is 0. This 0 is loaded into DAISY register 601 when ST goes active. So, OR gate 603 (with ALL=0) passes the 0 to DCO, which, as a result, is also a zero. ST is active only during the learning phase and, then, only at initialization or, when Identification Circuit 400 confirms that a neuron circuit should be engaged. When ST is active, the output of AND gate 602 is loaded into register 601.

If ALL is active (ALL=1), then DCO is active (DCO=1), regardless of the state of DAISY register 601. ALL is used for testing the neural network 11(A). During testing, all of the neuron circuits of the neural network 11(A) are forced to act as if they are engaged. During normal operation, ALL is 0 and $\overline{\text{RESET}}$ is 1. As described hereinabove, the DCI input terminal of the first neuron circuit 11-1 in the neural network is wired to VH, externally.

Daisy chain circuit 600 further includes a control logic circuit 604, which is a two-way XOR gate 605 and a two-way AND gate 606. In XOR gate 605, DCI and DCO are compared to generate the weight memory 251 read/write control signal RS (Ready to Store). Basically, RS is a write enable signal allowing or preventing a write operation in the neuron's weight memory 251. RS is high (write) only on the ready to learn neuron, i.e. the only neuron where DCI≠DCO. In the recognition phase, the input vector is passed to all committed neuron circuits (i.e., to both selected neurons and engaged neurons), but the input vector components are written into the weight memory 251 of only the ready to learn neuron. Precharging the weight memory prepares the ready to learn neuron for possible engagement during a subsequent learning phase. Therefore, if the decision is made to engage the ready to learn neuron, a separate charging or loading step is unnecessary, because the ready to learn neuron's memory is already loaded (pre-charged). Thus, pre-charging during the recognition phase provides significant advantages, because storing the up to 64 vector components (weights) may be a very time consuming process. In the preferred embodiment base chip 10, once it is decided to engage the ready to learn neuron because the input vector has not been identified, all that remains is: Storing the input category; activating ST in order to set DAISY register 601 in the ready to learn neuron circuit; and, then, terminating the learning phase. Setting the DAISY register 601, forces DCO high so that RS becomes inactive, preventing further writing in the weight memory 251.

AND gate 606 generates the COmmitted signal CO from DCO and NS. NS is generated by the neuron's matching circuit 150 as described above (see FIG. 5). CO is active for every committed neuron circuit, i.e., every neuron that is both selected and engaged. CO controls certain blocks of the base chip 10 in FIG. 4(A) and insures that only committed neurons participate in the recognition phase and in the reduction process.

At initialization, every neuron's DAISY register 601 on the base chip 10 is reset to zero as a result of the general reset ($\overline{\text{RESET}}$=0 and ST=1). The input terminal DCI of the first neuron circuit 11-1 is a one (DCI-1=1) because it is tied to VH. This high on DCI-1 is the first input of AND gate 602 and the other input is $\overline{\text{RESET}}$, also a one. Consequently, the data input to register 601 of the first neuron is a one. However, because register 601, was reset at initialization, the DCO-1 output of OR gate 603 (ALL=0) is 0. Therefore, immediately after initialization, only the first neuron circuit 11-1 of neural network 11(A) has complementary DCI and DCO values, i.e., DCI=$\overline{\text{DCO}}$. Also, because of initialization, for the daisy chain circuits of neuron circuits 11-2 to 11-N, DCI=DCO=0. Therefore, neuron circuit 11-1 is initialized as the ready to learn neuron circuit, by construction. Subsequently, when ST is active (in the learning mode), the logic one at the input of DAISY register 601 of the first neuron 11-1 is loaded therein. Once the first neuron's DAISY register 601 is loaded, DCI-1 and DCO-1 equal 1. Therefore, the first neuron circuit 11-1 has learned and become engaged.

After the first neuron 11-1 is engaged, DCI-2=DCI-1=1 and DCO-2=0. Thus, the subsequent neuron circuit in the chain, i.e. neuron circuit 11-2, is the ready to learn neuron circuit. Each neuron is, subsequently, the ready to learn neuron and, then, engaged as was the first neuron 11-1, until every neuron circuit 11-N is engaged. The time required to engage a neuron is very short because generation of DCO, which just requires a register and two elementary logic gates, has a very short overall delay. Furthermore, this engagement logic in the ready to learn neuron's daisy chain circuit is the critical delay path of the neural network. Other daisy chain circuits of the neural network remain unchanged during the learning or recognition phases and so, do not incur this delay. This delay is, moreover, independent of the number of neuron circuits in the neural network 11(A).

TABLE III, below, is a state table for the preferred embodiment neuron circuit with respect to DCI and DCO. There are two basic neuron circuit states: free (which includes the ready to learn neuron) and engaged.

TABLE III

| DCI | DCO | NC state |
| --- | --- | --- |
| 0 | 0 | free |
| 1 | 0 | free (ready to learn = first free) |
| 1 | 1 | engaged |
| 0 | 1 | reserved |

DCO-N (FULL), the last neuron circuit's DCO of a single base chip 10, indicates whether or not the last neuron circuit of neural network 11(A) is engaged. If the last neuron 11-N is engaged, then the neural network 11(A) is full. As indicated above, the daisy chain circuit for the stand alone base chip 10 of FIG. 4(A) may be adapted for a multi-chip neural network by connecting base chips in series, such as illustrated in FIGS. 11 and 12. Also, as is apparent from FIG. 11, only the DCI input terminal of the first base chip 10(1) is connected to VH, and so, is the ready to learn neuron circuit, by construction, at initialization. On the other hand, DCO of the last base chip 10(Q) forming elementary module 10(A) indicates whether or not the last neuron circuit of the last chip engaged. If this last DCO is a one, then all the neuron circuits on elementary module 10[A] are engaged.

The Daisy Chain Circuit 600 architecture is important for the cascading the base chip 10 to extend the neural network size. Unlike the architecture described in U.S. Pat. No. 4,974,169, supra, individually addressing the base chips 10(1) to 10(Q) is not required, obviating the need for a conventional decoder and conventional pointer circuits, that are normally included in each prior art chip. Consequently, base chips of the present invention are significantly denser.

Another advantage of the present invention over the prior art is the elimination of an address bus, with its inherent limitation on the number of addressable neurons in the neural network. Thus, conspicuously absent from FIGS. 4(A) and 4(B) is a bus labelled ADDRESS with its associated interconnections between the neuron circuits of base chip 10 and the micro-controller/user 22. Consequently, there is no logic limit on neural net size or on the number of base chips 10 that may be combined to form such a neural network. The base chips are only connected to the INDATA-BUS, the SEL/CTL-BUS and the GDATA-BUS. Further, only the chip-to-chip daisy chain connection is serial.

Also eliminated is a supervisor for data management during the learning phase, as required for prior art chips. Normally, a supervisor was needed to select (on an address bus) which neuron circuit is to learn. However, for the present invention, neuron circuits operation in the learning phase is independent of the micro controller/user 22. Instead, the micro-controller/user 22 need only provide the base chips 10 with examples and an associated category for each example. Once provided with examples, the neural network is basically, self-learning. The decision of whether or not to enter the learning mode is made, collectively, by all neuron circuits in the network, not by a supervisor.

Figure 32:
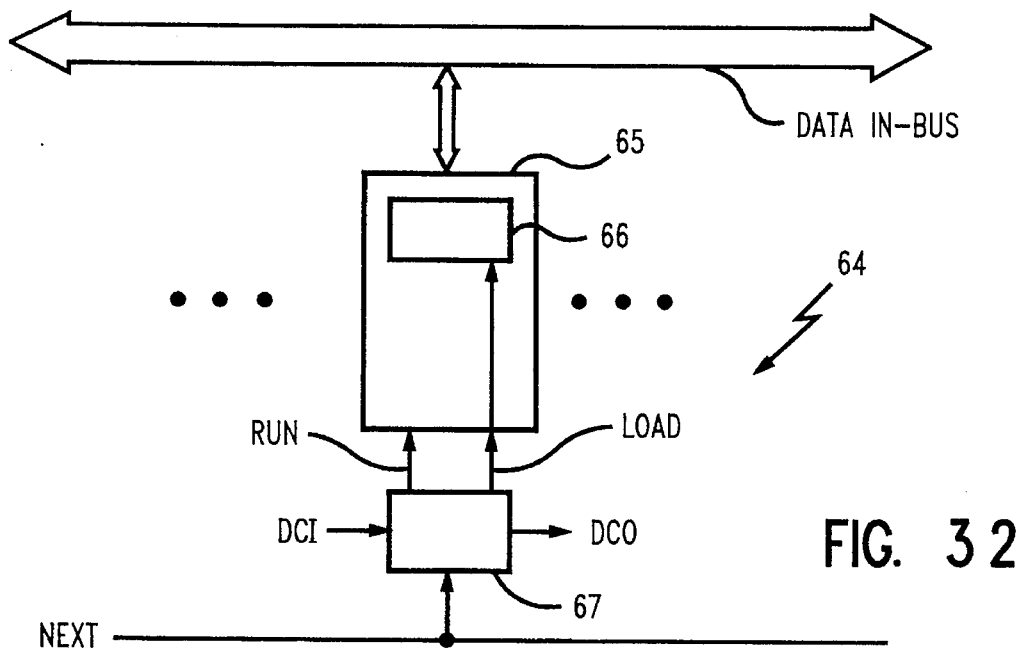
FIG. 32 is a schematic block diagram of an example of the application of the daisy chain circuit 600 to a multi-processors environment according to the present invention.

FIG. 32 is a block diagram representation of using the preferred embodiment neurons in a neural network wherein each neuron is one of several base processors 65 in a multiprocessor system 64, with the neuron's Daisy Chain Circuits 67 connected serially. Each base processing unit 65 is connected to a common input data bus, the DATA IN-BUS, by a local bi-directional data bus. Each base processing unit 65 has a R/W memory circuit 66. Data, on the DATA IN-BUS, is provided to all the processing units in parallel.

Each base processing unit has a Daisy Chain Circuit 67 that is identical to daisy chain circuit 600 of FIG. 31. Therefore, each Daisy Chain Circuit 67, includes a DAISY register and, is associated with a processing unit. The Daisy Chain Circuit 67 generates a RUN signal (the CO signal) and a LOAD signal (the RS signal) to control appropriate blocks of the processing unit 65. The Daisy Chain Circuits 65 of the multi-processors system 64 are serially connected. Each daisy chain circuit 67 receives a NEXT signal (the ST signal) from a state machine (not shown) to selectively store the daisy chain input DCI in the DAISY register of a single determined processing unit. As indicated above, when DCI and DCO for a processing unit are complimentary, input data on the DATA IN-BUS is loaded, automatically, into the R/W memory circuit 66 of that determined processing unit 65 (i.e., the ready to load processing unit). Thus, the processing unit is automatically determined (selected) by virtue of its daisy chain circuit having complementary values at its logic input DCI and output DCO.

* THE INTER-NEURON COMMUNICATION SYSTEM *

Figure 33:
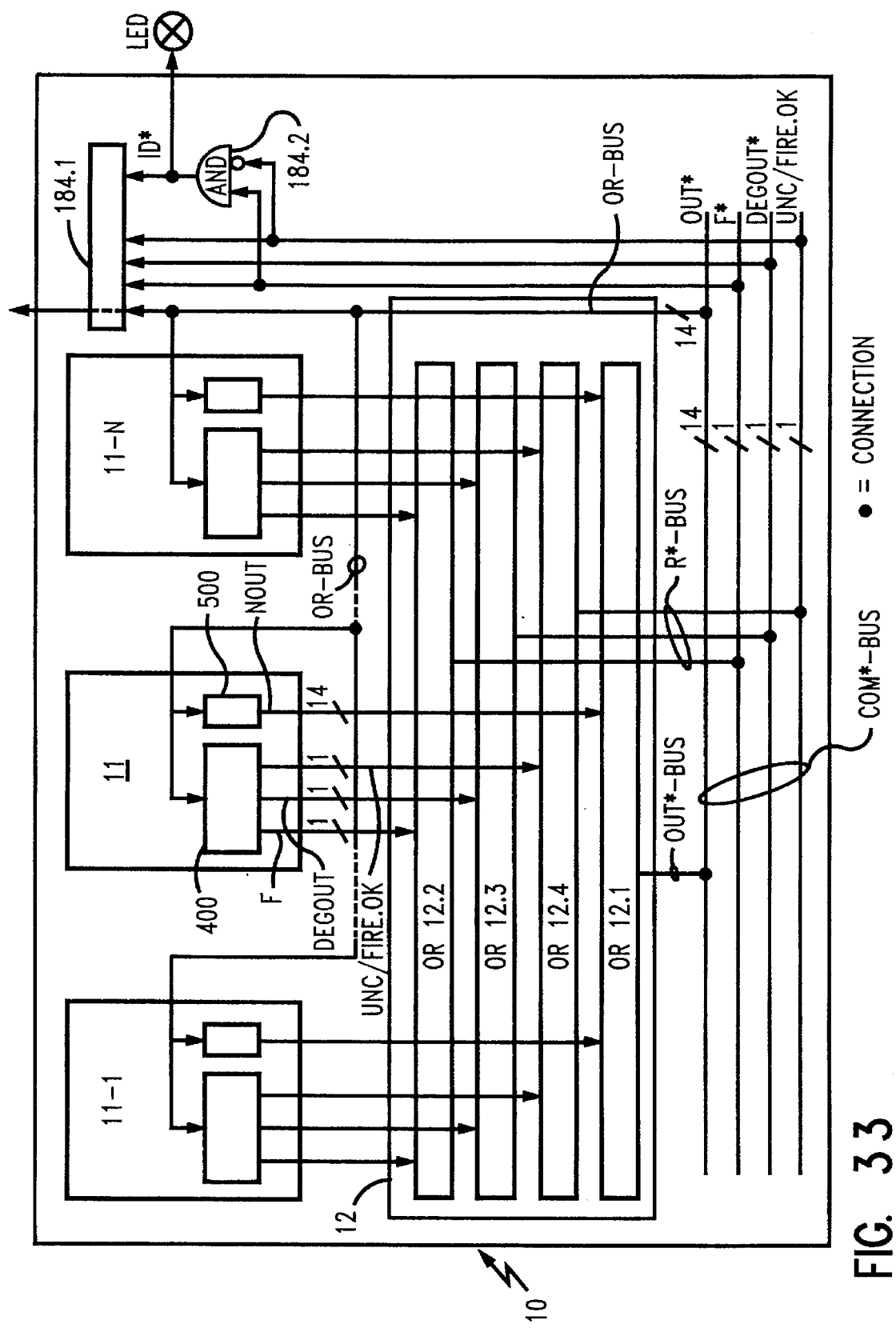
FIG. 33 is a schematic block diagram of the inter-neuron communication system for the stand alone neural chip of FIG. 4(A) wherein the OR function is performed by an OR circuit.

FIG. 33 schematically shows of the inter-neuron communication system of the stand alone base chip 10 of FIG. 4(A). The inter-neuron communication system includes OR circuit 12 that generates the global result signals F*, DEGOUT* and UNC/FIRE.OK* on the R*-BUS and, the global output signal OUT* on the OUT*-BUS. These two buses merge in the on-chip common communication bus COM*-BUS. The inter-neuron communication further includes the OR-BUS, a direct derivative of the OUT*-BUS, used for transferring distance data or category data.

For simplicity, in FIG. 33, only Identification Circuit 400 and Dmin Determination Circuit 500 are specifically represented in each individual neuron circuit 11-1 and 11-n. All local result signals and local output signals from each of the neuron circuits 11-1 to 11-N, are OR'ed in a respective dedicated OR sub-circuits 12.1 to 12.4, that together form OR circuit 12. OR sub-circuit 12-1 is a block of fourteen N-way OR gates. Each OR sub-circuit 12-2 to 12-4 is a N-way OR gate. Alternatively, OR sub-circuits 12.1 to 12.4 may be constructed by any logic circuit providing an equivalent result. Further, for simplicity dot ORing could be used instead of standard logic components to provide the OR function provided in the preferred embodiment by OR circuit 12.

Each neuron 11-1 to 11-N generates a local output signal NOUT that carries the distance/category data and is a 14 bit input to dedicated OR sub-circuit 12-1. The 14 bit global output signal OUT* from OR sub-circuit 12-1 is fed back from the OUT*-BUS to each neuron on the OR-BUS. Each neuron's local result signals F, DEGOUT and UNC/FIRE.OK are inputs to dedicated OR sub-circuits 12-2, 12-3 and 12-4, respectively. OR sub-circuits 12-2, 12-3 and 12-4 generate Global Result Signals F*, DEGOUT* and UNC/FIRE.OK* on global result bus R*-BUS.

Preferably, the global result and global output are stored in register 184.1 for subsequent processing. ID* result from ANDing F* and $\overline{\text{UNC/FIRE.OK*}}$ in AND gate 184.2. ID* also is stored in register 184.1. Optionally, an indicator may be used to pass ID* off the base chip 10 as shown in FIG. 33. The indicator, an LED for example, may be connected to ID* to provide immediate visual information to the user as to the global response of neural network 11(A).

The inter-neuron communication system of FIG. 33 for the stand alone base chip of FIG. 4(a) is modified to allow the assembly of a plurality of cascadable base chips 10 in FIG. 4(b) into a larger, multi-chip neural network, as schematically represented in FIG. 34. Each cascadable base chip's 10 outputs (from OR sub-circuits 12-1 to 12-4) the R*-BUS and the OUT*-BUS are connected in block 19 to driver circuits (e.g. sub-block 19.1 wherein 14 driver circuits DR* are connected to each line of the OUT*-BUS). These driver circuits are dottable to provide the second OR function to the inter-chip common communication bus COM-BUS. All of the base chips 10 of the multi-chip network are dot ORed to the COM-BUS. The COM-BUS includes both the global result signals F, DEGOUT and UNC/FIRE.OK and the global output signal OUT**. Some or, optionally, all of these global results and global outputs are fed back to each base chip 10 of the neural network through on chip receivers (RR) in block 19. Alternatively, the OR function provided by driver DR* could be through an OR circuit or a dot NOR function. Unlike the stand alone chip inter-chip communication system of FIG. 33 which has only a single OR stage, the multi-chip inter-chip communication system of FIG. 34 includes two OR stages as described for the cascadable base chip embodiment of FIG. 4(B). Optionally, this dual stage OR could be replaced by a single stage OR as described above with respect to alternate base chip 10'' of FIG. 10. Generally, there is no necessary functional distinction between the COM*-BUS (a single OR stage), the COM-BUS (two OR stages), or the COM*-BUS (three OR states). Therefore, unless such a distinction is significant, reference to COM*-BUS is intended to encompass all three types of buses. A multiplexer 21 in FIG. 4(B) provides this multi-chip embodiment base chip with the capability of either stand alone or multichip operation. The multiplexer 21 allows selection of either OUT* or OUT** as the OR signal that is fed back to every neuron circuit 11 on a chip 10.

FIG. 35 is a schematic diagram of a typical driver sub-block 19.1 of FIG. 34 for a feed back connection. The driver DR* in this figure is the first bit driver of each of eight base chips 10(1) to 10(8) that are connected together to form elementary neural network 11[A] (not shown) in an elementary module 10[A]. In elementary module 10[A], base chips 10(1) to 10(8) are dot ANDed to the DATA-BUS, instead of being dot ORed, because in CMOS Dot ANDing is faster than Dot ORing. This is because NFET pull-downs provide the fastest MOS switching devices, and so, are preferred. Thus, in the preferred embodiment, each driver circuit DR, is, simply, an open drain NFET device connected to a common load RL1. In bipolar technology, open collector NPN transistors provide an adequate alternative.

Therefore, OUT*1(1) to OUT*1(8) are each connected to gates of NFET devices. The drain of each NFET is dotted on a common line W1, which is also connected to a single pull-up resistor RL1. RL1 is connected between W1 and voltage source VH. The source of each open drain NFET is connected to GND. Each bit of OUT on the GDATA-BUS is the result of ANDing all corresponding bits from each chip. The OUT signal, as a result of passing through the receiver, is inverted from OUT* and, therefore, has opposite logic polarity to OUT** described hereinabove and resulting from the OR function (e.g. with the dot ORing of FIG. 34). As indicated in FIG. 35, because of the inversion inherent in the open drain driver, the receiver circuit RR is a inverting buffer. Thus, the OR*1 bit signal is reinverted to OR1 at each base chip 10 for correct on-chip polarity. The receiver may be gated by a Pass-Through control signal PT. In the preferred embodiment, whenever PT is active, the receiver outputs OR are forced to "0". Thus, as described above for FIGS. 29 and 30, whenever the OR signal is zero, search/sort circuit 502 is passed through (i.e. the exclude function is inhibited).

The open drain output from each chip is connected to an output line (W1 for bit 1). This common output line W1 is shared by all the NFET driver devices and connects the OUT**1 bit signal to the GDATA-BUS. However, this common output line is not the same line to which each chip's OR-BUS* receivers are connected. Instead, OUT is fed back to a receiver circuit RR on each base chip 10, on a common receiver line (Z1 for bit 1). A strap (STR1 for bit 1) interconnects lines W1 and Z1. The bit slice shown in FIG. 35 is typical for each of the other remaining bits connecting the 14 bit OUT signal to the GDATA-BUS. Maintaining the separation between receiver RR and Drivers DR* external to the module provides added flexibility, making strapping them together optional.

In summary, the elementary base module 10[A] has a number Q (in the present example, Q=8) of base chips 10 and does not require external components. A direct connection between the output of the driver circuit DR, and the input of the receiver circuit RR, which limits circuit flexibility, is avoided by using an external strap STR1. Each of the global result signals F, DEGOUT and UNC/FIRE.OK** are connected identically to the data outputs, e.g. OUT*1/OUT**1.

FIG. 36 represents the logical relationships between: (A) the OUT* and the NOUT signals; (B) the OR and the OUT* signals according to the embodiment of FIG. 33; and (C) OR, OUT** and the OUT* signals according to the preferred embodiment of FIG. 35. From these logical relationships, it is apparent that search time (in determining Dmin) and the sort time (for sorting the remaining distances) are very dependent on OR sub-circuits 12.1 to 12.4 (FIG. 34) delays, driver circuit delays and, because of BUS RC delays, the load resistors.

Figure 37:
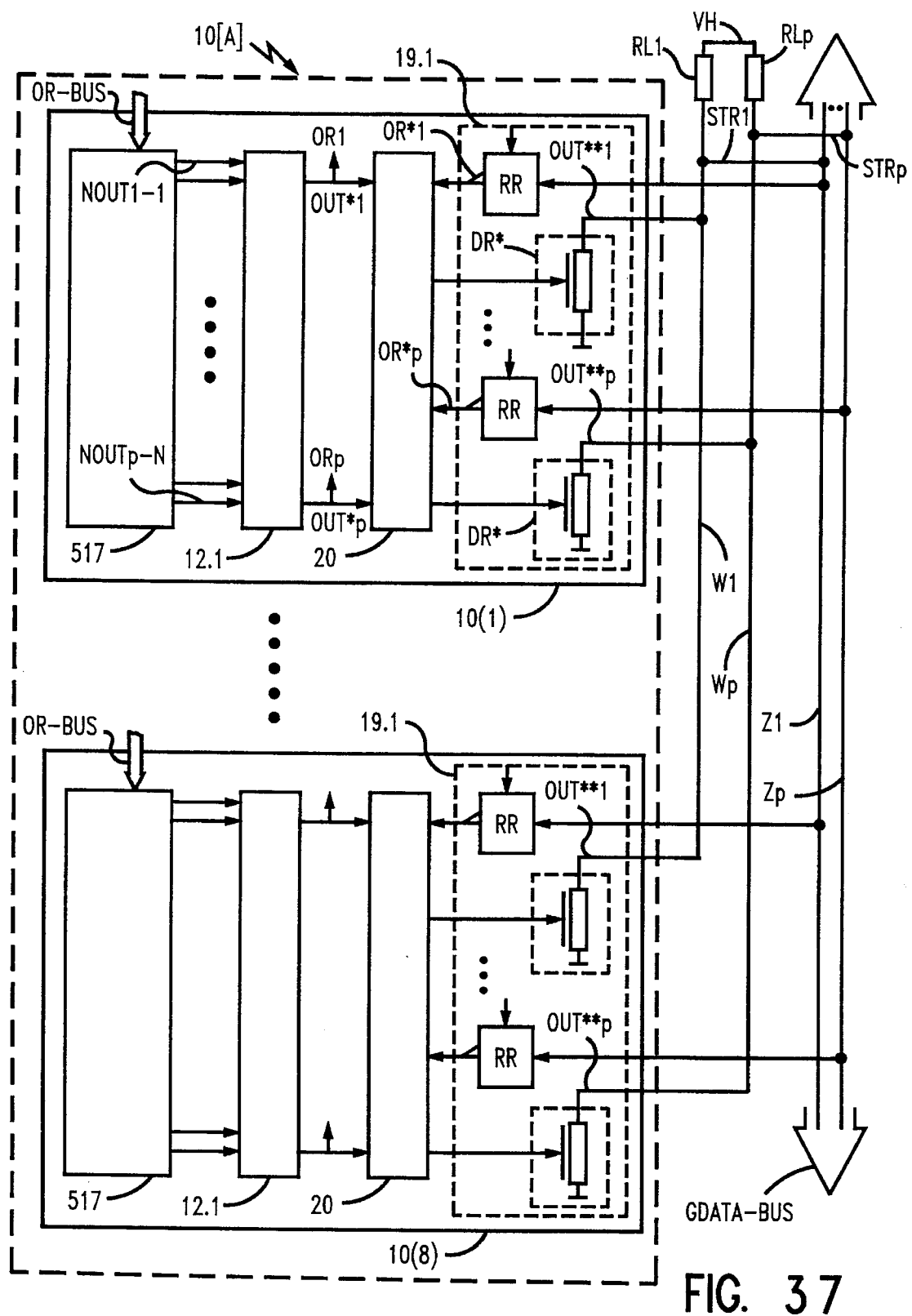
FIG. 37 is a schematic block diagram of the driver circuits for the first bit of the global output signal in an example wherein eight base neural chips are assembled to form a embodiment of the elementary module of FIG. 35, each chip including an optional main Dmin determination circuit 20 of FIG. 4(B).

FIG. 37 schematically depicts a preferred way of minimizing these delays, derived directly from FIGS. 11 and 35. The preferred embodiment of FIG. 37 takes advantage of the main Dmin determination circuit 20 optionally included in each cascadable base chip 10. In this embodiment, the elementary module 10[A] still includes eight base chips 10(1) to 10(8) (N=36 and p=14). In each base chip, outputs the NOUT1-1 to NOUTp-N of aggregate circuit 517 (see FIG. 30) are inputs to a dedicated OR sub-circuit 12.1 on each of the chips. Outputs from the chip's OR sub-circuit 12.1 OUT*1 to OUT*p are fed back on the OR-BUS as inputs to the chip's aggregate circuit 517 and are inputs to the chip's main Dmin determination circuit 20. The outputs from main Dmin determination circuit 20 are the driver circuit DR* inputs in each sub-block 19.1. Global chip outputs OUT1 to OUTp from the driver circuits DR* are connected to respective lines W1 to Wp and coupled to VH through respective load resistors RL1 to RLp. Each of OUT1 to OUTp are strapped by STR1-STRp to lines Z1–Zp on the GDATA-BUS. OUT** from the GDATA-BUS is inverted and fed back to main Dmin Determination Circuit 20 through Receivers RR on the OR*-BUS (for main Dmin Determination circuit 20, OR* is the complement of OUT**). The main Dmin determination circuit 20 is identical to search/sort circuit 502. The eight base chips forming the elementary module 10[A] in FIG. 37, thus function in parallel to determine: First, the minimum distance value Dmin among the distances calculated by the engaged neuron circuits in the base chips 10; and, then, the minimum distance among all of the chip's determined minimum distances Dmin for the elementary module.

With the preferred multi-chip embodiment of FIG. 37, the search and the sort processes are performed very efficiently and quickly. The embodiment of FIG. 37 represents a practical way to cascade eight or fewer base chips 10 (wherein each chip includes a main Dmin determination circuit 20) to form a preferred elementary module 10[A] of FIG. 11. Only eight base chips are cascaded in this embodiment because dot ANDing (fan out) limits the number of dottable chips to eight. However, this eight chip elementary module 10A may be cascaded by adding minor additional logic to form complex modules with a correspondingly larger neural network as in FIG. 38.

Figure 38:
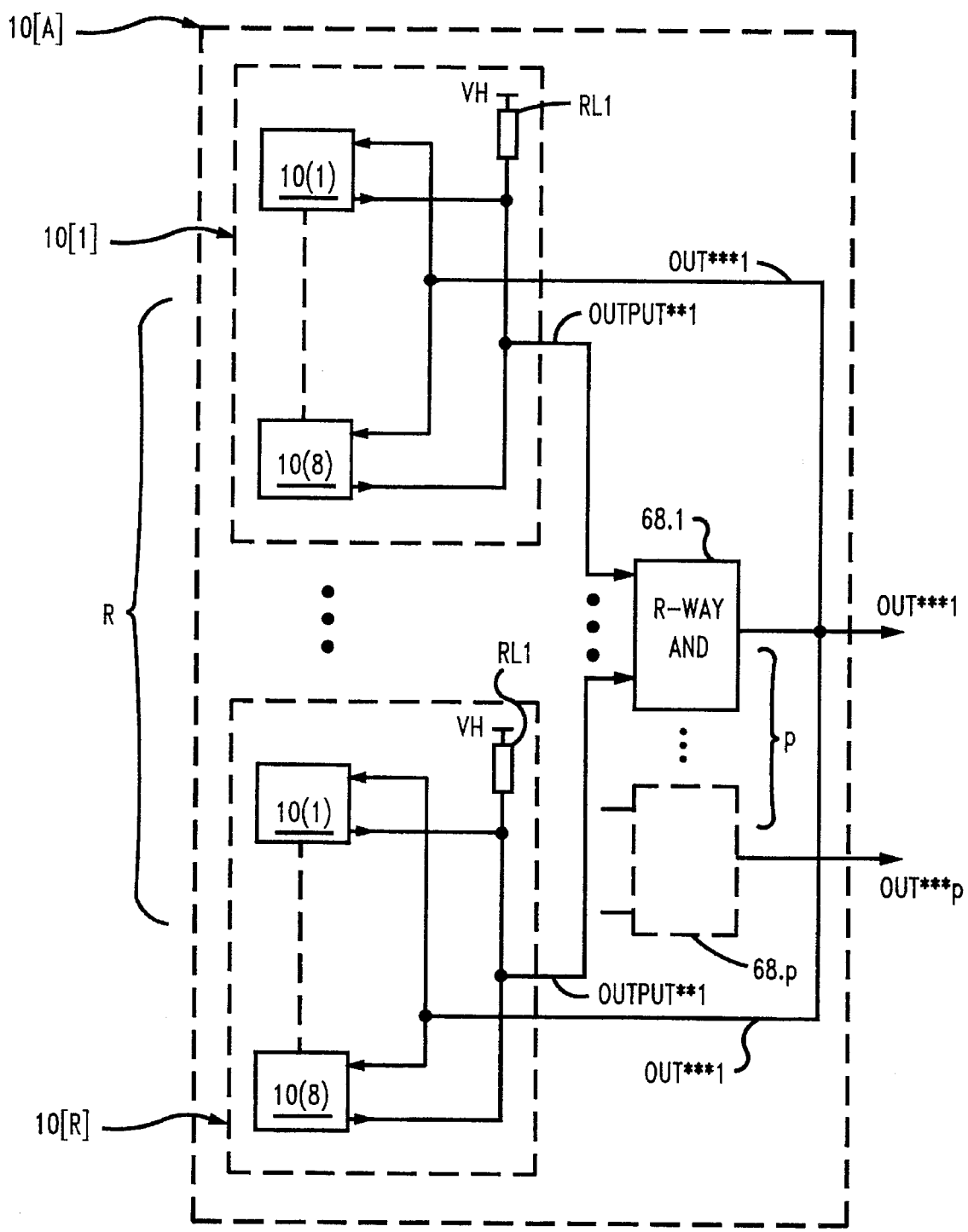
FIG. 38 is a complex module formed from a plurality of the elementary modules of FIG. 35.

FIG. 38 is a block diagram of a further expanded neural network including a plurality of the elementary modules of FIG. 37. A complex module labelled 10{A} is formed of R such elementary modules 10[A] with a preferred way of overcoming the dot ANDing limitation imposed thereon. Each elementary module 10[A] includes eight base chips 10(1) to 10(8). For simplicity, only the first bit signal OUT1 from each elementary module is described. Description of OUT1 is typical of the other such bits. The OUT1 signals generated by each of the R elementary modules are inputs to R-way AND gate 68.1 which generates the OUT*1 signal. The third asterisk indicates that a third logic operation to form the global result (in this case an AND). OUT***1 is fed back to each of the eight base chips of each elementary module through an inverting on chip receiver circuit RR (not shown) to produce the OR*i signal in elementary module 10[A]. The other module outputs are ANDed in respective AND gates 68.2 to 68.p to generate the OUT*2 to OUT*p. OUT*2 to OUT*p are fed back as the OR*2 to OR*p, respectively. Alternatively, the AND function provided by circuits 68.1 to 68.p may be replaced by OR, NOR or NAND gates or any combination thereof so long as the desired logic relationships are maintained.

Thus, with a little additional logic, an inter-neuron communication system is formed, by adding only two levels of logic to the base chip. The COM***-BUS which is the main part of the GDATA-BUS, can theoretically connect together an unlimited number of base chips 10 and, thereby, an unlimited number of neuron circuits. Each neuron circuit simultaneously generates local result and local output signals and places them on its NR-BUS and NOUT-BUS, respectively, to be processed simultaneously in OR circuit 12. Next, chip level results and chip level outputs NR* and OUT* from OR circuit 12 are dot ANDed to the COM-BUS. These outputs are simultaneously fed back to the module in parallel for further processing. As described above, the OR-BUS is an input to each neuron circuit of both the stand alone base chip 10 of FIG. 4(A) and, in a multi chip module, to the cascaded base chips 10 of FIG. 4(B). The successive OR and AND output stages add very few logic stage delays to the parallel architecture of the base chip 10 and by extension, to the elementary module. Thus, the COM-BUS maintains parallel network architecture and, therefore, chip cascadability. The global COM**-BUS may be generated by dot ORing and/or dot ANDing or any equivalent such function.

Furthermore, with the alternate architecture of base chip 10" of FIG. 10, only one OR stage is required. Preferably, this single OR stage is dot ORing the output of driver circuits DR*. Therefore, in this alternate embodiment, the inter-neuron communication system includes only block 19 (in this alternate embodiment, dot ANDing is preferred to dot ORing for performance reasons), the COM-BUS and the OR-BUS (derived from the COM-BUS).

It is not intended that the above inter-neuron communication system be limited in application specifically to neural networks. This communication system may be used generally, e.g., in a multiprocessor system, each multi-processor unit having a plurality of base processing units. Further, this communication system would be advantageous for such a multiprocessor system wherein all, or, at least a determined number of processing units, simultaneously generate and send local result data on a common communication bus and, further, where each of the processing units may participate in determining a global result from the sent local results. Such a determination, typically, involves performing a desired logic function on local result data in order to produce global result data and, then, to make the global result data available on the common communication bus. The global result data may be accessed directly on the bus by peripherals, processors, etc., or stored in a register for further processing. Finally, the local data (in the processing unit) is compared against global data fed back from the bus in a compare circuit in the processing unit. The result of the comparison is a new local result that can be used subsequently to initiate various actions, e.g., inactivate certain resources or blocks of a determined processing unit from the group of processing units; or, compute still other global result data. Each local result (on a local line or local bus lines) is the result of a local evaluation. The status of the local evaluation is dependent upon the processing unit itself. Every global result signal (on a global line or global bus) is the result of a global evaluation performed at the global level and involves all base processing units.

Thus, the inter-neuron communication system, at its simplest level is used with the neural network 11(A) of FIG. 4(A). Neuron circuits 11-1 to 11-N are interconnected by the OR circuit 12 to the on-chip global communication bus COM*-BUS, which is fed back to the chip on the OR-BUS. Further, a function performed by the entire neural network is determining if all the firing, committed neuron circuits have the same category or, if they have at least two different categories. This comparison is performed during the recognition phase according to box 41 of FIG. 14(B). In performing this function, the neuron's local category C (in the neuron's category register 450) and the global category C* (from the OR-BUS) are compared in identification circuit 400. Thus, in the stand alone base chip, each neuron circuit 11 is a base processing unit. Each neuron's local category C in the neuron's category register 450 is local data. The global category C* is the global data that results from ORing all the local categories in OR sub-circuit 12.1. The global category C* is fed back to each neuron circuit on the OR-BUS, to be compared with the neuron's local category C. The result of the comparison is UNC/FIRE.OK, a local result. All of the neuron's local result signals, UNC/FIRE.OK, are ORed in circuit 12 to generate a global result UNC/FIRE.OK*. Finally, the COM-BUS is a plurality of global result lines carrying global result signals (F, DEGOUT and UNC/FIRE.OK) and global output lines carrying the global output signal (OUT**).

Figure 39:
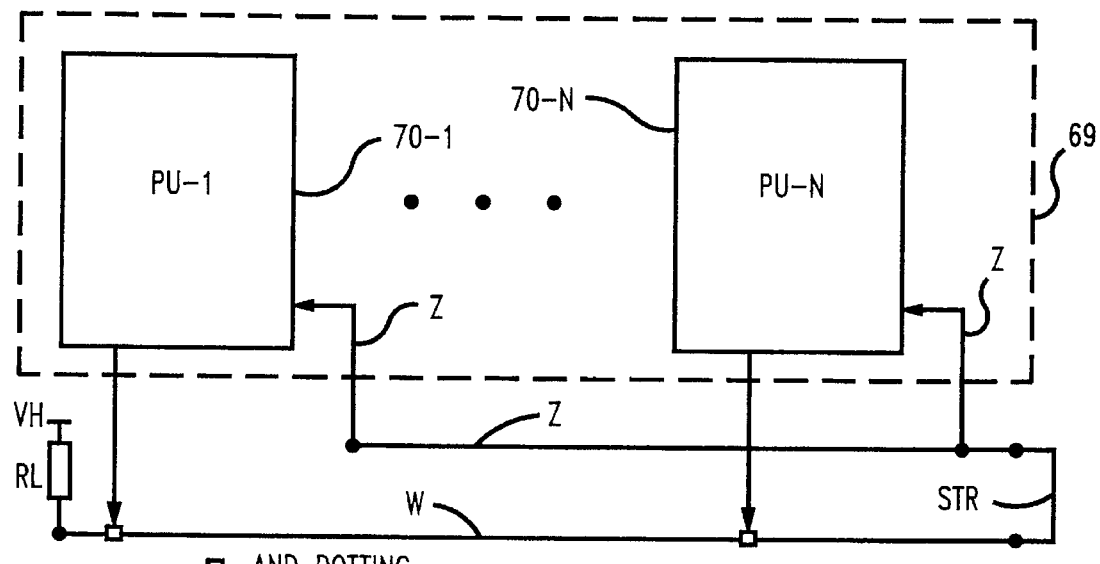
FIG. 39 schematically illustrates the inter-neuron communication system of the present invention used as an elementary multi-processor unit in a system comprised of a plurality of elementary processing units.

FIG. 39 is a block diagram wherein a plurality of base processing units 70-1 to 70-N are interconnected using the communication system of the present invention. Each base processing unit 70-1 to 70-N has one output bus for its local result signal and one input or feedback bus Z with the global result. A number of such base processing units can be interconnected as described hereinabove. The base processing units 70-1 to 70-N form an elementary processing unit 69. The strap STR connects between the global result bus W and the feed-back bus Z. A load resistor RL couples each line of the global result bus W to VH. Alternately, the strap function may be replaced by a driver circuit.

Figure 40:
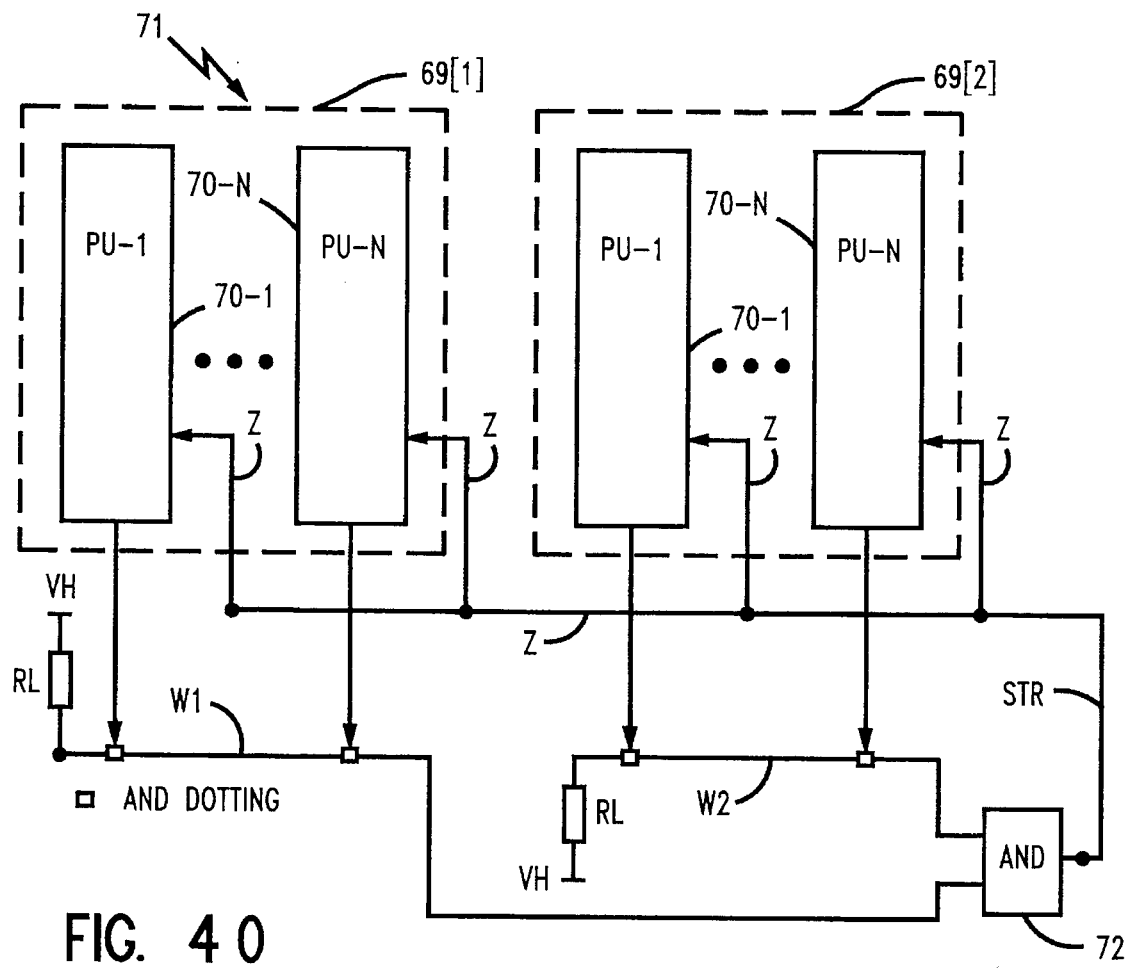
FIG. 40 shows a complex multi-processors unit formed from two elementary multi-processor unit of FIG. 39.

FIG. 40 is a block diagram of a processing unit 71 wherein a number of elementary processing units 69[1] and 69[27] are further interconnected. The number of elementary processing units 69 (2 in this example) that may be interconnected, is limited only by the interconnection technology. The respective global buses W1 and W2 are combined in AND gate 72. The output of AND gate 72 is strapped by strap bus STR, to feedback bus Z. Global result data on the Z bus is fed back to each base processing unit 70-1 to 70-N of each of elementary processing units 69[1] and 69[2]. To extend the number of elementary processing units beyond the interconnect technological limit, an intermediate merge block (not shown) may be used. The merge block would further combine two or more global result signals to produce a new global result signal on a global result bus. Finally, the global result bus is fed back to each base processing unit 70-1 to 70-N on the strap bus STR. Because of the strap bus STR, a data management supervisor is not needed in this processing unit 71. This processing unit 71 may be further expanded by expanding the number of logic levels such that new global result signals are formed by combining former global result signals.

* ANCILLARY CIRCUITS *

Figure 41:
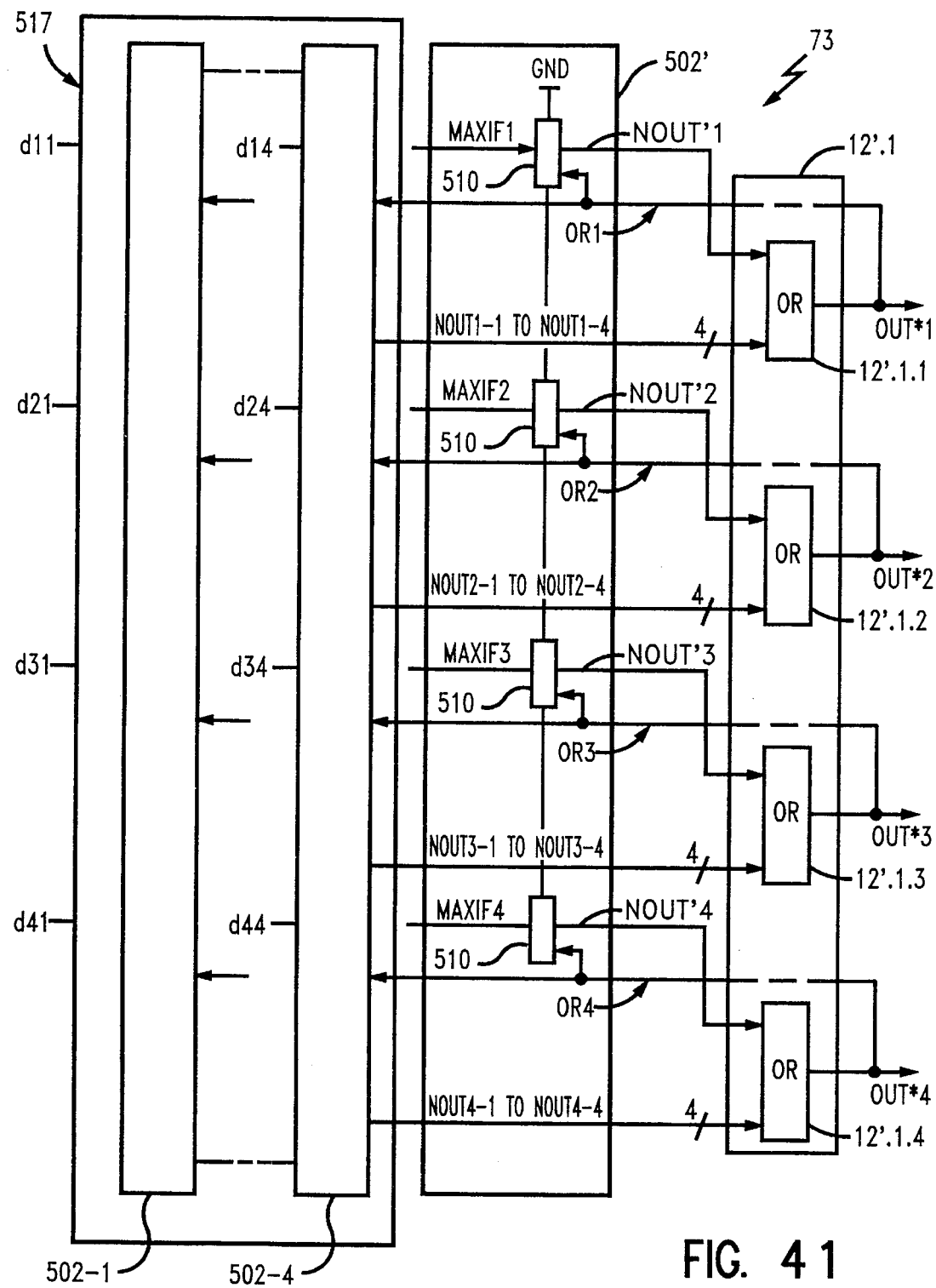
FIG. 41 shows the local output MaxIF signal generated from a dummy search/sort circuit in each base neural chip of FIG. 4(B).

FIG. 41 is a block diagram of a cross sectional portion 73 of base chip 10 including an additional clamp circuit 502', which is used to clamp the upper limit of the influence field to MaxIF. Clamp circuit 502' includes the same search/sort units 510 of FIG. 28 that cascade in series from search/sort circuit 502. However, the clamp circuit 502' is connected differently than the search/sort circuit 502 of FIG. 29. The input to the clamp circuit 502' is MaxIF instead of the calculated distance D which is the input for Search/Sort Circuit 502. When clamp circuit 502' is included, it is always selected (not inhibited), because its EXCLIN-1 input is tied to the ground GND. Also, its EXCLOUT-N output is suppressed. Therefore, the OR gates 12'.1.1 to 12'.1.4 of dedicated OR sub-circuit 12'.1 to 12'.4 include an additional input, i.e., each OR 12'.1 to 12'.4 has N+1 inputs instead of N inputs. Only one clamp circuit 502' is included in a base chip 10. The clamp circuit 502' operates identically to the search/sort circuits 502 during determination of the minimum distance Dmin. The clamp circuit 502' sets the AIF register 352 of a newly engaged neuron circuit to the MaxIF value during the learning phase. For example, the MaxIF value may be loaded into the ready to learn neuron circuit whenever none of the neuron's identify an input vector.

BASE CHIP MAJOR FEATURES

In summary, the preferred embodiments of the base chip 10 of FIG. 4 (B) learn and recognize input vectors with up to 64 components (entries). Because of its parallel architecture, the base chip 10 simultaneously computes the distance between the input vector and all prototype vectors previously stored therein (those that the neuron circuits have "learned"). The distance calculation method is based on a norm that is user selectable. Optionally, this norm may be different from one neuron circuit to another one. In the above description, the two preferred distance computation methods are the L1 norm and Lsup norms; however, other calculation methods are contemplated. Further, the number of neuron circuits N in the base chip 10 is not a limitation on the number of neurons in the neural network, because the base chips are cascadable. Therefore, an unlimited number of prototype vectors can be stored in the neural network for recognition.

During the learning phase, each neuron circuit automatically adjusts its influence field in order to optimally map feature space. This adjustment occurs in all neuron circuits simultaneously, without requiring any external action, such as a supervision by a micro-controller. Therefore, the learning process is automatically performed internally. Advantageously, learning time is independent of the number of neuron circuits forming the neural network. Additional time is saved because of the ability to pre-charge the ready to learn neuron by storing input vector components during the recognition phase. Therefore, the input vector need not be provided to the ready to learn neuron during a separate learning step. The base chip 10 is capable of a large number of categories (16384) and further includes a context feature, which, in particular, allows dividing the neural network in a number of smaller networks. The neural network also has an efficient search and sort scheme for fast minimum distance determination and for efficiently sorting distances. The base chip 10 also has both SAVE and RESTORE modes for increased efficiency. Finally, the number of neuron circuits forming any neural network is unlimited and transparent to the user.

MAIN APPLICATIONS OF THE BASE CHIP

The base chips 10 of the present invention are based on a highly innovative neuron circuit architecture. As a result, elementary and complex modules may be formed that include neural networks of any desired size. Neuron circuit structures according to the present invention may be used for a number of applications in various fields of technology. The base chip provides an innovative and low cost solution for applications such as:

Image recognition (factory automation, . . . )
Image compression (data storage, . . . )
Video compression (video storage, video conference, . . . )
Character recognition
Voice processing and recognition
Signal recognition (radar, sonar and the like)
Data analysis
Robotics
Equipment monitoring
Signal processing, etc.

The above examples are intended only for illustration and not as limitation.

While the present invention has been described herein in terms of preferred embodiments, numerous variations and modifications will occur to a person skilled is the art without departing in spirit or scope form the claimed invention. It is intended that the appended claims encompass all such variations and modifications.

TABLE IV

LIST OF SYMBOLS & NOTATIONS
(in the description)

| SYMBOL | DEFINITION |
| --- | --- |
| A | the input vector |
| AIF | actual influence field value |
| Al | lth component (weight) of the input vector |
| al | lth bit of the input vector component |
| B | the prototype vector |
| Bl | lth component of the prototype vector |
| bl | lth bit of the prototype vector component |
| CAT | input category |
| CAT-BUS | the bus transporting the input category |
| C | local category of neuron circuit 11 |
| Cat-BUS | the bus transporting the local category |
| Ci or C-i | local category of neuron circuit 11-i |
| C* or C** | global gategory |
| c | carry bit signal |
| Cin | carry input signal of adders |
| Cgen, Cout | carry output signals of adders |
| Cmin | the minimum category |
| CO | a control signal for committed neuron circ. |
| COM*-BUS | the bus transporting the R* and OUT* signals |
| COM**-BUS | the bus transporting the R** and OUT** signals |
| COM-BUS | the generic name of the COM* and COM**-BUS |
| CXT | input context data |
| CXT-BUS | the bus transporting the CXT data |
| Cxt | local context data |
| Cxt-BUS | the bus transporting the Cxt data |
| D, Di or D-i | distance calculated by a neuron circuit |
| DATA-BUS | the bus transporting the data |
| DCI | daisy chain input terminal/signal |
| DCO | daisy chain output terminal/signal |
| DIST-BUS | the bus transporting the distance D signal |

TABLE IV-continued

LIST OF SYMBOLS & NOTATIONS
(in the description)

| SYMBOL | DEFINITION |
| --- | --- |
| DEG | degenerate status signal |
| DEGOUT | local result degenerate signal |
| Dmin | the minimum distance |
| EXCLIN | input exclusion signal of search/sort circ. |
| EXCLOUT | output exclusion signal of search/sort circ. |
| F | local result fire signal |
| F* or F** | global result fire signal |
| f | force bit signal |
| g | inverted force bit signal |
| GDATA-BUS | the global out bus |
| INDATA-BUS | the input data bus |
| i | a working variable |
| i or -i | related to neuron circuit 11-i |
| J | signal generated by compare circuit |
| J-BUS | the bus transporting the J signal |
| jk | the kth bit of the J signal |
| K | an intermediate signal in block 400 |
| k | a working variable |
| L | a control signal active during the learning |
| LT | an intermediate signal (Lower Than) |
| LTE | an intermediate signal (Lower Than or Equal) |
| Lk | a binary word formed by the kth line Lk |
| L1 norm | the manhattan distance calculation method |
| Lsup | the square distance calculation method |
| l | a working variable |
| M-BUS | a bus of the ZISC chip |
| m | number of bits for coding a vector component |
| MaxIF | the maximum value of the AIF |
| MinIF | the minimum value of the AIF |
| n | number of vector components |
| N | number of neuron circuits in a ZISC chip |
| NM | the normal sub-mode (in recognition phase) |
| NNM | the nearest neighbor sub-mode (in recognition phase) |
| NO | input norm signal |
| NO-BUS | the bus transporting the NO signal |
| No | local norm signal |
| No-BUS | the bus transporting the No signal |
| NOUT | local (or neuron) output signal |
| NOUT-BUS | the bus transporting the NOUT signal |
| NR | composite local result signal |
| NR-BUS | the bus transporting the NR signal |
| OR | feedback signal (equal to OUT* or OUT**) |
| OR-BUS | the bus transporting the OR signal |
| OUT* | global output signal (one ORing) |
| OUT** | global output signal (two ORing) |
| p | width of various buses of the ZISC chip |
| p | propagate bit (p = f̄) |
| PU | processing unit |
| q | a working variable |
| Q | maxim. number of chips in an elem. mod. |
| R | maxim. number of elem. mod in a complex mod. |
| R* | composite global result signal |
| R*-BUS | the bus transporting the R* signal |
| RAM-BUS | a bus of the neuron circuit |
| RESET | the general reset control signal |
| RS | a control signal for READY to STORE |
| s | a bit of a partial sum |
| S | the sum signal outputted by an adder |
| SELECT | a gating signal |
| SL | the status line |
| ST | the STOR control signal |
| UNC/FIRE.OK | local result ambiguity signal |
| INC/FIRE.OK* | global result ambiguity signal |
| X | an intermediate signal in the adder |
| ( ) | designates a chip related reference |
| [ ] | designates an elem. module related ref. |
| { } | designates a complex module related ref. |

We claim:

1. A neuron circuit for receiving an input vector and generating local (neuron) result signals and local (neuron) outputs therefrom, said neuron circuit comprising:

R/W memory means for storing a prototype vector (B), said R/W memory means receiving an input vector and storing said input vector as the prototype vector under the control of a memory control (RS) signal;

distance evaluation means for calculating the distance between said input vector (A) and said stored prototype vector (B) and generating therefrom a distance signal D;

Influence Field (IF) register means for storing the actual influence field value (AIF) of the stored prototype vector B, said actual influence field having a lower limit (MinIF) and an upper limit (MaxIF), said influence field means selectively outputting a selected one of said stored actual influence field, the calculated distance D, or the said minimum influence field value (MinIF);

Distance compare means for comparing the calculated distance D with the output of said IF register means and generating first and second comparison signals (LT, LTE) therefrom, wherein said first comparison signal (LT) is active during a recognition phase if D<AIF and said second comparison signal is active during a learning phase if D<=MinIF;

Local category register means for storing a local category C assigned to the stored prototype vector when the neuron circuit is engaged;

Identification means for receiving said first and second comparison signals, a feed-back signal (OR) on a feed-back bus (OR-BUS), an input category signal (CAT), and a local category signal (C) and for generating therefrom local result signals (F, DEGOUT, UNC/FIRE.OK).

2. The neuron circuit of claim 1 further comprising:

daisy chain circuit means for linking said neuron units with two adjacent circuits in a chain of said neurons and for identifying said neuron circuit's state as free or engaged.

3. The neuron circuit of claim 2 wherein said daisy chain circuit means further identifies a ready to learn neuron circuit.

4. The neuron circuit of claim 3 wherein said daisy chain circuit means generates the memory control signal (RS) for controlling the R/W memory means.

5. The neuron circuit of claim 4 further comprising:

pre-charging means for pre-charging the input vector into the R/W memory means of the ready to learn neuron circuit during the recognition phase.

6. A neural network of neuron circuits of claim 1, each said neuron circuit further including:

minimum determination means for aggregating with at least one other neuron circuit's minimum determination means, said minimum determination means receiving a distance D calculated by said distance evaluation means and a feedback signal on a feed-back bus (OR-BUS), said aggregated minimum determination means determining a minimum distance (Dmin) from among said received distances D, said minimum distance (Dmin) being a local output signal (NOUT) on a local output bus (NOUT-BUS) of one of said neuron circuits in said neural network.

7. A neural network of neuron circuits of claim 1, each said neuron circuit further including:

minimum determination means for aggregating with at least one other neuron circuit's minimum determination means, said minimum determination means receiving a local category signal C and a feedback signal on a feed-back bus (OR-BUS), said aggregated minimum determination means determining a minimum category (Cmin) from among said received category signals C, said minimum category (Cmin) being a local output signal (NOUT) on a local output bus (NOUT-BUS) of one of said neuron circuits in said neural network.

8. The neuron circuit of claim 1 further comprising:

local context register means for storing local context data (Cxt); and matching means for comparing the contents of said local context register means with an input context and for generating therefrom a neuron selection signal (NS), said neuron selection signal selecting or inhibiting said neuron circuit during the recognition phase.

9. The neuron circuit of claim 1 wherein said distance evaluator means calculates the distance D according to a selectable norm.

* * * * *

UNITED STATES PATENT AND TRADEMARK OFFICE
CERTIFICATE OF CORRECTION

PATENT NO. : 5,621,863
DATED : April 15, 1997
INVENTOR(S) : Jean-Yves Boulet, Didier Louis, Catherine Godefroy, Andre Steimle, Pascal Tannhof and Guy Paillet It is certified that error appears in the above-indentified patent and that said Letters Patent is hereby corrected as shown below:

On the title page, Column 1, after "Corporation" and before "Armonk, N.Y."

please insert --Part Interest--.

Signed and Sealed this

Ninth Day of September, 1997

Attest:

BRUCE LEHMAN

Attesting Officer

Commissioner of Patents and Trademarks